(12) United States Patent
Fourman

(10) Patent No.: US 9,143,578 B2
(45) Date of Patent: Sep. 22, 2015

(54) CONTENT DELIVERY SYSTEM FOR DELIVERING CONTENT RELEVANT TO A PROFILE AND PROFILING MODEL TOOL FOR PERSONAL OR ORGANIZATIONAL DEVELOPMENT

(75) Inventor: Clive Morel Fourman, London (GB)

(73) Assignee: Gaiasoft IP Limited, London (GB)

( * ) Notice: Subject to any disclaimer, the term of this patent is extended or adjusted under 35 U.S.C. 154(b) by 770 days.

(21) Appl. No.: 12/298,634

(22) PCT Filed: Apr. 27, 2007

(86) PCT No.: PCT/GB2007/005022
§ 371 (c)(1),
(2), (4) Date: Mar. 16, 2009

(87) PCT Pub. No.: WO2007/125369
PCT Pub. Date: Nov. 8, 2007

(65) Prior Publication Data
US 2010/0161709 A1    Jun. 24, 2010

(30) Foreign Application Priority Data

Apr. 27, 2006  (GB) .................................... 0608323.2
May 23, 2006  (GB) .................................... 0610218.0
Oct. 10, 2006  (GB) .................................... 0620066.1
Nov. 10, 2006  (GB) .................................... 0622480.2

(51) Int. Cl.
*G06F 15/173*    (2006.01)
*H04L 29/08*    (2006.01)
*G06Q 30/02*    (2012.01)

(52) U.S. Cl.
CPC .............. *H04L 67/306* (2013.01); *G06Q 30/02* (2013.01); *H04L 67/02* (2013.01)

(58) Field of Classification Search
CPC ....................................................... H04L 67/306
USPC ................ 709/203; 707/748–749; 705/10–11
See application file for complete search history.

(56) References Cited

U.S. PATENT DOCUMENTS

| | | | | |
|---|---|---|---|---|
| 5,588,108 | A * | 12/1996 | Kumar et al. | 715/765 |
| 6,023,691 | A * | 2/2000 | Bertrand et al. | 706/2 |
| 6,052,122 | A * | 4/2000 | Sutcliffe et al. | 715/751 |
| 6,154,739 | A * | 11/2000 | Wrobel | 1/1 |
| 6,301,575 | B1 * | 10/2001 | Chadha et al. | 1/1 |
| 6,321,205 | B1 * | 11/2001 | Eder | 705/7 |
| 6,493,690 | B2 * | 12/2002 | Bertrand et al. | 706/45 |
| 6,505,202 | B1 * | 1/2003 | Mosquera et al. | 1/1 |
| 6,535,861 | B1 * | 3/2003 | O'Connor et al. | 706/11 |

(Continued)

*Primary Examiner* — Wing F Chan
*Assistant Examiner* — Andrew Woo
(74) *Attorney, Agent, or Firm* — Finnegan, Henderson, Farabow, Garrett & Dunner, LLP

(57) ABSTRACT

A content delivery system is provided for delivering content relevant to a profile. The system comprises a server (106) arranged to store a plurality of data elements (114) having a plurality of respective profiles associated therewith. The server (106) is further arranged to mine the plurality of data elements relative to another data element having another profile associated therewith. The server (106) is consequently able to identify at least one of the plurality of data elements having as great a relevance as possible to the another profile. The plurality of respective profiles constitute respective meta-data, and the another data element and at least one of the plurality of data elements comprise data relating to a profiling model. The server (106) is capable of delivering the identified at least one of the plurality of data element to a recipient terminal (102).

24 Claims, 52 Drawing Sheets

(56) References Cited

U.S. PATENT DOCUMENTS

| | | | |
|---|---|---|---|
| 6,745,193 B1* | 6/2004 | Horvitz et al. | 707/796 |
| 6,993,513 B2* | 1/2006 | Beams et al. | 706/47 |
| 7,139,764 B2* | 11/2006 | Lee | 1/1 |
| 7,180,516 B2* | 2/2007 | Kapler et al. | 345/418 |
| 7,222,126 B2* | 5/2007 | Wolman | 707/756 |
| 7,328,233 B2* | 2/2008 | Salim et al. | 709/202 |
| 7,398,218 B1* | 7/2008 | Bernaski et al. | 705/3 |
| 7,519,589 B2* | 4/2009 | Charnock et al. | 1/1 |
| 7,584,159 B1* | 9/2009 | Chakrabarti et al. | 706/45 |
| 7,716,571 B2* | 5/2010 | Tien et al. | 715/212 |
| 7,725,340 B2* | 5/2010 | Reisz et al. | 705/7 |
| 2002/0169658 A1* | 11/2002 | Adler | 705/10 |
| 2004/0030667 A1* | 2/2004 | Xu et al. | 707/1 |
| 2005/0060219 A1* | 3/2005 | Deitering et al. | 705/10 |
| 2005/0096950 A1* | 5/2005 | Caplan et al. | 705/7 |
| 2005/0283354 A1* | 12/2005 | Ouimet | 703/26 |
| 2006/0212791 A1* | 9/2006 | Crow et al. | 715/503 |
| 2006/0218563 A1* | 9/2006 | Grinstein et al. | 719/328 |
| 2006/0241923 A1* | 10/2006 | Xu et al. | 703/2 |
| 2007/0016871 A1* | 1/2007 | Magnifico | 715/764 |
| 2007/0094592 A1* | 4/2007 | Turner et al. | 715/526 |
| 2010/0161709 A1* | 6/2010 | Fourman | 709/203 |

\* cited by examiner

*Questions*

Use the following key to answer the questions:
Choose between
0 = totally disagree to 5 = totally agree

| Question | Answer |
|---|---|
| 1. Customer question 1 | ○ 0 ○ 1 ○ 2 ○ 3 ● 4 ○ 5 |
| 2. Customer question 2 | ○ 0 ○ 1 ○ 2 ○ 3 ● 4 ○ 5 |
| 3. Customer question 3 | ○ 0 ○ 1 ○ 2 ● 3 ○ 4 ○ 5 |
| 4. Internal question 1 | ○ 0 ○ 1 ● 2 ○ 3 ○ 4 ○ 5 |
| 5. Internal question 2 | ○ 0 ○ 1 ● 2 ○ 3 ○ 4 ○ 5 |
| 6. Internal question 3 | ○ 0 ○ 1 ● 2 ○ 3 ○ 4 ○ 5 |
| 7. Partner question 1 | ○ 0 ○ 1 ● 2 ○ 3 ○ 4 ○ 5 |
| 8. Partner question 2 | ○ 0 ○ 1 ○ 2 ● 3 ○ 4 ○ 5 |
| 9. Partner question 3 | ○ 0 ○ 1 ○ 2 ○ 3 ○ 4 ● 5 |

Figure 2

| Be Individual | Do Individual | Have Individual |
|---|---|---|
| ▼ Be Individual<br>　▫ Issue - Staff Morale<br>　▪ Organisation - Global Enterprise<br>　▫ Recommendation - Culture change: Personal Values match<br>　▪ Resource - ISO 9001 | ▼ Do Individual<br>　◆ Consultant - Cathy McGowan<br>　◉ Observation - Profile observation<br>　▪ Organisation - Global Enterprise<br>　▪ Organisation - Government Dept<br>　▪ Resource - EFQM<br>　▪ Resource - ISO 9001 | ▼ Have Individual<br>　▲ Person - Stephan McGuire |
| ▼ Be Organisation<br>　▫ Issue - Staff Morale<br>　◉ Observation - Profile observation<br>　▲ Person - Stephan McGuire<br>　▪ Resource - ISO 9001 | ▼ Do Organisation<br>　▨ How-to Knowledge - How to improve a persons values match<br>　▫ Issue - Cultural Change<br>　▪ Organisation - Global Enterprise<br>　▪ Organisation - Government Dept<br>　▲ Person - Sally Barker<br>　▫ Recommendation - Culture change: Personal Values match | ▼ Have Organisation<br>　▪ Organisation - Government Dept<br>　▫ Recommendation - Culture change: Personal Values match |
| ▼ Be Whole System<br>　◆ Consultant - David Turner | ▼ Do Whole System<br>　◆ Consultant - David Turner<br>　▨ How-to Knowledge - How to improve a persons values match<br>　▲ Person - Sally Barker<br>　▫ Recommendation - Culture change: Personal Values match | ▼ Have Whole System<br>　▫ Recommendation - Culture change: Personal Values match |

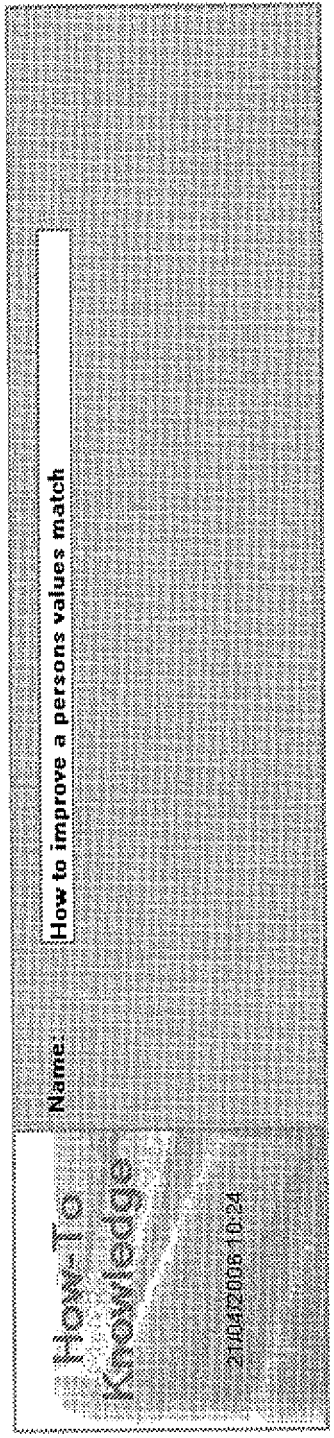

Case Story:-
ABC Bank – Unsatisfied Personal Values match with Desired Culture

How to:
The intervention here is to investigate how the specific Unsatisfied PV/DC matches can be integrated into the current culture using a process such as Appreciative Inquiry to determine the behaviours that are necessary for these values to come alive in the organisation. Integrate these ideas and concepts into a Personal Alignment Program for leaders and managers.

Systems Transformation Grid:-
☐ Be Individual      ☐ Do Individual       ☐ Have Individual
☐ Be Organisation   ☑ Do Organisation    ☐ Have Organisation
☐ Be Whole System  ☐ Do Whole System   ☐ Have Whole System

Figure 8

| Profile Number | Your Character | Issues you face in life | Recommendations |
|---|---|---|---|
| Five | You are the agent of change as long as even if on the phone you need to move. If it moves you're happy. A natural revolutionary. You love to travel; are a brilliant mass communicator; passionate and physical. | Sitting still is your nemesis; stagnation; stuckness any kind of quiet time will slowly drain your soul. You have so much nervous energy that if not adequately channeled can lead to burn out and stress related illness. | Book: You'll be writing them not reading them.<br><br>Film: Adventure<br><br>Indiana Jones and the Temple of Doom |

Figure 9

1701 Attributes

Measures

| Consumer Preference Risks |
|---|
| Definition |
| Corporate Governance Risks |
| Operational Risks |
| Emerging Systemic Risks |
| Overall Risk Rating |
| Culture |
| Process |
| Experience |
| Application |
| Motivation |
| Behaviours |
| Business Model |

Figure 41

| Measure / Maturity Model | Step 1: Keyword Name of Level 1 Name | Step 1: Name of Level 1 Explanation | Step 2: Keyword Name of Level 2 Name | Step 2: Name of Level 2 Explanation | Step 3: Keyword Name of Level 3 Name | Step 3: Name of Level 3 Explanation | Step 4: Keyword Name of Level 4 Name | Step 4: Name of Level 4 Explanation | Step 5: Keyword Name of Level 5 Name | Step 5: Name of Level 5 Explanation | Intention | Behaviour |
|---|---|---|---|---|---|---|---|---|---|---|---|---|
| Consumer Preference Risks | Identified | The risks in the inspection process have been identified | Quantified | The inspection process has been amended to be more measurable | Managed | Inspectors have been briefed on the changed process | Mitigated | The Inspections have been improved | Controlled | Inspectors have made a marked improvement using the new process | | |
| Definition | Ad Hoc | Unaware of the need for management of uncertainties (risk). No structured approach to dealing with uncertainty. Repetitive and reactive management processes. Little or no attempt to | Initial | Experimenting with risk management through a small number of individuals. No structured approach in place. Aware of potential benefits of managing risk, but ineffective implementation. | Repeatable | Management of uncertainty built into all organizational processes. Risk management implemented on most or all projects. Formalized generic risk process. Benefits understood at | Managed | Risk-aware culture with proactive approach to risk management in all aspects of the organization. Active use of risk information to improve organizational processes and gain competitive advantage. | | | | |
| Corporate Governance Risks | | | | | | | | | | | | |
| Operational Risks | | | | | | | | | | | | |

CONTENT DELIVERY SYSTEM FOR DELIVERING CONTENT RELEVANT TO A PROFILE AND PROFILING MODEL TOOL FOR PERSONAL OR ORGANIZATIONAL DEVELOPMENT

The present invention relates to a content delivery system of the type that, for example, codifies and re-uses expertise and/or content in personal, organisational transformation, in entertainment and/or in education. The present invention also relates to a method of content delivery of the type that, for example, codifies and re-uses expertise and/or content in personal, organisational transformation, in entertainment and/or in education.

Standards are emerging in areas such as project management (PRINCE2), quality management (ISO9001, EFQM, Malcolm Baldridge, Japan Quality Awards), corporate governance (Sarbanes-Oxley, King 2), risk, corporate social responsibility, and in many other areas in addition. Individual managers and organisations must simultaneously meet standards as well as delivering on business targets. At the same time, there is an explosion of entertainment and education content available.

There is pressure on people and organisations to transform due to issues including regulation, globalisation, competition, digitisation of processes, as well as transparency, corporate social responsibility and emerging risks relating to potential climate change and other issues. There is an increasing recognition that personal development, leadership and organisation culture are a key to responding to all of these challenges. In this respect, the so-called intangibles of organisation culture and personal beliefs and values are an important contributor to the success or failure of individuals, organisations and systems.

Organisations need to meet the challenge of transformation. According to Kaplan and Norton in their book "Strategy Maps: Converting Intangible Assets into Tangible Outcomes", a large proportion of stock market value now relates to these intangibles. The Balanced Scorecard of Kaplan and Norton provides an approach for organisations to become more aware of potential blind spots by providing a more holistic management view than merely financial data. The Balanced Scorecard, as a management tool, draws the attention of managers beyond simple financial measures, to measures of customer, process, learning or people.

The Enterprise Resource Planning computer systems like SAP which provide the management systems of large businesses and governments are largely designed based on the assumption of a homogenous business culture and stability of the future business model.

Writers like Ken Wilber in "A Brief Theory of Everything", Don E. Beck in "Spiral Dynamics" and Richard Barrett in "Liberating the Corporate Soul" have championed or pioneered development of powerful "Transformation Models" for understanding the development of individuals and organisations.

Whilst there are many development tools widely available, they are created for different purposes and from different perspectives, and some are optimal in relation to certain profiles, and not in relation to other profiles. The information available in the public domain is excessive, and it is therefore difficult for potential users to determine appropriate and optimal usage For an organisation of many people each with their own profiles and needs, it is to the organisation's benefit to harness different abilities, needs, strengths and weaknesses of individuals, to ensure the effective co-ordination and alignment of the organisation's objectives and values. Different people in different parts of an organisation will have different values and needs, and their effects can at worst cancel each other out or, their differences may not support their being optimally effective. When people and organisations are unaware of their differences, it makes it difficult for them to collaborate.

According to a first aspect of the invention, there is provided a content delivery system for delivering content relevant to a profile, the system comprising: a server arranged to store a plurality of data elements having a plurality of respective profiles associated therewith, and to mine the plurality of data elements relative to another data element having another profile associated therewith in order to identify at least one of the plurality of data elements having as great a relevance as possible to the another profile; wherein the plurality of respective profiles constitute respective meta-data; and the another data element and at least one of the plurality of data elements comprise data relating to a profiling model, the server being capable of delivering the identified at least one of the plurality of data element to a recipient terminal.

It should be appreciated that "relevance" should be construed as relating to meeting wants, needs and/or expectations whether known to a user or not, or wherever there is value in connecting or relating one data element and/or resource to another.

The server may be further arranged to organise the identified at least one of the plurality of data elements in accordance with the profiling model.

The server may be arranged to communicate the identified at least one of the plurality of data elements to a recipient terminal so that the retrieved data element is presented graphically in accordance with the profiling model.

The profiling model may be an evolutionary, psychological or cultural development of consciousness model for an individual, organisation or community. The term "community" should be understood to relate to a group, selection, collection or demographic group of people and should be understood to be usable interchangeably and in the most general sense applicable.

The profiling model may be a model that characterises an individual, an organisation or a community into a number of discrete categories where there is no strict evolutionary sequence for transitioning between categories.

The profiling model may be a model relating to a repeatable lifecycle, for example a sequence of events or states that always occur in succession or on multiple occassions.

A data element may be one or more of: a simple number, a performance measure, a document or complex data structure.

A data element may correspond to one or more of: a person, a customer, an organisation, an organisational system or a particular issue confronting a person, a customer, an organisation or organisational system.

A data element of the plurality of data elements may relate to at least one resource, for example: an organisation "strategy map", a strategy, an objective, Key Performance Indicator (KPI), a scorecards, a Hierarchy of Intent, for example as described in UK patent application No. 0324346.6), an expertise, a learning, a recommendation, a risk, an issue, a case study, an action, a corrective action, a discussion, a web blog, a web link, a wiki and/or a reference, a legal entity, a department, a team, and/or a reference to a standard, a tool, a publication and/or a description of a method or a processes.

The plurality of data elements may be stored as a database comprising at least one table. Each of the at least one table may comprise at least one different type of data element. A data element of the plurality of data elements may have at least one discrete attribute. The discrete attribute may be a field of a database table. The attribute may include one or more of: type of data element, source of data element, industry sector relating to the data element, application/business solution related to the data element, owner of intellectual property in the data element, cost of purchase, use or licensing of the data element, or licensing basis for use of the data element, other numeric, textual and data fields.

The data element may represent an entity which may be a person or organisation or legal entity accessing information which may have one or more of the profile attributes listed above.

The profile may characterise the data element.

The profile may be obtained in response to an assessment.

The assessment may be a human assessment input manually to the server.

The assessment may be performed using a computer program based upon results of a survey. The survey may be interactive and provided by the computer program to solicit answers to a question from a user.

The server may be arranged to provide an automated assessment.

The assessment may be based upon inherent data of the data element of the plurality of data elements. Alternatively or additionally, the assessment may be based upon the attribute of the data element of the plurality of data elements.

The assessment may be an automated assessment based upon data inherent in the data element of the plurality of data elements and in conjunction with data that is not inherent in the data element of the plurality of data elements.

Each profile may be produced by a function that takes the resource as input and generates a profile in response thereto. The function may be expressed as an algorithm in computer code, as a procedure to be followed by a person, or other means to provide an output from an input.

The profile may be expressed when stored as a number of data attributes. The number of data attributed may be stored in columns in a database of data elements.

Each user may provide information both implicitly and explicitly from which one or more personal profiles may be derived, which may be amended from time to time based on future interaction with the system as further information is provided from time to time. Based on the profiles generated, the system may filter the information based on the needs and profiles of the organisation and the persons involved, providing a menu or a subset of relevant resources that may contain recommendations.

For the avoidance of doubt, a profile is a set of data, an ordered list or other collection of data that may include tags. The tags may be an indicator, an entity name or names of any part of a "hierarchy of intent" and/or values that may consist of at least one number or data item. The at least one number or data item may not be ordered.

The profile may be stored as one or more attributes of data elements within a database.

The server may provide an individual having a profile associated therewith access control in respect of some or all profiles, and associated resources. The resources may comprise: any data element, analysis, actions and/or learnings available to other users. Partial data access may be provided. The Profile may be translated into any other suitable format for expression of meta-data for use by a search engine or a query tool.

The system may provide a user with appropriate links to suitable resources (which may be more generally and widely known such as films, books and magazines) to assist the user in their interests or personal development based on the appropriateness of such resources to that individual's own profile.

It is thus possible for users to be able to select such entertainment based on what will be of most relevance, or inspiration or have the most learnings applicable to them, based on such resources being profiled by experts or users, based on usage patterns according to many different profiling criteria.

The another data element may have a profile and the server may be arranged to identify at least one of the plurality of data elements having as great a relevance as possible to the profile the another data element by calculating characteristic values based upon a plurality of relevant profile or profile elements. The server may calculate output information in response to the profile, for example: data elements, which may include tools, resources and key recommendations having as great a relevance as possible to the profile.

The use of the term "profile" herein should be construed as embracing one or more "profile elements", a profile element being an element or component of a profile. For example, a profile of a data element may consist of multiple profiles.

The profiling model may be arranged to model an aspect of a state of an entity or data element and progression of the state of the entity or data element.

The progression of the entity may be within a cycle or a developmental sequence with transitions from one state in a model to another state in the model.

The profiling model may comprise a plurality of categories.

The profiling model may comprise at least nine elements.

The at least nine elements may be arranged as a matrix. At least three columns of the matrix may be entitled or attributed to "leadership", "transformation", and "performance", respectively, or "be", "do" and "have", respectively, or similar terminology, for example: "internal", "active", "result", etc. At least three rows of the matrix are entitled or attributed to "individual", "organisational" and "global", respectively, or "individual", "organisation", and "whole system", or similar terminology, for example: more generally, "personal", "group", "larger group".

The system may provide a visual map or matrix as a tool to strategise, scenario plan and manage in the context of a whole system, taking account of relationships between performance, transformation and leadership for individual employees, an organisation and/or the whole system, thereby giving rise enabling an organisation to take account of the whole of the system of which the organisation is a part.

The profiles generated may comprise an indication of a relationship between a data element and an element of the matrix.

Whilst the profiling model may comprise 9 elements, the profiling model may comprise a greater number of rows and/or columns, thereby increasing the number of systems being analysed. The profiling model may thus constitute a hierarchy of holons (systems containing systems); an expanding number of hierarchical systems may be able to be analysed by adding rows to the matrix.

The at least one of the plurality of profiles may indicate that the respective at least one of the plurality of data elements relates to one or more alignments or cause and effect relationships between one or more of the nine cells of the matrix. Alternatively, an increased number of relationships may be accessed if more rows were added to the matrix by considering a greater number of systems levels.

Using the matrix, or transformation grid, it is thus possible to provide identification and implementation of new business solutions by facilitating insights into burning issues and sustainable solutions. A user is able to visualise other data elements (whether resources or issues or otherwise) in relationship to each other, and according to his or her own understanding of cause and effect.

Organisations, communities and groups may be represented as a series of interrelated relationships in an intricate web that make up the organisations. The use of the matrix thus enables users to identify and address underlying patterns of behaviour and thinking, as well as circumstantial and other contextual issues which are holding an individual, or a team, or an organisation back. Areas where there is much focus and attention can be quickly seen, and so too can areas where there is a lack of focus and attention.

Consequently, it is thus possible to increase clarity within strategic planning by making critical performance issues and obstacles visible. A clearer map or visual representation of relationships and, in particular, blind spots, within the organisation is brought into awareness. At this point, issues, risks, root causes, influences and blocks can be identified and addressed so that the organisational performance can be improved.

The matrix, or the systems transformation grid, may be supported by an input device, a graphical user interface arranged to display a database representing a plurality of data elements, a processor being responsive to selection from the plurality of data elements using the input device so as to provide access to a plurality of selectable discrete elements that constitute, together with the profile of the user, a basis upon which the state and layout of the database is determined and upon which the resources and key recommendations are determined. The shapes in the matrix or grid may be presented as rectangular, hexagonal or octagonal, or other similar shape.

Data elements may be grouped and clustered together according to the locations on the visual map of the matrix to which they relate (or other map or model) based on their profiles with thematic arrows linking such data elements that are related, for example by cause and effect. It is thus possible to link ideas, systems, processes, people and other resources. Such brainstorming process inherent in moving the rectangular or hexagonal polygon or octagonal polygon or other shapes during the process of clustering and linking may produce visual patterns which may facilitate the emergence of learnings, insights, practices, products, services, procedures, know-how and other transformational tools.

At least one of the plurality of profiles respectively associated with at least one of the plurality of data elements may comprise an indication that the at least one of the plurality of data elements relates to one or more of 4 perspectives of a "Balanced Scorecard", for example as described by Kaplan and Norton and other authors, which perspectives may be one of "Financial, Customer, Internal Process, Learning and Growth" or "Financial, Customer, Internal Process, Human Capital"

At least one of the plurality of profiles respectively associated with at least one of the plurality of data elements may comprise an indication that the at least one of the plurality of data elements relates to one or more of the 9 criteria of an European Foundation for Quality Management (EFQM) Excellence Model. The 9 criteria may be summarised as "Leadership, Policy and Strategy, People, Partnerships and Resources, Processes, Customer Results, People Results, Society Results, Key Performance Results".

At least one of the plurality of profiles respectively associated with at least one of the plurality of data elements may indicate that the at least one of the plurality of data elements relates to one or more of numbered or named requirements of one or more compliance, quality management, risk management, corporate social responsibility or corporate governance standard, for example ISO9001 or Sarbanes-Oxley.

At least one of the plurality of profiles respectively associated with at least one of the plurality of data elements may indicate that the at least one of the plurality of data elements relates to, adheres to or represents one or more ethical, moral, legal or cultural principles, standards or 'values'. The principles, standards or values may be organised as a hierarchy according to generality or specificity.

At least one of the plurality of profiles respectively associated with at least one of the plurality of data elements may indicate that the at least one of the plurality of data elements relates to a particular Myers Briggs Profile, or Enneagram profile or other behavioural, cultural, personality or leadership profile.

At least one of the plurality of profiles respectively associated with at least one of the plurality of data elements may indicate that the at least one of the plurality of data elements relates to one or more levels of a corporate consciousness or corporate culture model.

The corporate consciousness or corporate culture model may be the so-called "7 levels of corporate consciousness" or "7 levels of corporate culture" model as described in "Liberating the Corporate Soul" (Richard Barrett), and "A Whole Systems Change Approach to Cultural Transformation" (Richard Barrett). The seven levels of culture may be represented by words or numbers which may be one or more of: "7: Service & Social Responsibility, 6: Partnerships & Collaboration, 5: Commitment & Trust, 4: Empowerment & Innovation, 3: Performance & Efficiency, 2: Loyalty & Relationships, 1: Profit & Safety." These levels may relate to levels of evolution of consciousness of an individual, organisation or community.

The at least one of the plurality of profiles may be, or be derived from, a value or behavioural assessment. The value or behavioural assessment may be generated from a self-assessment, a survey, a 360 feedback, or by other means, for example a Corporate Culture Tools (CCT), a Corporate Values Assessment (CVA), an Individual Values Assessment (IVA), or a Leadership Values and Behaviour Assessment (LVBA) as described in: "Building A Values Driven Organisation: a Whole Systems Change Approach to Cultural Transformation" (Richard Barrett).

The at least one of the plurality of profiles may indicate that the at least one of the plurality of data elements relates to one or more of 8 levels (or more) vMemes of a Spiral Dynamics model, as described in: "Spiral Dynamics" (Don E. Beck), Each level may be represented by one or more colours, for example: "Beige, Purple, Red, Blue, Orange, Green, Yellow, Turquoise or Coral", and/or words related to the vMemes.

The at least one of the plurality of profiles may indicate a numeric rating, for example between 0 and 1000, or a word to describe the data element, according to a model of David Hawkins, as described in: "Power vs. Force" (David Hawkins).

The at least one of the plurality of profiles may indicate that the data element relates to at least one of 4 quadrants of an Integral Quadrant model, as described in: "A Theory of Everything" (Ken Wilber). The quadrants may be described by one or more of the following sets of names "Top Left, Top Right, Bottom Left, Bottom Right", or "I, We, It, Its" or "Beliefs, Behaviours, Culture, Structure". Columns of the grid may be entitled "Internal" "External" and rows of the grid may be entitled "Individual" and "Collective".

The at least one of the plurality of profiles may indicate that the at least one of the plurality of data elements relates to one or more alignments between quadrants of the Integral Quadrant model as described in FIG. 8.2 of the first edition of: "Building A Values Driven Organisation: a Whole Systems Change Approach to Cultural Transformation" (Richard Barrett). The alignments may be entitled "Personal Alignment", "Structural Alignment", "Values Alignment" and "Mission Alignment".

The at least one of the plurality of profiles may indicate that the at least one of the plurality of data elements relates to one or more of the different Pearson-Marr archetype indicators.

The at least one of the plurality of profiles may indicate that the at least one of the plurality of data elements relates to at least one standard relevant to business of a user-organisation, for example, but not limited to: PRINCE2, ISO9001, EFQM, Malcolm Baldridge, Japan Quality Awards, Sarbanes-Oxley and/or King 2.

The system may further comprise a further store arranged to store a further data element having at least one of the plurality of respective profiles associated therewith, access to the further data element being restricted.

The further data element may have been identified as having a relevance to the another profile.

The profile and/or a relationship between the profile attributes from the plurality of data elements or information associated with the data elements may constitute meta-data.

Conditional access to the further data element may be provided to the entity and may depend on one or more profile attributes of the entity. It is thus possible to create an environment of trust. A user of the system can ensure that only information that is understandable to the second user will be accessible to the second user. For example, a leading entertainer may wish to express opinions on environmental topics that are only understandable to someone of a particular Spiral Dynamics profile. An advertiser may wish to determine which version of an advertisement is accessible to which or certain users.

Restricted access to the further data element may depend upon one or more profile attributes of the data element in relation to the entity viewing the data element. For example, an advertisement may only be accessible to a user based on the element of their profile based on Spiral Dynamics and the Enneagram.

At least one of the plurality of data elements associated with (a profile or with) a data element may represent know-how or insights and which may be generated automatically or manually from the profile(s) associated with an entity and/or the value of the data element itself and or through access to data from one or a plurality of external databases or data sources.

Each data element may represent a resource, for example a coach who may match the personal profile of a user, or a movie that a user may find entertaining, or a business tool appropriate to a current organisational need of a user, A resource may generally be an action, a recommendation, an issue, an opportunity, a risk, a threat, a case study and/or a bldg. Any Analysis, Actions, Learnings, Key Recommendations or resource may be associated with any resource or tool. An analysis may be user input or program generated text, documents, presentations, spreadsheets, which may describe root causes, trends, and observations, case studies, stories, experiences. An Action may be a definition of an action program, project, to-do list, task, action or milestone which may have, associated with it one or more sub-tasks each of which may have a named person recommended and/or an analysis to indicate its expected benefits. An action may include any of the information defined for an analysis above.

A learning may be an Action or Analysis referencing specific lessons learned or experiences gained.

The current invention provides means for associating action plans, with Resources and Tools and/or with any part of the hierarchy of intent for an entity.

Each Analysis, Action and/or Learning may have a named owner.

Each identified sub-task may have a named owner.

According to another aspect of the current invention, there is provided a data fragment comprising data corresponding to at least part of a hierarchy of data, the data being combinable, when in use, with other data corresponding to at least part of the hierarchy of data so as to form at least part of a new hierarchy of data. The hierarchy of data may correspond to a hierarchy of intent. The data corresponding to at least part of the hierarchy of data may comprise at least one Resource or Resource Profile and information associated therewith.

According to a further aspect, there is provided a hierarchy of data comprising a plurality of data fragments, wherein at least one of the plurality of data fragments is selectable for inclusion or exclusion for processing when the plurality of data fragments are processed by a pre-determined process as set forth above in relation to the another aspect of the invention.

According to yet another aspect, there is provided a database of information comprising a plurality of data fragments as set forth above in relation to the another aspect of the invention set forth above.

According to another further aspect of the invention, there is provided a use of a data fragment comprising a Resource Profile and information associated therewith to provide or serve as a basis for determining meta-data for performing at least one of: a statistical operation, a search, clustering, comparison, or selection of entities and or information.

Such associated data elements may be generated by one or a plurality of users which may be experts, consultants and coaches, thereby ensuring that the system may develop collaboratively and organically based on the data elements generated by the said plurality of users. This constant refining and upgrading of information and data from a variety of external data sources and users ensures that the invention may have a constant feedback loop and may be continuously refined and developed.

Upon initial use (start-up) of the system, each user may be required to adhere to terms and conditions which may integrate a hierarchy of values, principles and obligations which may comprise ongoing legal obligations and legal relationships.

Profiles generated for organisations and for individuals may constantly evolve on account of the ongoing transformations of the said individuals. There may also be ongoing refinement of the data elements available in the system on account of the collaborative nature of the data being entered in accordance with the fourth aspect of the invention set forth later herein. As a result, information accessible to an entity may change based on their changing profile used as meta-data for selection and retrieval of relevant data elements.

The at least one of the plurality of profiles may indicate that the at least one of the plurality of data elements relates to one or more methodologies, and such data elements may be presented in a manner that reflects the relation of the data element to one or a plurality of such aspects. In this regard, a snapshot can be provided of two or more data elements in relation to each other (and not what each data element is separately) representing a complex system containing human components and structural processes, and may be a way to represent the physical substance and reality of structures and systems. This may be a representation, rather like an x-ray photograph or measurement, of an entity or a system such as an organisation or a project. It is thus possible to enable individual users to view measures as categorised by profile element, names and values thereof, for example, by the levels in the Spiral Dynamics model and/or the value or rating of each level.

The at least one of the plurality of data elements may be associated with an organisation's profile or a user's profile or with a data element that may be categorised by various selected measures. Depending on the profile, the data elements provided may be limited to those elements which the user is able easily to assimilate and understand according to that user's profile. In addition there may be further added the next level of data elements that will be relevant to the next possible or likely psychological development of the user who may therefore experience some difficulty in understanding, so that such further data elements may constitute a psychological stretch for that user. As an example, a user whose Spiral Dynamic Profile is Orange may be presented resources that are suitable to the Orange mindset or vMeme in addition to those that are suitable to the Green mindset or vMeme which may also be provided to provide the stretch.

According to a second aspect of the invention, there is provided a system enabling individuals to find, ideal employment and/or consultancy by matching their own profiles with the profiles of organisations and/or projects seeking personnel to undertake employment and/or consultancy work, the system employing the system as set forth above in relation to the first aspect of the invention. Similarly, organisations and projects may also find ideal candidates to fill positions of employment and/or consultancy by matching profiles. In this way, the purpose and intentions of organisations and individuals may be appropriately matched.

According to third aspect of the invention, there is provided a method of enabling individuals to select appropriate entertainment for themselves based on their own personal profile by employing the system as set forth above in relation to the first aspect of the invention. It is thus possible for an individual to determine which novels, films, documentaries, magazines and other popular cultural resources might be in harmony with that person's profile and provide suitable lessons, learnings, analogies, similes and metaphors, such popular entertainment items or segments thereof having been duly profiled by experts, or users, or by any other appropriate mechanism.

The plurality of profiles may be arranged to reflect a stratification of consciousness. The plurality of profiled data elements may be arranged to reflect at least one human value system, for example as noted above, resources that may be Spiral Dynamics Green may be provided so as to stretch the awareness and world-view of the user. It is thus possible to affect and change the reality and/or world-view of a user and thereby shift human consciousness of the user. The plurality of possible values for the plurality of profile models may combine to constitute a built-in model of the human psyche and/or organisational and human development. In choosing to be exposed to the knowledge contained within the system, at a level appropriate to a personal psychology of the user, and in choosing to act upon the information contained within the system, the user chooses to participate in his or her or its own personal psychological evolution. Each user's needs and abilities are unique and in choosing to act on the insights, that user consciously chooses to evolve and nurture his or her own personal development. This willingness on the part of the user thus provides a key to a process of self-awareness and self-knowledge that affects the user's interaction with the world and in particular the user's ability to work through difficult issues both personally and at work, and to achieve breakthroughs of understanding of self and of other knowledge. The plurality of recommendations and resources that relate to profiles may constitute a built-in roadmap for human consciousness and by the ability of the system to display set and maps of data elements appropriate to the personal psychology of an individual user, it is able incrementally to expand the world view of a user who will then be assisted in going beyond what that user can at that time see or understand. The system therefore facilitates "emergence" and the evolution of human and psychological consciousness through naturally predictable and predictive pathways, thereby impacting, affecting and potentially expanding the perception of the user of his or her world view. The system therefore enables individuals (and/or organisations and groups) to understand themselves and one another. It therefore also enables colleagues and organisational partners and collaborators who each see the world differently, to collaborate and work together more effectively, harmoniously and efficiently.

The at least one of the plurality of profiles may relate to an embedded experience and knowledge. The embedded experience and knowledge may be used to categorising the respective at least one of the plurality of data elements and/or measures. The measures may be associated with a number of profile attributes specified in relevant multiple world-views and models of transformation. The categorised measures may be tabulated using paper, or a computer keyboard or a computer mouse reflecting an input device, a graphical user interface arranged to display the plurality of data elements and connected to a processor being responsive to the selection from the plurality of data elements using the input device so as to provide access to a plurality of selectable discrete elements that constitute a basis upon which the state and layout of the display is determined. It is thus possible to provide an innovative and novel way of storing information. Further, this storage technique enables information to be provided, rather than merely displayed, in a way reflecting one or more of the several models of transformation and consciousness are used to profile the measures contained within a database library. In particular, a user is able to see inherent strengths and weaknesses of a relevant organisation or entity, and in addition to see what had hitherto remained hidden from the user. Additionally, the user can actively interact with a computing device to receive information in a clear visual manner that not only provides clear information according to relevant categories, but that also shows clearly what is missing (for example, where there are no data elements in a category). The user is thus able to see the limits of his or her awareness. A clear representation of blind-spots is provided together with recommendations in relation to that person's hitherto "blind spots" (areas of which the user was unaware). That user is therefore provided with an opportunity to become aware of those previous blind spots. What is hidden or missing may differ depending upon the model to which reference is made in the system, each model resulting in views of information categorised in different ways.

The user is thus able to become better able to appreciate the complexity of strengths and weaknesses of the entity or organisation under consideration.

The plurality of profiles may include one or more thereof that relate to a Balanced Scorecard model, the balanced scorecard being used as a management tool. It is thus possible to provide necessary knowledge, tools and resources to enable an organisation or an entity to adopt a project or a program, the purpose of which is either to sustain a "system" or to implement a change. The system may be arranged to implement the Balanced Scorecard model, providing at least three stages: an initial phase (1) to set goals, a secondary phase (2)

to define measures, and a third phase (3) to implement and manage. In this way, the goals of the "system" are considered, clarified and measured looking at all relevant areas of the system in order to transform. At each phase, the system permits viewing of the at least one of the plurality of data elements from a perspective of one or more models of transformation to identify areas of strength, weakness and blind spots, and then to refine the system goals, create a new set of measures and minimise the impact of the blind spots. Using the perspective of the one or more transformation models thus provides insight that enables the goals to be adjusted, and for the measures to be refined and adjusted. The model(s) of transformation therefore facilitate the necessary insight to adopt more intelligent and appropriate measures and goals related to an organisation's wellness and success, and to create better understanding and management systems, thereby leading to improved performances at all levels of the organisation or entity. The new goals and measures sustain and change the organisation or entity as required.

The system may further comprise a graphical user interface that enables, when in use, insertion of refined goals and measures for the purpose of the sustainability of the system or for the implementation of a change in the system as set forth above in relation to the balanced scorecard. It is thus possible to enable a user to identify gaps in a measurement system against specific visual attributes of the display, and then take appropriate action. Each measure may be been categorised according to the various models of transformation. The measure may then be reflected (or not as the case may be) as relating to the user or organisation and used in defining any profile created in respect of any such user or organisation. Use of the system as set forth above in relation to the first aspect of the invention in this manner permits the gaps to be visually displayed, information being fed back to the user by the scorecard measurement technique or other suitable technique. Different models of transformation ostensibly give insight into the completeness of the perception of an individual user, and use of the current invention in relation to such a model can then induce insight, as a result of which that user's perception will have expanded. Hence, by applying one or more models of transformation, identifying blindspots, and improving goals and measures accordingly to eliminate those blind-spots, it is thus possible for an organisation to sustain itself more effectively and dynamically within a whole system or alternatively to transform itself, with less risk and a greater chance of success. Furthermore, the user may then create a scorecard to manage those measures and goals and manage actions to take the necessary action. The initial phase (1) may be to set the goals, the secondary phase (2) may be to define the measures, and the third phase (3) may be to implement and manage. Subsequently, a fourth phase (4) may be provided to analyse, a fifth phase (5) may be provided to set actions, and a sixth phase (6) may be provided to determine lessons learnt (otherwise known as "Learnings"). A more sophisticated analysis enables establishment of any areas that are especially problematic and any other areas that provide particular opportunities. Each phase may further inform the subsequent phase, and with the information available (including knowledge, resources, people, links, initiatives and actions) there may be a feed-back loop, whereby the system enables the user to return to a previous phase and to inform that phase further as a result of the information generated in the later phase. In this way, users can gain oversight by reviewing multiple phases from multiple perspectives. A constant positive feedback loop thus results. For example, after a set of goals has been determined, and then measured, the goals may be reviewed with the subsequent knowledge arising from the measurement process being taken into account.

According to fourth aspect of the invention, there is provided a system according to the first aspect of the invention, further comprising a network of a plurality of computers arranged to be capable of communicating with the server to facilitate input of different goals (and measures related to goals) and/or other data to the server, wherein the different goals and/or other data constitutes respective data elements.

The system may be further arranged to enable processing and/or visualisation in accordance with any part of the first aspect of the invention at a computer of the plurality of computers of data elements provided by one or more of the other computers of the plurality of computers.

It is thus possible to permit a plurality of individuals to provide different individually defined goals and different individually defined measures related to those goals, and so individual users at their own computer may receive insights into the contributions of others' goals and measures by use of the system and then adjust his or her own goals and measures accordingly. Each user can share these insights and knowledge with others. Each user can also see all of the information provided in accordance with this aspect of the invention, thereby enabling more effectively collaboration with other users of the system.

The goals and measures of an organisation or an entity (or in relation to resources or people) that exist may or may not have been created and refined collaboratively or categorised by models by the individual users each using the graphical interfaces at their respective computers. Each phase may be reviewed from the perspective of various different models of transformation for the purposes of understanding, then modifying, then acting.

Users are thus able to refer to use of different models in order to gain both insight (while setting goals, constructing measures, implementing, analysing, setting actions or determining lessons), and further also to gain oversight by reviewing contributions of others from the perspectives of one or more different models of transformation. Consequently, by virtue of the innovative filtering provided by the system in accordance with the first aspect of the invention and the unique provision of information, an individual user can quickly gain an overview of an entire system, and can therefore improve their own contribution. The retrieval system may be based on profiles that have been created with selected visibility. As described elsewhere, a user may be permitted to receive and see information that the user can comprehend, and in addition receive and see further limited information that may initially be beyond the user's comprehension. This may be achieved by, for example, reference to the profile based upon an evolutionary profiling model, such as Spiral Dynamics. The information filtered from the data base of data elements and provided to the user is such as to be within the understanding range of their profile. By being able to observe effectively and thereby being able to control effectively, an individual can achieve a greater improvement in performance or productivity within the whole system than he or she can achieve alone, and furthermore, without risking being overwhelmed by "information overload". It is thus possible to ensure that the definition of goals and measures for an organisation or entity is greatly enhanced just as it is possible to ensure that the appropriateness of entertainment or education content is improved.

The complexity in organisational management (in both private and public sectors) is growing rapidly. The ability of an organisation to sustain itself and to manage complexity is not keeping pace with developments in the twenty first century. Management must focus (in the correct context), analyse, and take the necessary action. An organisation or entity cannot focus on part of a system, without an awareness of the whole as such an approach is inadequate, and the performance, stability and resilience of the system may be compromised by such an approach. A team that is typically responsible for managing such organisations or entities may be geographically dispersed, and may seldom meet in person. As a result there is often the risk of the "left hand not knowing what right hand is doing"—and in addition individuals "cannot see the wood from the trees", so that it may be possible that no one person may have an effective oversight of the organisation or entity. Unexpected and unnoticed issues may have deleterious or extreme consequences. Many other management systems that are meant to provide an overview of a managed system frequently fail the test of complexity.

The system is arranged to provide at least one interface to permit a manager to focus in detail and with continuous awareness of a whole system they are responsible for managing. The at least one interface may enable the manager to analyse a relevant system, review the presentation of the measures that may be filtered and provided by the system as set forth in accordance with the first aspect of the invention.

Responsible managers are thus able to understand the health, performance and stability of the system by using the perspectives of various models of transformation, and receive appropriately filtered information. Based on analysis that may be provided to the system, appropriate defined actions may also be entered into the system. The user is thus able to see measures, analyses and actions filtered by virtue of one or a plurality of the models of transformation, to obtain greater insight and better understanding of the issues facing the organisation or entity. It is thus possible to implement and/or manage sustainable transformation in a more effective manner. Users of the system can then individually work from a position where that user is enabled to see blind-spots, as well as "hot-spots" and "cool-spots" of performance through the one or more models of transformation.

The at least one of the plurality of profiles may categorise measures and attributes by means of any number of models of wisdom and transformation. It is thus possible to address challenges in many of the more complex systems or organisations or entities, namely the concern that something is missing, but without knowledge of what that might be. It is thus also possible to permit management of a system that can be tested rigorously for completeness, due to an ability to include and codify relevant information according to any number of models of transformation; the model may be in existence or to be created in the future. Consequently, a user is able to know with certainty that however many models exist or are created to give insights, that all of them can be used to manage systems, organisations and entities. The knowledge that a full analysis has been undertaken in looking for blind-spots and gaps in the design of a management system and in the implementation and operation of a management system constitutes good governance.

When a user locates a blind-spot or a recommendation to a particular area of knowledge, the system may further comprise a facility to enable the user to drill down further into the database library of measures (herein referred to as a "DNA library"). The library may have categorised information, which may include measures and other resources according to various models of transformation and subsequently to people, links and resources all of which may have been provided and listed according to a plurality of categorisations supported by the system. It is thus possible for the user to identify measures to manage by, measure a relevant issue, address it and then manage it. The user is thus also able to seek to acquire greater knowledge on certain issues raised through use of the system by linking to a global resource library containing resources shared via the internet and provided with the capabilities of the system and including content comprising (but not limited to) one or more links to various experts, know-how, tools, entities, tools, resources, consultants, networks, people, organisations and published written materials.

According to a fifth aspect of the invention, the matrix may be made, drawn, printed or represented on paper. The matrix may comprise quadrilateral elements or other shapes or polygons, for example a plurality of hexagons or octagons. The matrix may be represented, made or manufactured as a physical object from wood, plastics, metal or any other material upon which an individual may place objects or upon which an individual may physically orient himself or herself by locating himself on herself physically onto the physical object.

The profiling model may further comprise a shaped object or token for use in conjunction with the matrix. The token may be an image, or 3 dimensional object, rectangular, hexagonal or octagonal in shape, or any other suitable polygon shape. The token may be attached to an element of the matrix by magnetism or by mean a light adhesive, for example through use of a "post-it" note. The tokens representing data elements and whose characteristics may represent profiles may be moved around the matrix so as to provide insight and enable learning.

According to a sixth aspect of the invention, there is provided a method of determining the most relevant available content, the method comprising the steps of: receiving a profile constituting of meta-data; parsing a plurality of available data elements in order to identify at least one of the plurality of data elements having as greater relevance as possible to the profile, and delivering at least part of the content associated with at least one of the plurality of data elements to a recipient terminal associated with the user having such profile.

For the avoidance of doubt, reference made herein to a "measure" should not be construed in a limited manner and, where context permits, should be construed as embracing any suitable resource or data element.

It is thus possible to provide an innovative and inventive basis for building more holistic management systems incorporating multiple models for human values, archetypes and consciousness to underpin the development of resilient principled and values-based organisations and communities with particular emphasis on the principles and values of the individuals within that organisation or community so that the organisation or community can thrive in changing times and play a positive role in the larger system of which it is a part or in the global system. The system and method may serve as a global resource library which acts as an encyclopaedia for change tools with links to experience, know-how, tools, resources, people and organisations and which resource library has the ability to accommodate and catalogue any publication, media resource, change tool or program that exists now or in the future. In connecting together people including leaders, change agents, consultants and coaches with individuals and organisations with an aligned purpose, vision and values, the present invention facilitates the emergence of a global community which spans communities, cultures and perspectives, in order to understand and address personal issues with personalized solutions and systemic issues with systemic solutions, and thereby to foster positive transformation at every level from individual to global system.

It is thus possible to provide a system and method that enables the requirements of management standards and wisdom of Transformation Models to be captured within a single database or library and to be used as the basis for day-to-day business management, alongside the business goals and strategy of an organisation, with due regard to the characteristics of the individuals comprising that organisation.

A database containing a pool of resources is provided for Transformation Models for both individuals and organisations as well as coaches and consultants in order to facilitate personal, management and organisational transformation, including but not limited to, transformational tools, know-how, expertise, learning materials, processes, procedures, practices, products and services, with each resource profiled according to its content, purpose and applicability. Experts are thus able to categorise and select Resources, Users, Organisation Entities and Consultants using existing and new resource profiles. Each user, whether an individual or an organisation, and each issue acquires a profile, and has needs which are profiled, and issues have associated with them symptoms, causes, effects, tools, resources, coaches and case studies.

The database is also able to develop and be changed collaboratively and organically based on the input of multiple users who are experts in their field based on their own profiles, skills, values and experiences, so that access to the internet based site can provide a "one-stop-shop" for personal and transformational know-how and resources based on the needs and requirements of each user in respect of vision, values, performance, compliance, implementation and transformation. Access to appropriate case studies enables the user to understand challenges and solutions more clearly.

The system and method are thus capable of categorising and distinguishing information in understanding the interconnected systemic relatedness of the workings of the whole system and understanding the systems which it contains. The 9 block systems transformation grid is used by the system alongside other profiling methods to filter and organise the information with the greatest relevance to any given individual or organisation thereby bringing the relevant actionable know-how and transformative tools and resources that are most relevant to that person or organisation's transformational challenge to that person or organisation.

It is thus possible to provide a system and method that implements a framework for creating and facilitating management and organisational development processes to determine and resolve issues facing organisations and individuals; to create policies and management systems that are automatically appropriate to the profile, goals, state and culture of the organisation being managed in respect of transformation; planning, measuring performance, transformation, culture and leadership; and oversight and governance. In doing the above, the system and method stores, recombines, re-uses, evolves and hybridises expertise from multiple sources.

It is thus further possible to provide a system and method that provides users with a means for organisations to profile projects and vacant positions and for such organisations to be able to find individuals with matching profiles for such projects and positions, and similarly for individuals to seek employment or consultancy positions with such projects and employment opportunities as match with that individual's profile.

The system and method enable organisations and people to identify potential connections and facilitates synergistic knowledge sharing and collaboration to lead to learning as well as action taking. Furthermore, the system and method enable organisations and people to not only create good strategy and policy, but also to acquire the tools and resources to effectively implement policy and strategy.

The system and method enable organisations, and the individuals comprising such organisations, to become aware of the sources of conflicts. By using profiles for the organisation and for the individuals comprising an organisation, management can ensure that its team is able to collaborate. When two people or organisations can observe their different worldviews, for example expressed in performance measures recording the adherence to certain behaviours, they are more able to understand and resolve their differences. This approach may be used in the team collaboration known as "alliancing", where measure values determined by two or more partners in an alliance may be compared by each partner, the differences considered and actions agreed accordingly.

Furthermore, organisations may easily locate consultants and coaches, since such persons may be categorised or hierarchically sorted so that the system may allow users to locate people with interests, expertise and knowledge in a particular area relevant to its own needs.

Also, it is thus possible to provide a system and a method that provides users with appropriate key recommendations leading to action, and steers users away from less relevant recommendations, by filtering and sorting possible recommendations based on profiles. The profiles are not static, as the profiles are constantly evolving as people and organisations change. Recommended content is continually changing by virtue of the Database's continuous filtering and presentation of sub-set information with amended content being recommended as relevant to the user's changing profile and based on the evolving body of available resources.

The system and method also provide users with appropriate opportunities to find cultural entertainment and/or education which is most relevant and of most interest so that person shall have a degree of certainty that the choice is an appropriate one for that person. It is therefore designed to solve the problem of "information overload" relating to the availability of entertainment and certain leisure resources such as music and film, in addition to and in support of the invention's value in conscious transformation and change.

The system and method also provides organisations with the best possible means for attracting suitable individuals for positions of employment and consultancy, and provides individuals with the best possible means for finding suitable positions of employment and consultancy best suited to their skills, abilities and interests based on their profiles. Both organisations and individuals therefore significantly reduce the chances of making inappropriate choices.

At least one embodiment of the invention will now be described, by way of example only, with reference to the accompanying drawings, in which:

FIGS. 1(a) and (b) are schematic diagrams of apparatus to support at least one embodiment of the invention;

FIG. 2 is a screen-shot of a questionnaire for generation of a profile used by the system;

FIG. 4 is a screen-shot of items associated with data elements presented in accordance with the profiling technique;

FIG. 7 is a screen-shot of a user interface supporting provision of a recommendation in accordance with the profiling technique;

FIG. 8 is a screen-shot of a user interface supporting categorisation of a "how-to" knowledge item;

FIG. 9 is a screen-shot of a user interface displaying recommended reading, film category and film name based on the profile in accordance with the profiling technique;

FIG. 17 is a screen-shot of a user interface supporting provision of attributes to profile a measure;

FIG. 24 is a screen-shot of a user interface supporting further filtering through selection of DNA measures;

FIG. 33 is a screen-shot of a user interface for presenting measures according to a spiral dynamics model;

FIG. 41 is a screen-shot of measures defined from the goals of an entity;

FIG. 42 is a screen-shot of a process DNA definition template supported by a spreadsheet application;

FIG. 45 is a screen-shot of a user interface enabling DNA categorisation;

Figure 46:
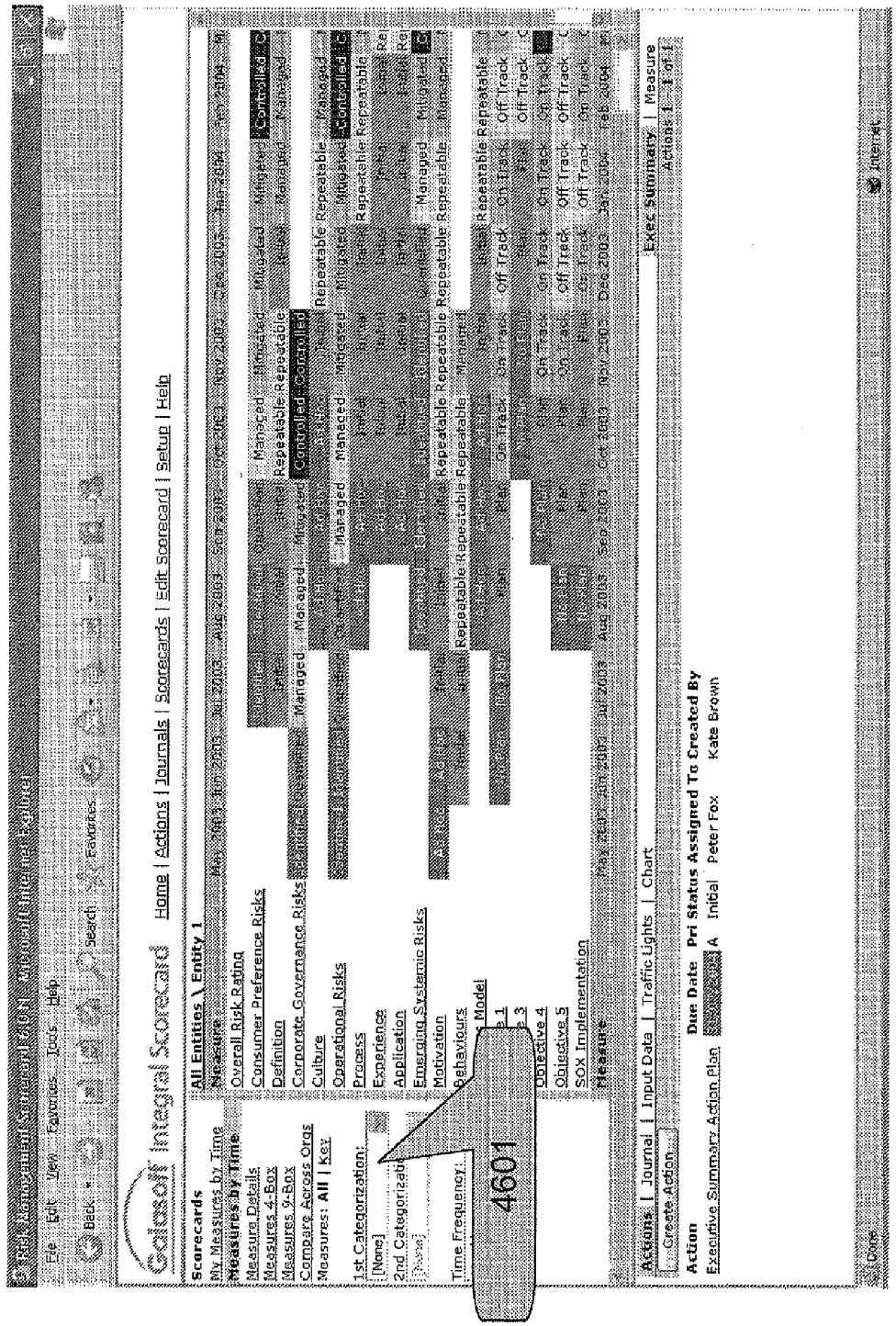
FIG. 46 is a screen-shot of measures presented in a scorecard.
Figure 50:
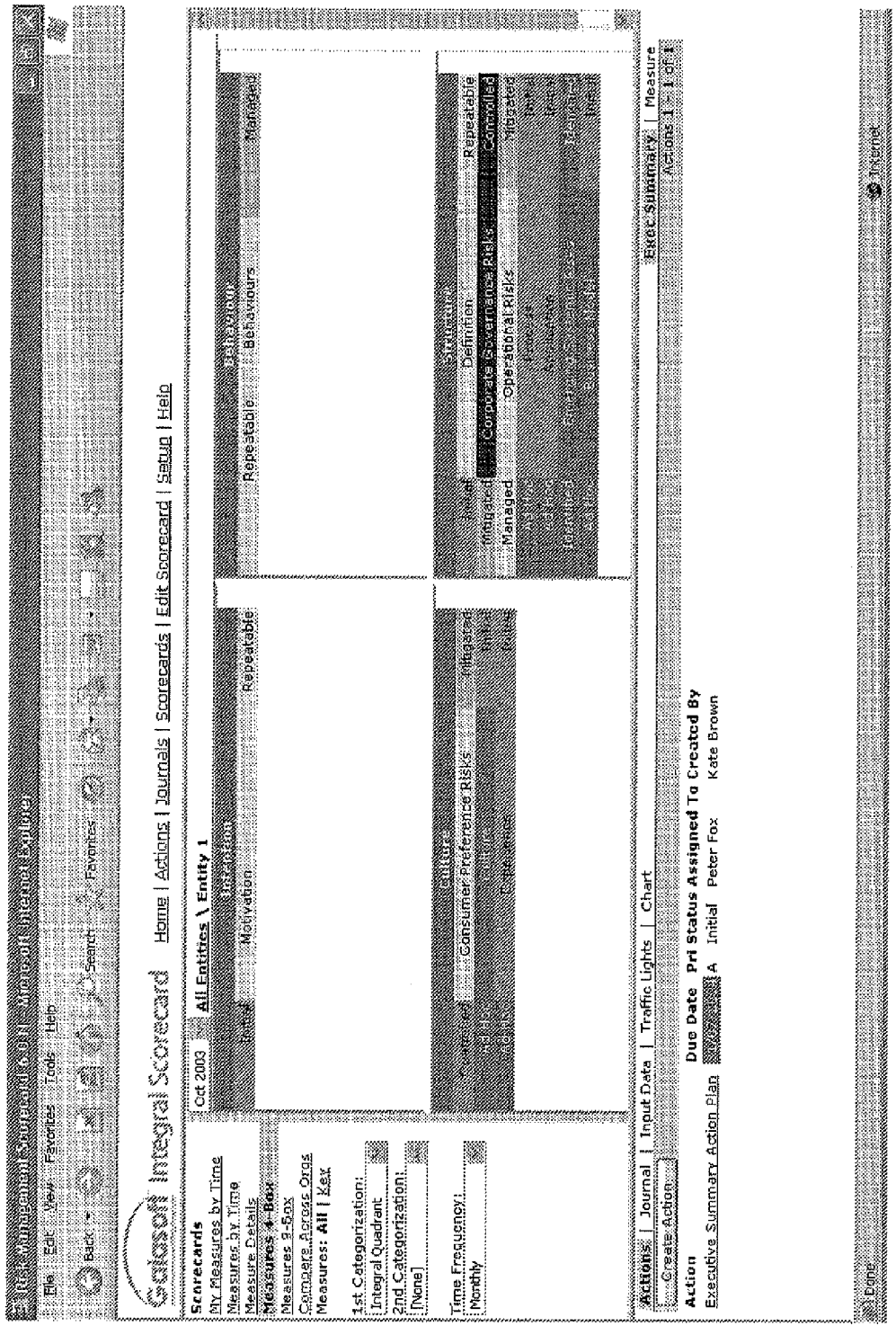
Figure 51:
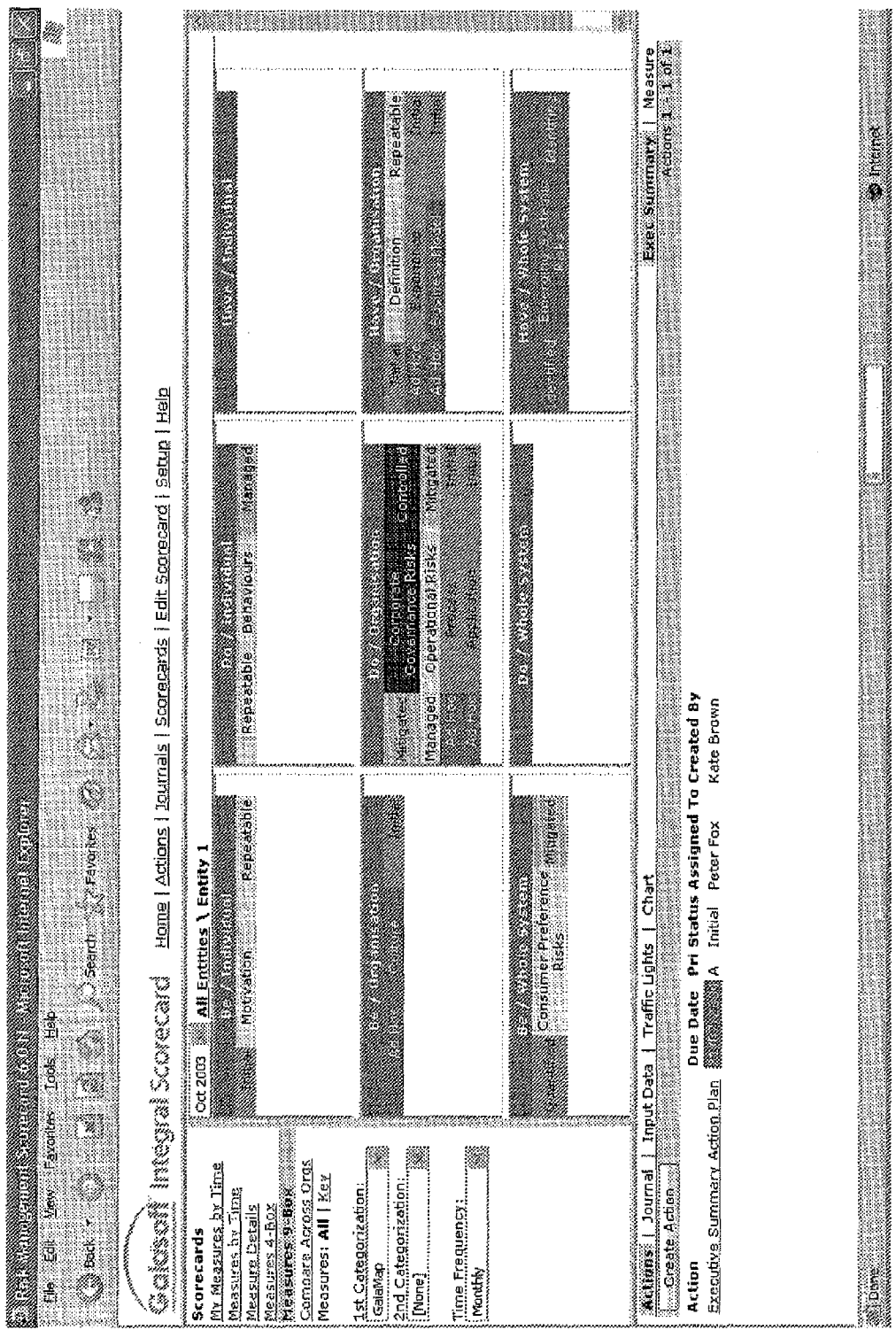

FIG. 50 is a screen-shot of the measures presented in the scorecard of FIG. 46 categorised according to an integral quadrant model and presented in accordance with the integral quadrant model; and FIG. 51 is a screen-shot of the measures presented in the scorecard of FIG. 46 categorised according to a system transformation grid model and presented in accordance with the system transformation grid model.

Figure 1A:
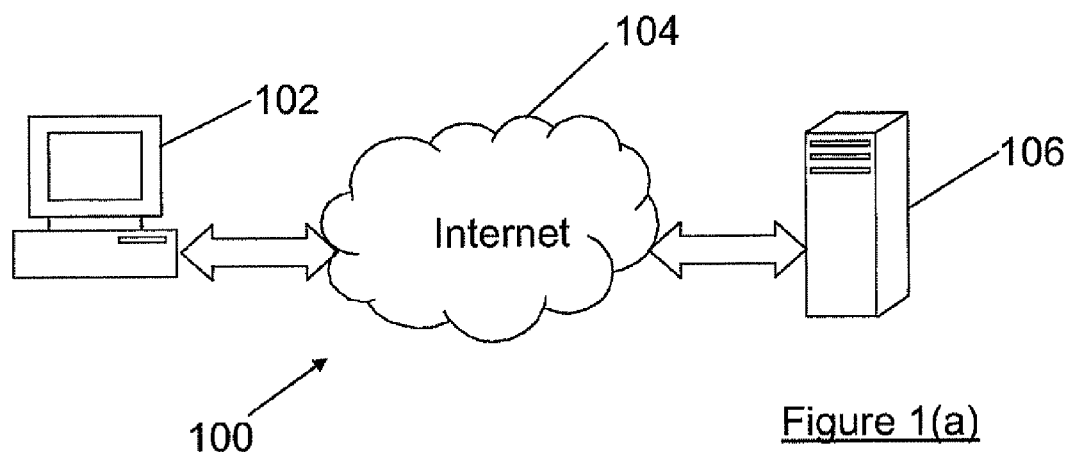
FIG. 1(c) is a screen-shot of resources or items displayed in accordance with a profiling technique supported by a system constituting an embodiment of the invention.

Referring to FIG. 1(a), a hardware configuration 100 comprises a client terminal 102, for example a computer, such as a Personal Computer (PC). The PC 102 is arranged to support a web browser application, for example Microsoft Internet Explorer.

The PC 102 is coupled to, for example, a Wide Area Network (WAN), such as the Internet 104. A remote server 106, for example any suitable server capable of storing and operating a local database is also coupled to the Internet 104. The server 106 supports an application that, in this example, uses software portal functions found in "Websphere" or "Domino" software available from IBM® together with to serve relevant web pages to the client terminal 102.

Figure 1B:
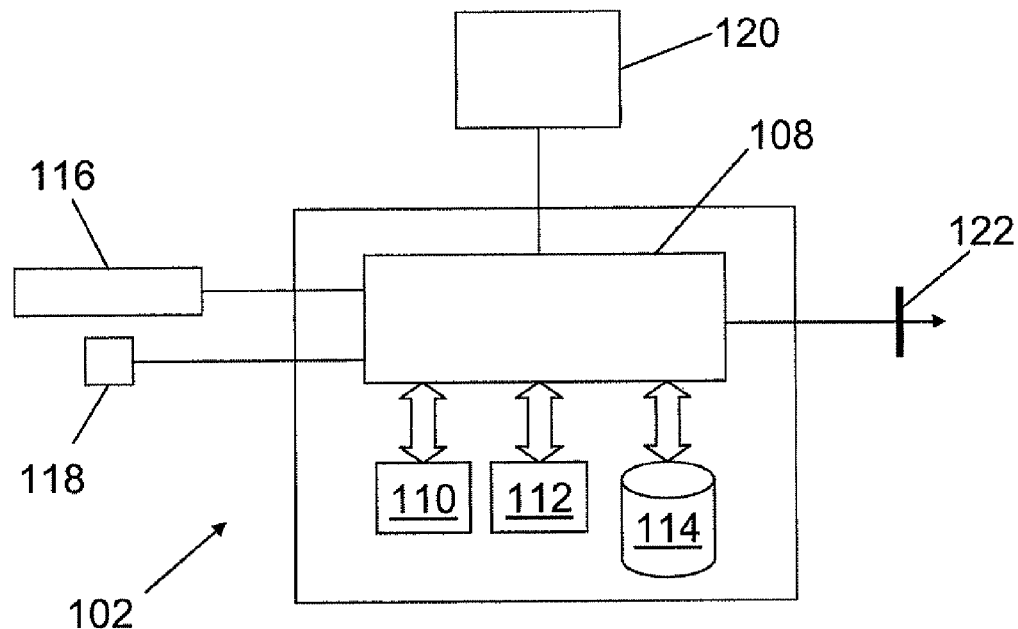

For the purposes of simplicity and clarity of description, a simple structure of the server 106 will now be described briefly (FIG. 1(b)), but the skilled person will appreciate the additional complexity of the server 106 not described herein. However, in relation to the present invention, the additional complexity is not directly relevant to the description of the present invention.

The server 106 comprises a processing unit 108, for example a microprocessor, coupled to a non-volatile memory 110, for example a Read Only Memory (ROM) and a volatile memory 112, for example a Random Access Memory (RAM). The processing unit 108 is also coupled to a non-volatile storage device, for example a hard disk drive capable of storing a database 114 and associated software, for example the application. The processing unit 108 is also coupled to a first input device, for example a keyboard 116 and a second input device, for example a mouse 118. An output device, for example a Visual Display Unit (VDU) 120 is also coupled to the processing unit 108. A communications interface 122 is also provided and coupled to the processing unit 108 as well to permit the PC 102 to communicate with the server 106 via the Internet 104.

The PC 102 is similarly structured to the server 106, but the processing power of the server 106 is greater than that of the PC 102. The PC 102 supports a Graphical User Interface (GUI) capable of displaying a number of interactive presentation layers in connection with mining the database 114.

In this example, the GUI presents data mined from the database in accordance with a 9 box presentation of data inherent within a so-called "Systems Transformation Grid" method of profiling set out in greater detail later herein. For the avoidance of doubt, this example uses only one particular profiling method/model out of a plurality of such methods, some of which are set out later below.

For change and transformation, an environment of trust is required. To create trust each user of the content delivery system must agree to abide by certain principles and values in respect of the people, organisations and resources that they encounter through their interaction with the site and by clicking on a mouse to agree to abide by these principles and values the user creates a legal framework. By entering the site and providing a profile, a user is entering into a more structured internet experience, where their purpose, vision, values and profile determine what they can see. Users can interact candidly, knowing that the information they share, while public, will only be heard by people who have a profile that demonstrates that they are able to understand.

Figure 1C:

Referring to FIG. 1(*c*), the profiling model supports a number of different types of object or entities referred to here as Items: Consultants, Issues, Observations, Organisations, Persons, Recommendations and Resources. Whenever an item name is displayed, the user can click on the item name to see a web page with details of that item. Where the user has the correct role and security rights, the user may edit the data of an item.

A symbol or icon 130 is attached to each object type. An appropriate symbol is shown depending on the nature of the object type (whether it be a person, an organisation, a resource, an issue, a consultant or other entity). The symbol can be a photo or a logo or any other appropriate sign. A participant of the system has further access to fuller information by clicking on the relevant symbol.

Turning to FIG. 2, a profile can be manually input for any data element or item, or, as in the present example, generated automatically based on responses to questions or user behaviour or other program results. The survey screen of FIG. 2 is used to profile a user or participant. This screen is configurable to allow definition of multiple profile questionnaires to define one or more profile elements which together constitute a more complex profile.

Figure 3:
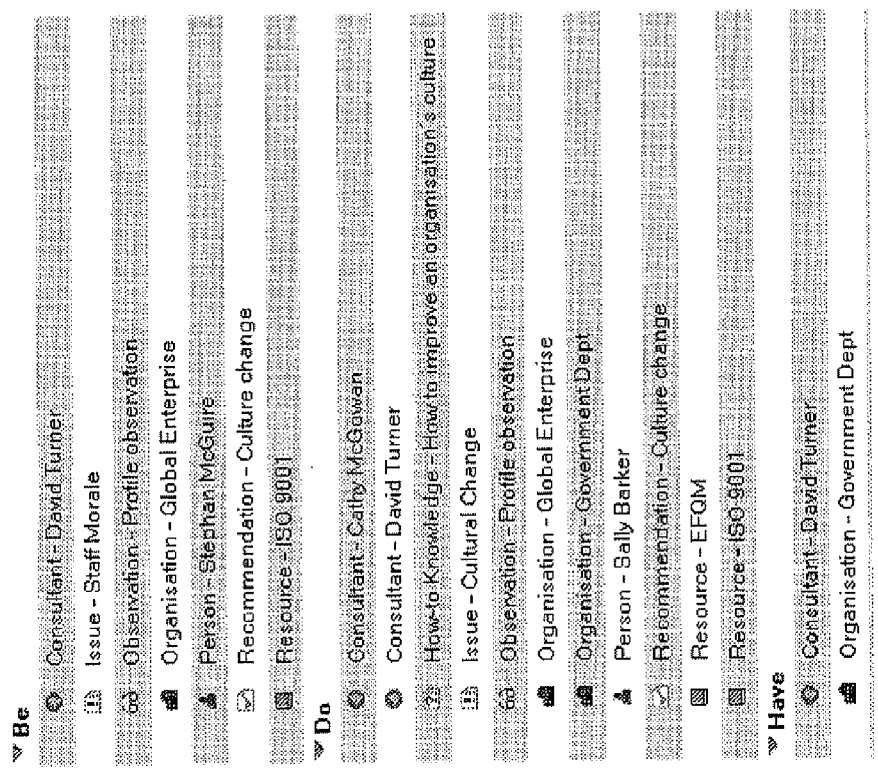
FIG. 3 is a screen-shot of results displayed to a user of a specific generated profile.

Referring to FIG. 3, in response to the answers provided by the user or participant, a Profile is generated in respect of that participant. These items retrieved are filtered according to the user's profile and the resulting subset is displayed using the layout, terminology and concepts of the Systems Transformation Grid model mentioned above. The results may be presented in several ways. One presentation of the results may be in a single column with three headings: Be, Do, Have. Each of these three headings shall have several lines of observations, insights, key recommendations amongst other data elements each line of which may have a subset of further information. Items can all be categorised according to any one of various profiles, e.g. Be-Do-Have, which is one of the dimensions of the Systems Transformation Grid.

To more fully explain the methodology behind the Systems Transformation Grid model, the elements of the 9 grid or matrix squares used by the model will now be described in greater detail hereinbelow:

A first grid element (top row, left column), which can be entitled or associated with the title: "Be/Individual", represents the inner properties, for example the mind of an individual and in particular the personal belief system of the individual. It is this inner psychology that underpins the actions and behaviours of individuals. The individual's internal issues are the starting point for looking deeply into that individual's values and patterns that automatically affect his or her behaviour. Questions that could prompt enquiry within this grid element, by way of example, could be in relation to what an individual wants or believes or values; and who that individual is being at any one time. These personal beliefs fundamentally affect the personal actions and behaviours of that individual, often quite unconsciously, which are the focus of the second grid element.

A second grid element (top row, middle column), which can be entitled or associated with the title: "Do/Individual", represents the personal actions and behaviours of an individual. This is the grid element for analysing what an individual is actually doing, and how. Questions that could prompt enquiry within this grid element, by way of example, could be in relation to how an individual behaves; and what an individual is doing or needs to do. It is the actions and behaviours which leads to the results being achieved, which are the focus of the third grid element.

A third grid element (top row, right column), which can be entitled or associated with the title: "Have/Individual", represents the results and the performance of an individual. This grid element analyses the results produced by an individual, and provides insight and observations from this perspective. Questions that could prompt enquiry within this grid element, by way of example, could be in relation to what results does an individual want; and what results is an individual producing.

A fourth grid element (second row, left column), which can be entitled or associated with the title: "Be/Organisation", represents the study of organisational culture, with a focus on what people think, why they think in that way, and a determination of what people regard as significant within the organisation. This grid element explores the hidden values, assumptions and beliefs that support or obstruct or drive strategic change, and relate to the possibility of enhancing organization commitment. An organisation's culture will determine an organisation's blockage to change, or its target for change. Cultural problems within an organisation require cultural, rather than technical, analysis. Questions that could prompt enquiry within this grid element, by way of example, could be in relation to what the organisation's vision is, what its mission is, what it values, and what is its culture. An organisation's culture will determine, often quite unconsciously, what it does and what its actions are, that are the focus of the fifth grid element.

A fifth grid element (second row, middle column), which can be entitled or associated with the title: "Do/Organisation", represents an organisation's culture in terms of what people actually do. It is here that organisations are able to look at problems in technical and functional terms. The grid element focuses on transformation and change programmes. Questions that could prompt enquiry within this grid element, by way of example, could be in relation to what an organisation needs to do in order to align with its vision, mission and values to deliver results. It is what the organisation does that determines what its results are, that is the focus of the sixth grid element.

A sixth grid element (second row, right column), which can be entitled or associated with the title: "Have/Organisation", represents the results of an organisation. This grid element relates to analysis of results produced by an organisation, and provides insight and observations from this perspective. The analysis will be in terms of systems, structures and performance. Questions that could prompt enquiry within this grid element, by way of example, could be in relation to what results does an organisation want; what actual results is an organisation producing; which structures and which systems are producing desired results, and which are not.

A seventh grid element (third row, left column), which can be entitled or associated with the title: "Be/Whole System", represents the culture of the system within which the organisation is functioning. At a macro level, the system is society in general. The grid element relates to analysis of the organisation within its context. In analysing an organisation within the context of society in general, the analysis would be in relation to society's values, culture and aspirations. A question that could prompt enquiry within this grid element, by way of example, could be in relation to societal aspirations, culture and values which drive the actions programmes and projects of the society, which are the focus of the eighth grid element.

An eighth grid element (third row, middle column), which can be entitled or associated with the title: "Do/Whole System", represents the actions of society, or the system within which the organisation is being viewed. The key analysis here is in terms of the projects, programmes, transformation and change in society (or the relevant system). Questions that could prompt enquiry within this grid element, by way of example, could be in relation to what actions are being taken by society, and what is being done to align with society's values.

A ninth grid element (third row, right column), which can be entitled or associated with the title: "Have/Whole System", represents the results of society, or the system within which the organisation is being viewed. The key analysis here is in terms of the institutions within society. Questions that could prompt enquiry within this grid, by way of example, could be in relation to what results does a society want; what actual results is society producing; which institutions are producing desired results, and which are not.

Referring to FIG. 4, data extracted or mined from the database is then visually presented by reference to a nine box grid conforming, in this example, to the systems transformation grid described above. Consequently, all the data elements stored in the database 114 are categorised according to the nine box grid model with results that may be presented through the nine boxes. Data elements comprise and represent, but without limitation, a person, an organisation, a resource, an issue or a consultant. Each data element may be contained in one grid box or more.

As suggested initially above, items can be displayed according to a number of screen layouts based on different models. However, in the present example, the 9 box grid of the Systems Transformation Grid model is employed. Data elements can be placed according to manually input profiles or automatically generated profiles.

When the user clicks on "How to Improve a Person's Value Match" 401 they are taken to a screen for that Item.

Figure 5:
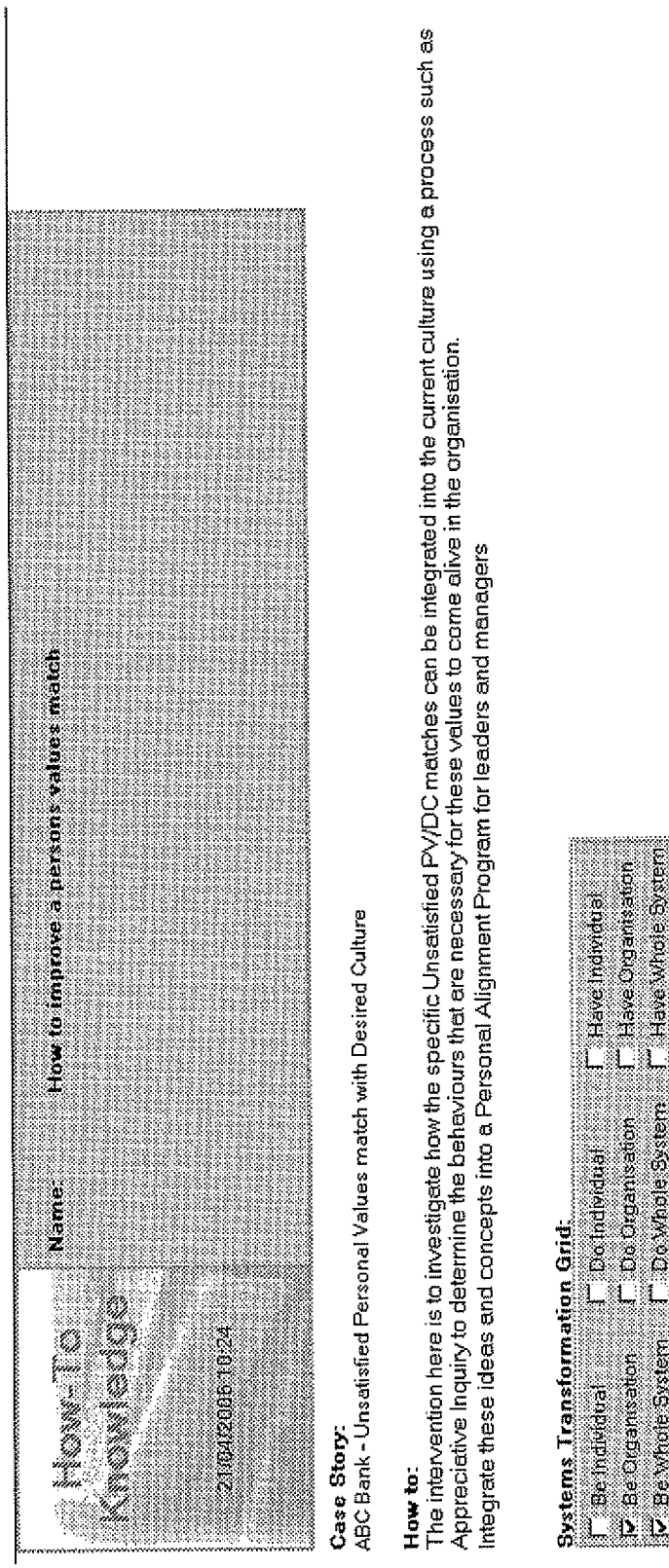
FIG. 5 is a screen-shot of a user interface for editing and manually profiling a "how-to" knowledge item.

When retrieving data elements from the data base 114, data elements referred to here as items are displayed with titles and symbols. Each item can be categorised by the user or by a program according to various profiles. In FIG. 5, the profile of the data element or item (a "How-To Knowledge" item) is manually entered based on the 9-box model of the Systems Transformation Grid. The user can define the correct categorisation by clicking on the radio buttons (501). It should be noted that the categorisation is a matter of judgement.

Figure 48:
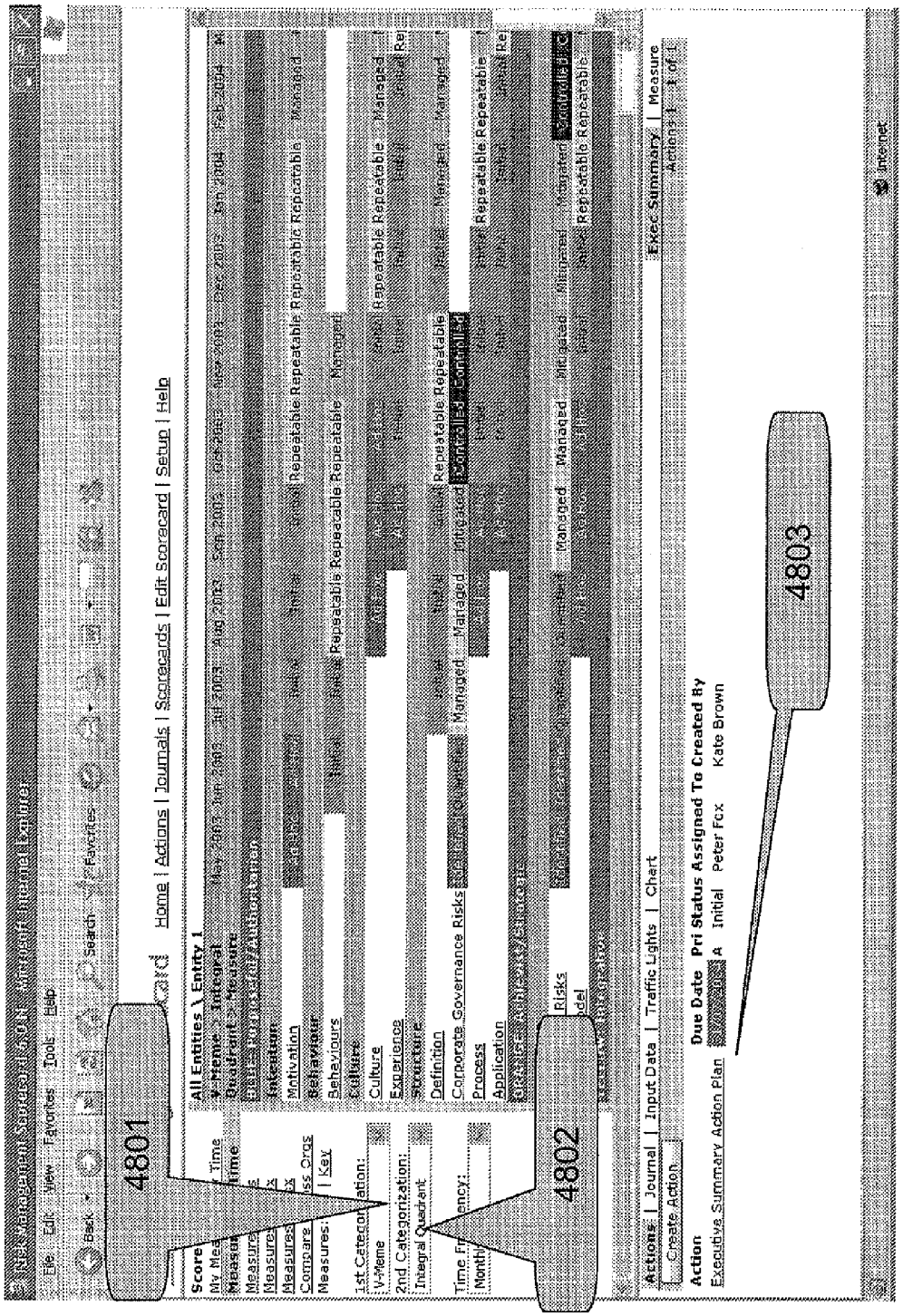
FIG. 48 is a screen-shot of the measures presented in the scorecard of FIG. 46 categorised according to a spiral dynamics model and an integral quadrant model and supporting addition of an action.

The present example includes the Integral Scorecard software which is commercially available and therefore will not be described in detail. Information may be retrieved after due filtering and displayed in a colour-coded indicator display or scorecard. One or more measures can relate to values of individual and organisation and hence a measure of "Be" for the "Individual" and the "Organisation". The measures are displayed in the "Individual Be" and "Organisation Be" boxes of the 9 box model of the Systems Transformation Grid. Measures may be numeric, based on maturity models or surveys. FIG. 48 shows a typical Integral Scorecard display of indicators. FIG. 51 shows information in Integral Scorecard display showing indicators arranged according to the Systems Transformation Grid.

Figure 6:
FIG. 6 is a screen-shot of a user interface supporting provision of an observation in accordance with the profiling technique.

At the bottom of the Integral Scorecard Screen are various options allowing the user to click to display supplementary information relating to an indicator. FIG. 6 shows Observations related to an indicator, accessed by clicking on the indicator and then on the Expertise Tab, (For simplicity, only the bottom frame of the Integral Scorecard display is shown and not the coloured scorecard display.) The information retrieved is also, in this example, information relevant as a management tool, for example, an action associated with a selected object, an observation associated with a selected object, or a recommendation associated with a selected object.

Observations can be related to specific measures, for example a Values Match measure of organisation culture, and profiled according to the Systems Transformation Grid model. Recommendations can be captured as Interventions related to an observation. The observation is accessible from the Integral Scorecard Screen by clicking on the 'Expertise' tab in the lower frame (FIG. 6).

Figure 7:
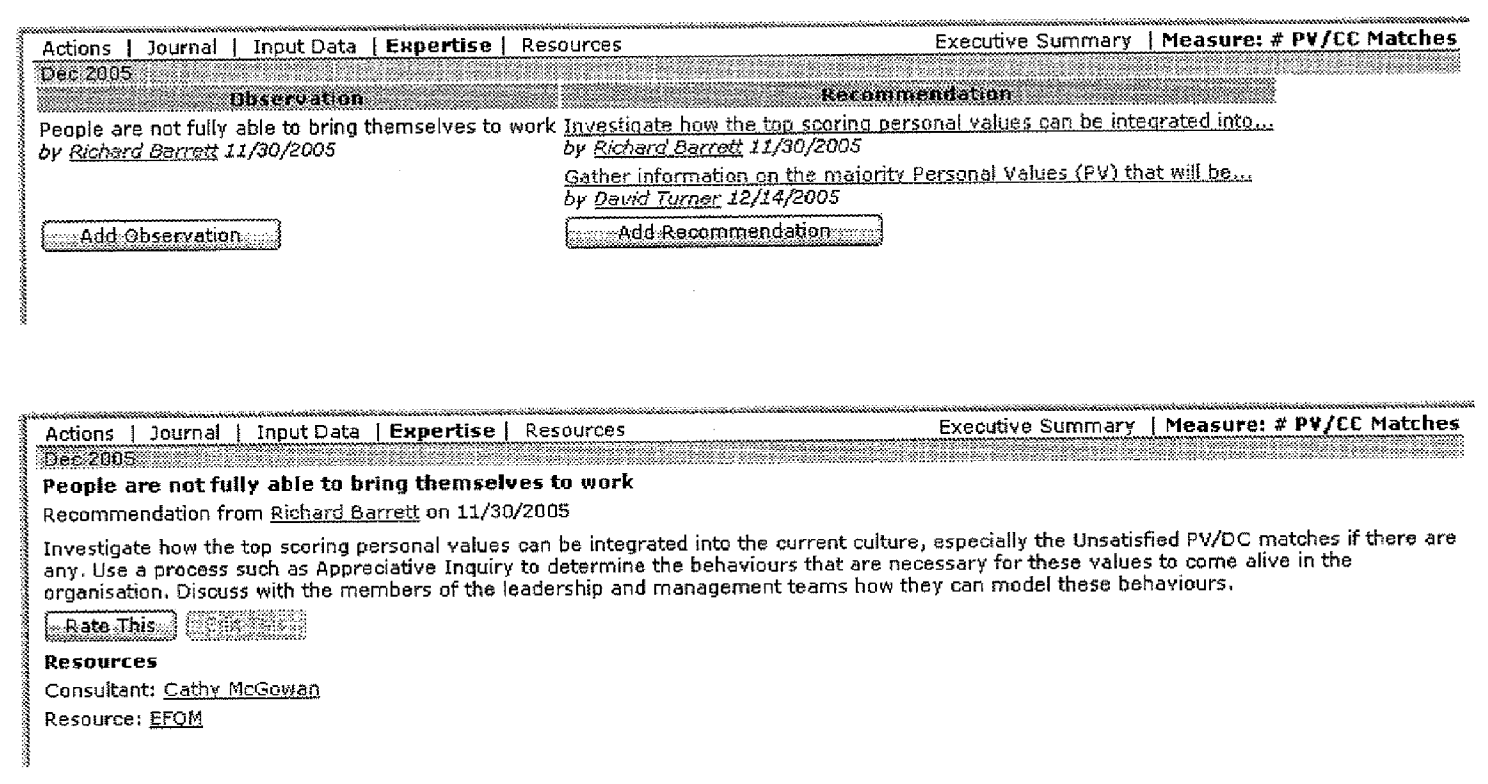

Recommendations can be captured as Interventions related to an Observation, for example a Values Match measure of organisation culture, and profiled according to the Systems Transformation Grid model. A recommendation can be accessed by clicking on the hyperlink to it in the right column of the 'Expertise' tab in the lower frame of the Integral Scorecard (FIG. 7).

Turning to FIG. 8, the How-to Knowledge item shown is categorised as a "DO ORGANISATION" Intervention in the Systems Transformation Grid model.

Each of the observations and recommendations described above have been, in this example, added to or improved upon by collaborative experts, i.e. a network of computers have been provided with access to the database 114 in order to contribute data elements to the database 114. In this way, the profiles and results are liable to change from day to day. The characteristic of a feedback loop emerges since profiles are constantly changing based upon experience and as the community of users and experts using the invention develops.

The above elements described in this example demonstrate how the entire database is organised and/or presented. However, based on a participant's profile and needs, only a limited amount of the information contained in the database 114 need be actually shown to the participant. What a participant sees is based upon his or her profile, the organisation's profile, the resource's profile, the consultant's profile, and the relevant issue's profile, i.e. a level of filtering and access control is implemented in this example.

In a second embodiment, profiling results in a character assessment and recommendations of entertainment, a profile is computed from the various inputs of the user to the system for example as described in the previous embodiment. For the avoidance of doubt, this example uses particular profiling method out of a plurality of such methods available now and in the future.

Consequently, a participant completes the profile method by providing various inputs. A profile is then generated based on the information provided and entertainment recommendations are made based on the profile.

The profile generated is used to determine, for example, movies or other resources that are particularly compatible or aligned with the profile of the user. In this respect, an Expert rates the resource as appropriate to particular Life Purpose profiles. As an example, a primary categorisation might be: 1 Autobiographies; 2 Romance; 3 Humour; 4 How to manuals; 5 Adventure; 6 Literary Classics; 7 Metaphysical; 8 Art House; 9 Documentaries. In FIG. 9, the user is profiled with profile number 5 and a film related to Adventure is recommended and the example "Indiana Jones and the Temple of Doom" is particularly recommended.

In a third embodiment, the database 114 constitutes a library of embedded knowledge and expertise sources, and is organised as a "Transformation DNA" Library in this example. Data elements constituting results are obtained by mining the database 114 by reference to a measures profile linked for use in accordance with the Balanced Scorecards methodology. Herein, the expertise of embedded expertise and knowledge linked to performance indicators and transformation indicators is described as "DNA" and is not to be confused with a like acronym in the field of molecular biology.

Figure 10:
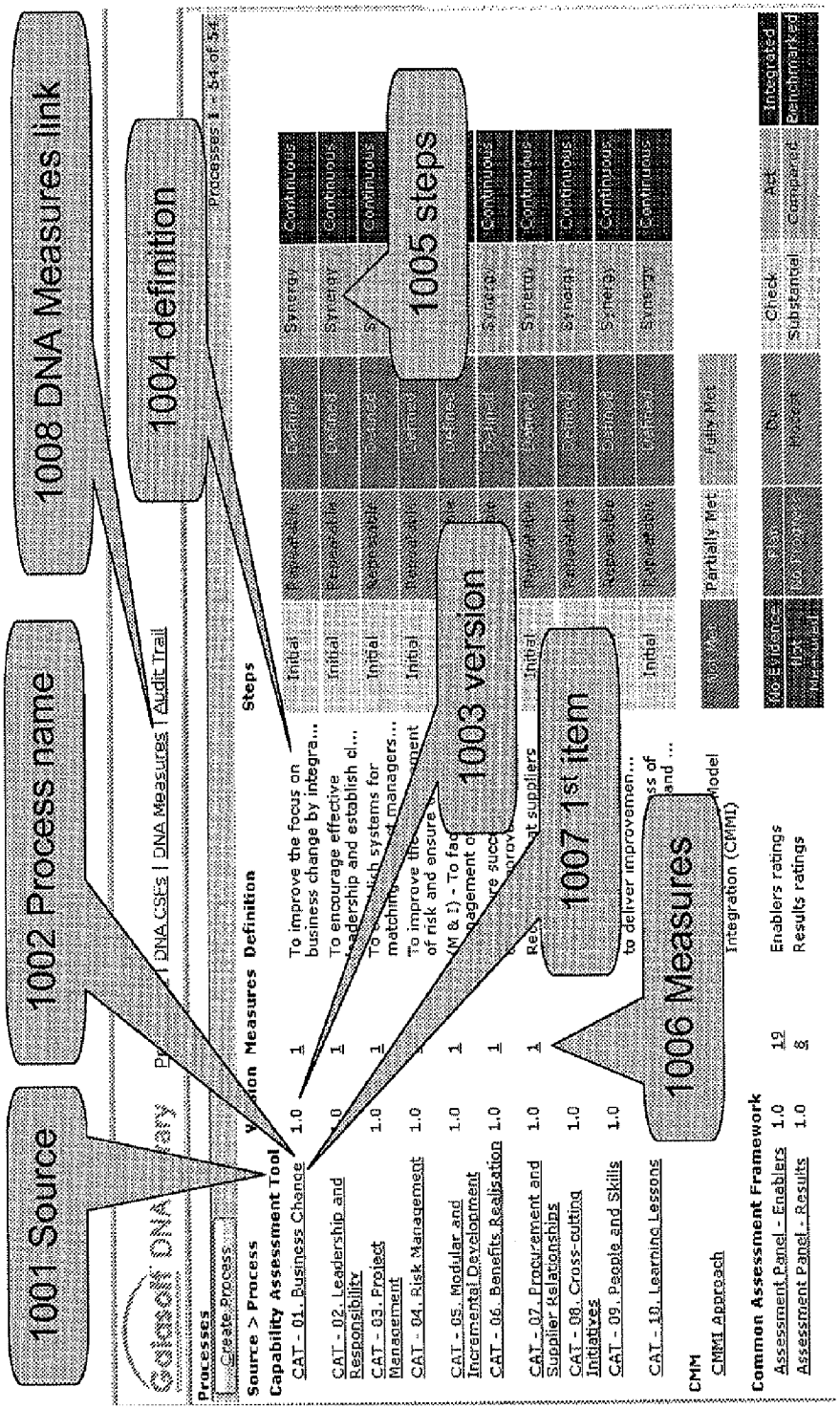
FIG. 10 is screen-shot of process in a process DNA library.

Referring to FIG. 10, an approach used increasingly in business and in particular business improvement and quality management is the so-called "Capability Maturity Model", where a body of expertise or achievement of excellence is broken down into a number of areas. In each area of business improvement, the assessed organisation is rated (frequently by self assessment) according to levels, by reference to a number of check-lists or tests. Because these assessment models can be used to store the vital know-how, elements of the blueprint of success, they are compared in the content delivery system to DNA as defined herein. Due to the functioning of organisations and the way in which organisations transform can be described in processes, these maturity models are referred to as "Process DNA". The product providing a database of such process DNA is known as the DNA Library.

As used herein, DNA can be thought of as a pattern library for life, carrying the blueprint of good practice, the pattern of life. By analogy with DNA in the molecular biology sense, cells and organisms repeatedly 'unfold' the complex structures of life, dependably, time after time. The DNA pattern as used herein is continuously improved through generations by inter combination and natural selection—to achieve increasing levels of performance and/or specialisation. The current figures show an invention that allows organisations, businesses, governments, communities to store, recombine and use the DNA of excellence for their survival and function. The DNA constitutes a performance indicator definition, which performance can be a numeric, a step-by-step, or a maturity model or survey and can have associated therewith one or more resources that can be observations, recommendations, and/or case studies.

Individual elements of 'Process DNA' store expertise or know-how in one or more particular areas. A library of expertise is stored as a library of Process DNA. How Process DNA is created, selected for use in a management system, combined with other Process DNA in the management system will be described hereinbelow. The skilled person should appreciate that process DNA can be versioned and improved, with improvements shared between organisations.

Referring to FIG. 10, a screen showing a library of such expertise in the form of Process DNA comprises, for example, know-how of a process that is defined by an Expert and entered into a process DNA document, the process is displayed in this view with other Process DNA categorised by it's Source 1001. The process name 1002, version 1003, definition 1004 and steps 1005 (with colours) are displayed. The user can click on a link to the measures which use a process is provided in the 'Measures' 1006 column.

Figure 11:
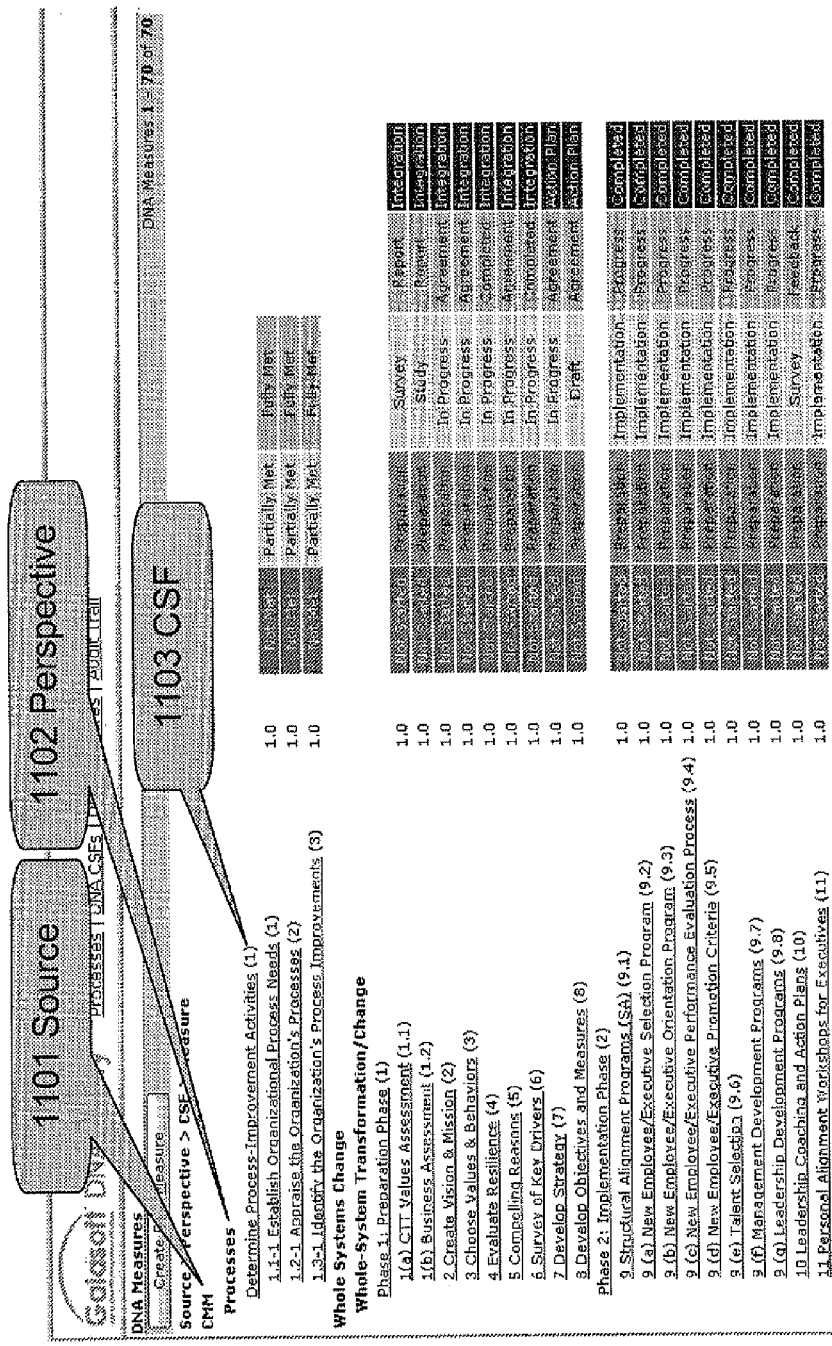
FIG. 11 is a screen-shot of process DNA measures categorised according to different elements of a profile.

Process DNA steps (or levels) can be defined in textual or numeric values. In this example, textual examples are used. The first listed item of Process DNA is 'CAT-01 Business Change' 1007. By clicking on DNA Measures 1008, the user accesses the web page to enter DNA measures (FIG. 11). In this respect, DNA Measures are stored in the DNA Library from where they can be loaded into the management system of a particular organisation as a blueprint for the transformation and performance of that organisation. In particular, the Process DNA Measures are loaded into a scorecard to be used in the governance, strategy implementation, program and project management, business performance measurement, monitoring and management processes of the organisation. Each measure is linked to a specific DNA Process, the steps, of which, are displayed in this screen of FIG. 11. In this example, the DNA is categorised and retrieved based on many different models for business improvement.

In this example, the DNA Measures are categorised according to the Perspectives, Critical Success Factors (CSFs) used in Performance Management and the Balanced Scorecard methodology. The Measures are categorised by Source 1101, from where or by whom the measure was defined originally, by 1102 Perspective and then by 1103 Critical Success Factor.

Figure 17:
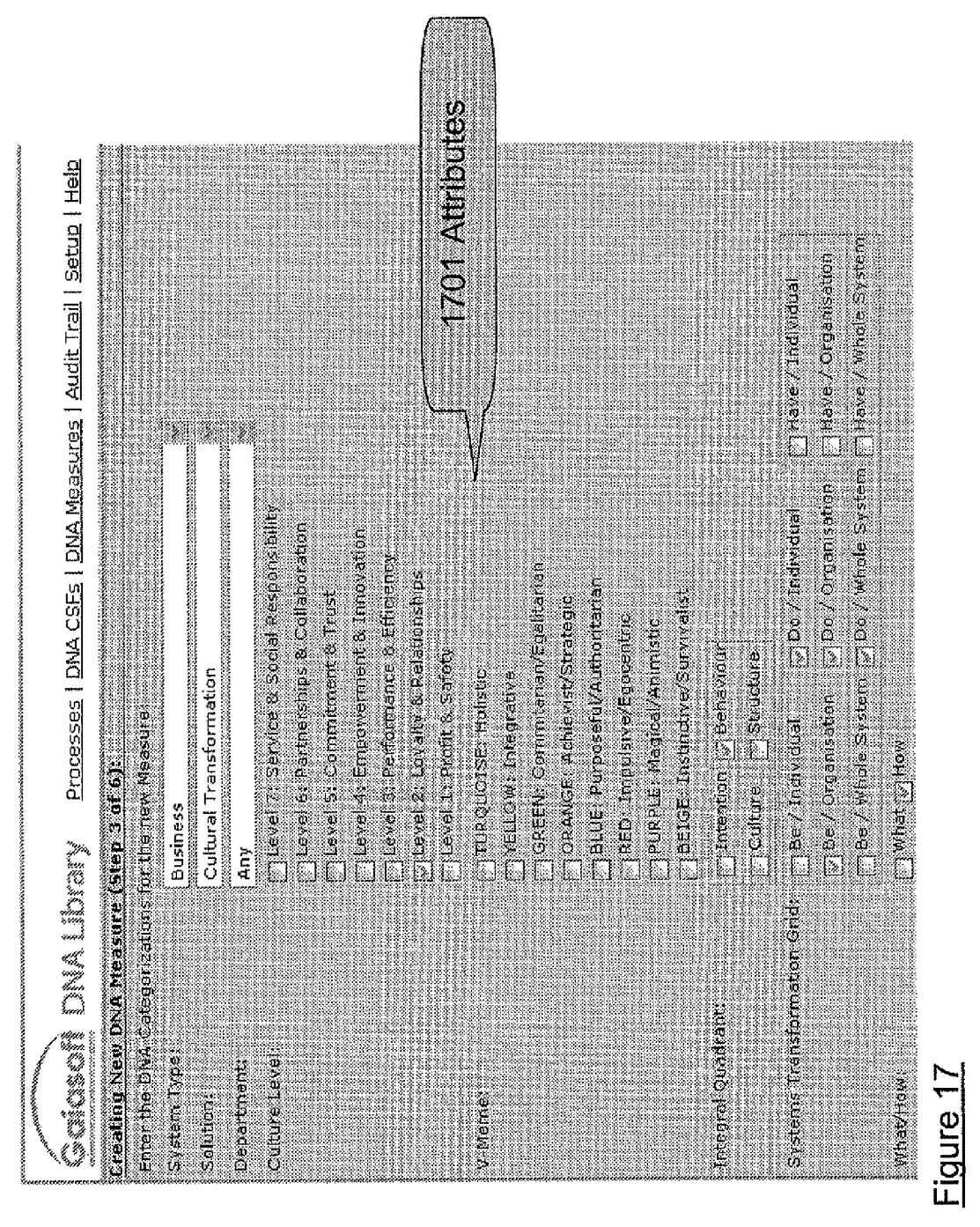

Each DNA Measure has a profile based on a number of different models and can be displayed categorised according to a number of attributes from these different models used in the Library (FIG. 17).

Figure 12:
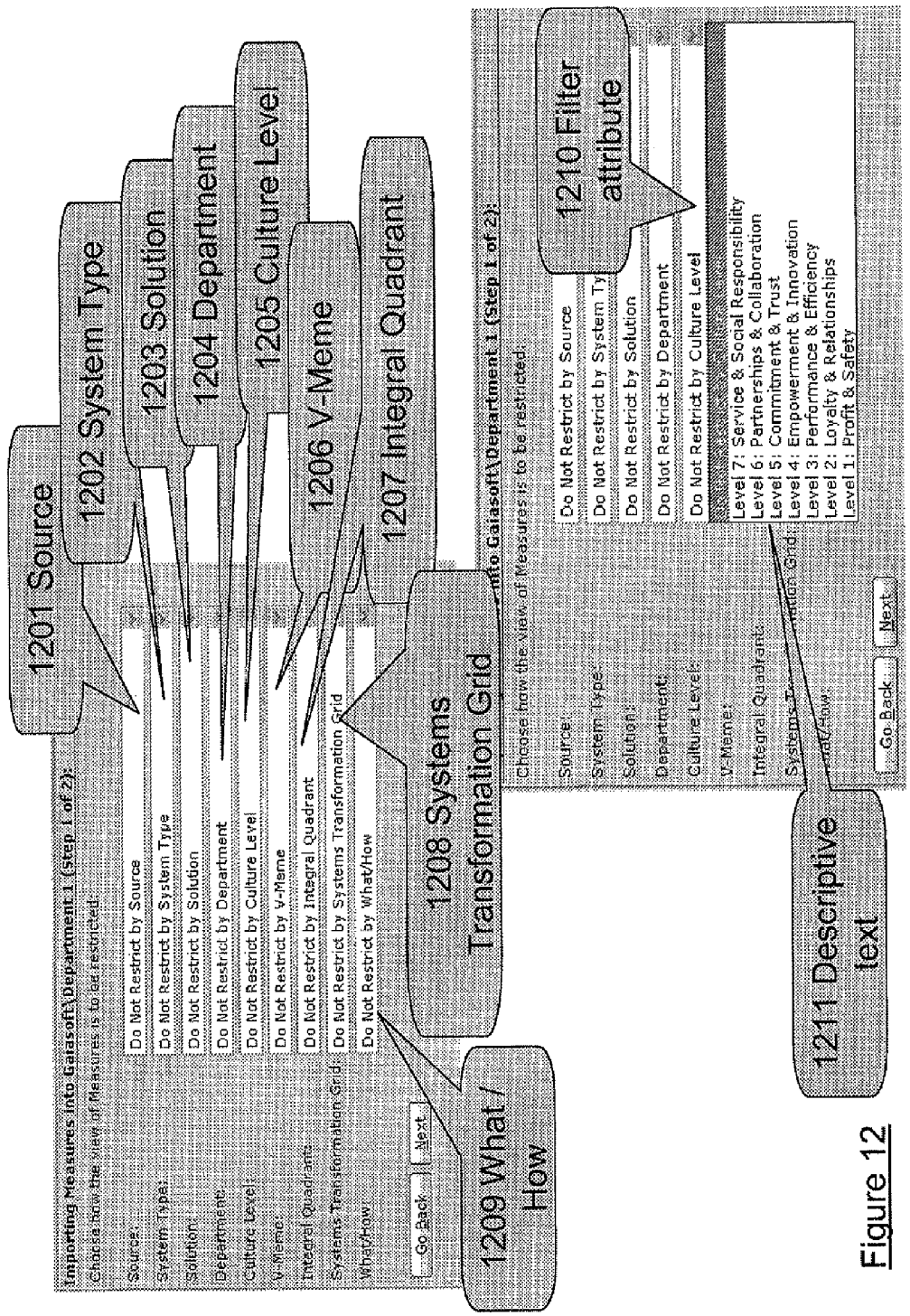
FIG. 12 is a screen-shot of a user interface to supporting filtering of DNA measures.

Turning to FIG. 12, the DNA Measures can be incorporated into the Integral Scorecard functionality provided by the content delivery system by clicking on the 'Import Measures' button. The DNA library can be used both within organisations and as a global resource pool of expertise in transformation and performance.

As there is a growing body of DNA Measures available, to be useful, organisation development specialists select the appropriate DNA Measures for their needs, according to the approach taken by the organisation or "system" that is being developed or transformed.

The web forms of FIG. 12 are used to filter the available DNA Measures for incorporation into a scorecard based on their profiles. The filter criteria can be extended if desired to include any relevant profiling method, in particular those used to support a whole systems change approach. The user is presented with a number of attributes by which the Measure DNA can be selected or filtered. In this respect, the "source" field 1201 is used to filter according to where the origin of the DNA, for example by model or body of best practice. The "system type" field 1202 is used to filter according to the kind of system the DNA is for, for example: a person, a business, a government, a community, a city, a region and/or a nation. The "solution" field 1203 is used to filter according to the business solution to which the DNA belongs, for example: a collection of DNA organised to meet a particular business need, such as: "Program and Project Management", Business Compliance or Cultural Transformation. The "department" field 1204 is used to filter according to the organisation functional department to which the DNA measure is relevant. The "culture level" field 1205 is used to filter according to the level on a 7 Levels of Corporate Culture model to which the DNA measure is relevant. This model extends the concepts of Maslow to organisation culture, showing a hierarchy of values that a healthy and successful organisation must have. Using this filter is a way to select DNA measures that are relevant to a particular level of culture.

The "V-Meme" field 1206 is used to filter according to the level or as written in the literature, vMeme from a Spiral Dynamics model to which the DNA measure is relevant. This indicates the predominant mode of thinking and motivations of a "system" and hence what transformation approaches are relevant to the organisation. The "integral quadrant" field 1207 is used to filter according to a quadrant of the Integral Grid (Individual, Internal), (Individual, External), (Organisation Internal), (Organisation External) to which the DNA measure is relevant. The "systems transformation grid" field 1208 is used to filter the DNA measures according to one of the 9 boxes of the Systems Transformation Grid model or 9 box model. The "What/How" field 1209 is used to filter according to whether the DNA defines What is to be achieved or How it is to be achieved.

By clicking on a particular filter attribute 1210, the user can select to filter on that attribute. In this example, the available Culture Levels 1-7 are listed along with descriptive text 1211. It should be noted that the content delivery system provides a framework for profiling of Process DNA including DNA Processes and DNA Measures and for inclusion of measures into management systems. The web form of FIG. 12 is used to filter DNA Measures so that only relevant measures are presented ready for selection. Each option represents a set of attributes for a system type or transformational model, as an example. The user can select no attributes or one attribute of one or more options.

It should be noted that the content delivery system is multi-user and password protected using well known features provided by IBM Lotus Domino. By using these multi-user features, different people and experts can create Process DNA and DNA Measure which can then be shared with other people and organisations based on security rules. This has important implications for the speed with which organisations can learn and innovate and respond to change. By sharing and recombining innovations (stored in Process DNA) organisations can rapidly incorporate improvements. When upgrades to DNA are propagated into organisation management systems, the functioning of the organisation is consequently upgraded too. The use of Lotus Domino enables all databases to be replicated, if desired, across multiple servers and client terminals, for example client computers and/or mobile devices.

Also, by using the replication and selective replication capabilities of IBM Lotus Domino, the DNA created by one person or organisation on one server may be replicated to or mirrored on another physical server and database and vice versa, allowing propagation of some or all of the contents of the DNA Library between organisations (legal entities) and locations (physical servers and databases). This has important implications for resilience, for example, ensuring that a knowledge library or blueprint is continuously maintained and backed up in multiple locations.

Figure 13:
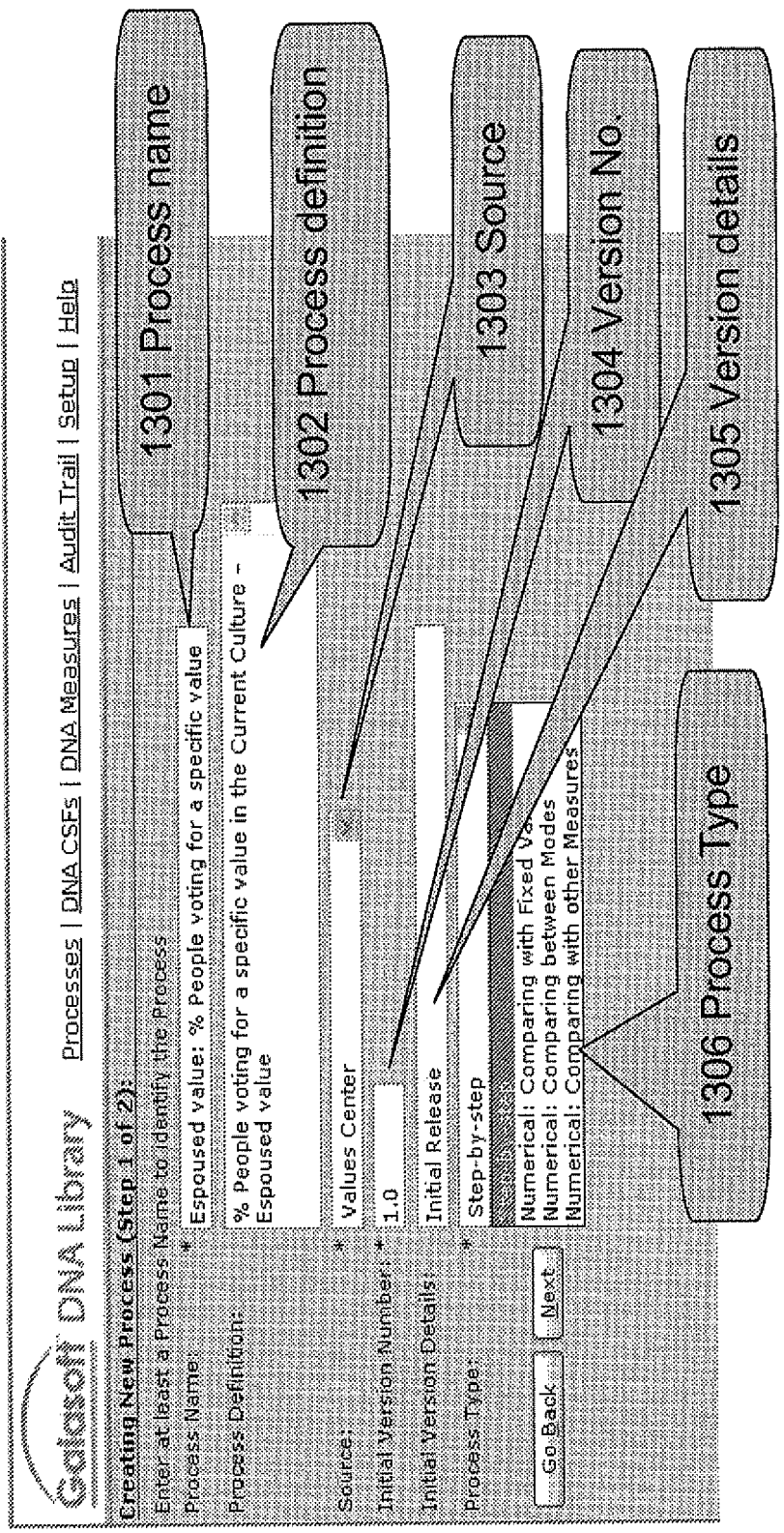
FIG. 13 is a screen-shot of a user interface supporting the first step of creation of a DNA process.

Referring to FIG. 13, process DNA is created by an Administrator who has the right security rights. The Administrator clicks on the 'Create Process' button to open the "screen" of FIG. 13. A "Process name" field 1301 is used to provide a meaningful name for the process DNA, and the following remaining fields are also completed: a "Process definition" field 1302 to record details of the process, a "Source" field 1303 to specify from where the DNA came (for example, what model or body of best practice is being employed), a "Version number" field 1304 to specify an initial version number, subsequent versions of the process DNA, a "Version details" field 1305 to provide a brief description of the version number previously provided, and a "Process type" field 1306 to define the process DNA as: "Textual step-by-step" or "Numerical".

Figure 14:
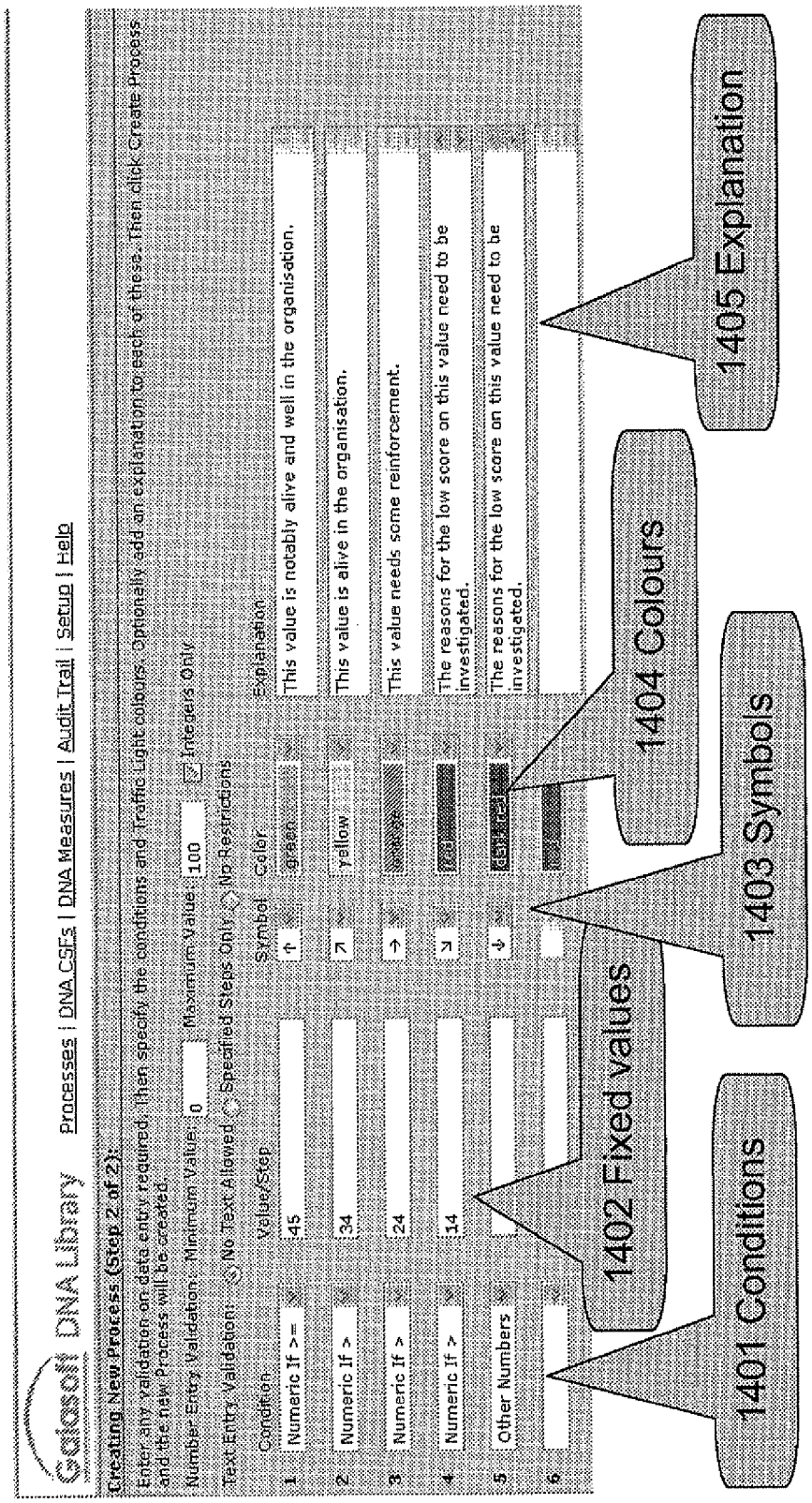
FIG. 14 is a screen-shot of a user interface supporting the second step of creation of a DNA process.

Referring to FIG. 14, the "screen" presented subsequently depends upon which 'Process Type' option that was selected in the previous screen of FIG. 13. In this example, conditions 1401 are used to compare scorecard data with a fixed value 1402 stored in each row to obtain a desired traffic light colour 1404 for the data cells when displayed in a Scorecard. A symbol 1403 can also be chosen. An explanation field 1405 holds text that gives meaning to the resultant colour.

Figure 15:
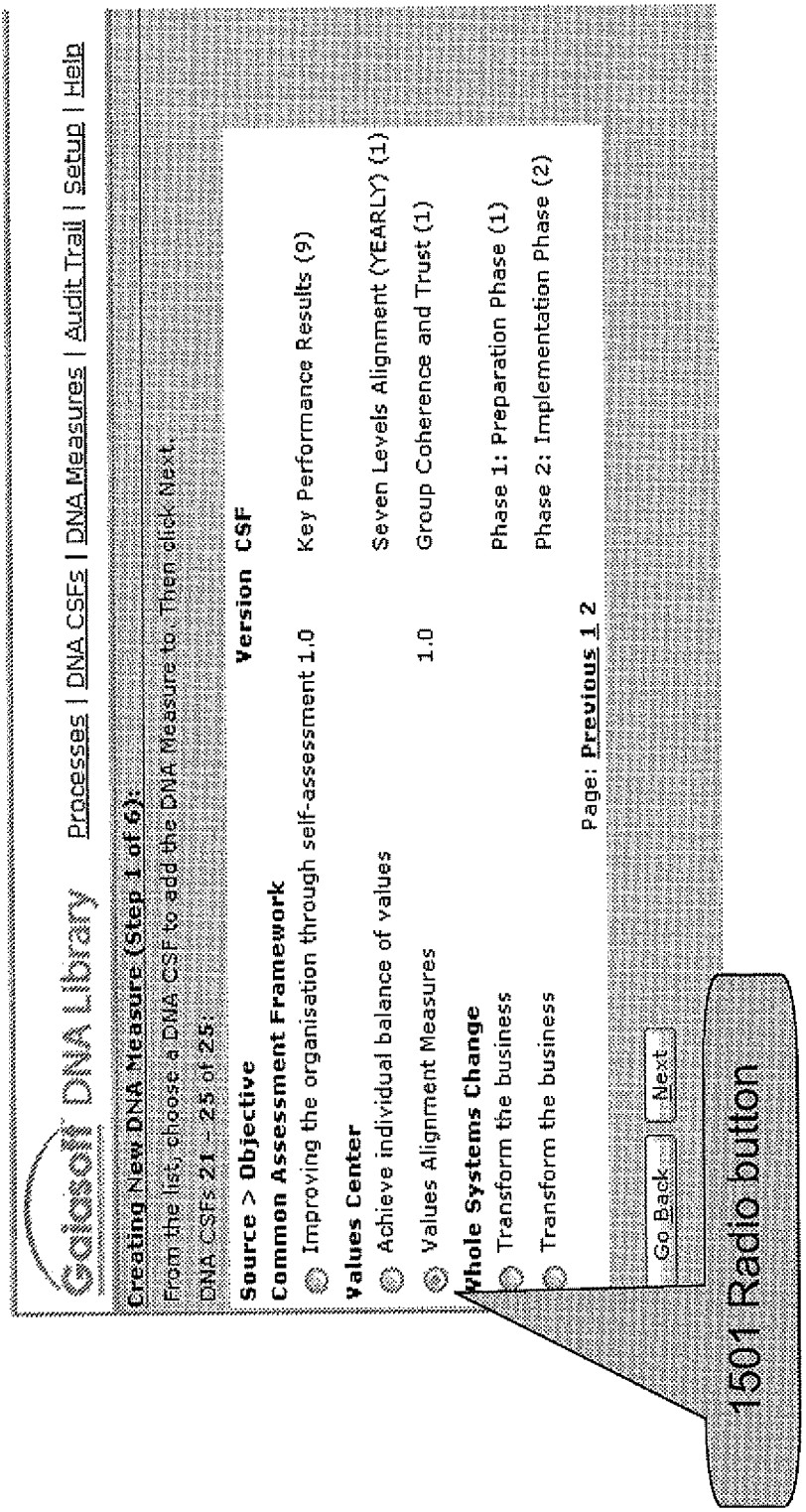
FIG. 15 is a screen-shot of a user interface supporting selection of a critical success factor.

Turning to FIG. 15, a DNA Measure is created as follows. Firstly, a first web form is used to choose a Critical Success Factor (CSF) according to which the DNA measure is to be categorised. A list of previously created CSFs is presented to the user, a CSF being selectable by checking the radio button 1501.

Figure 16:
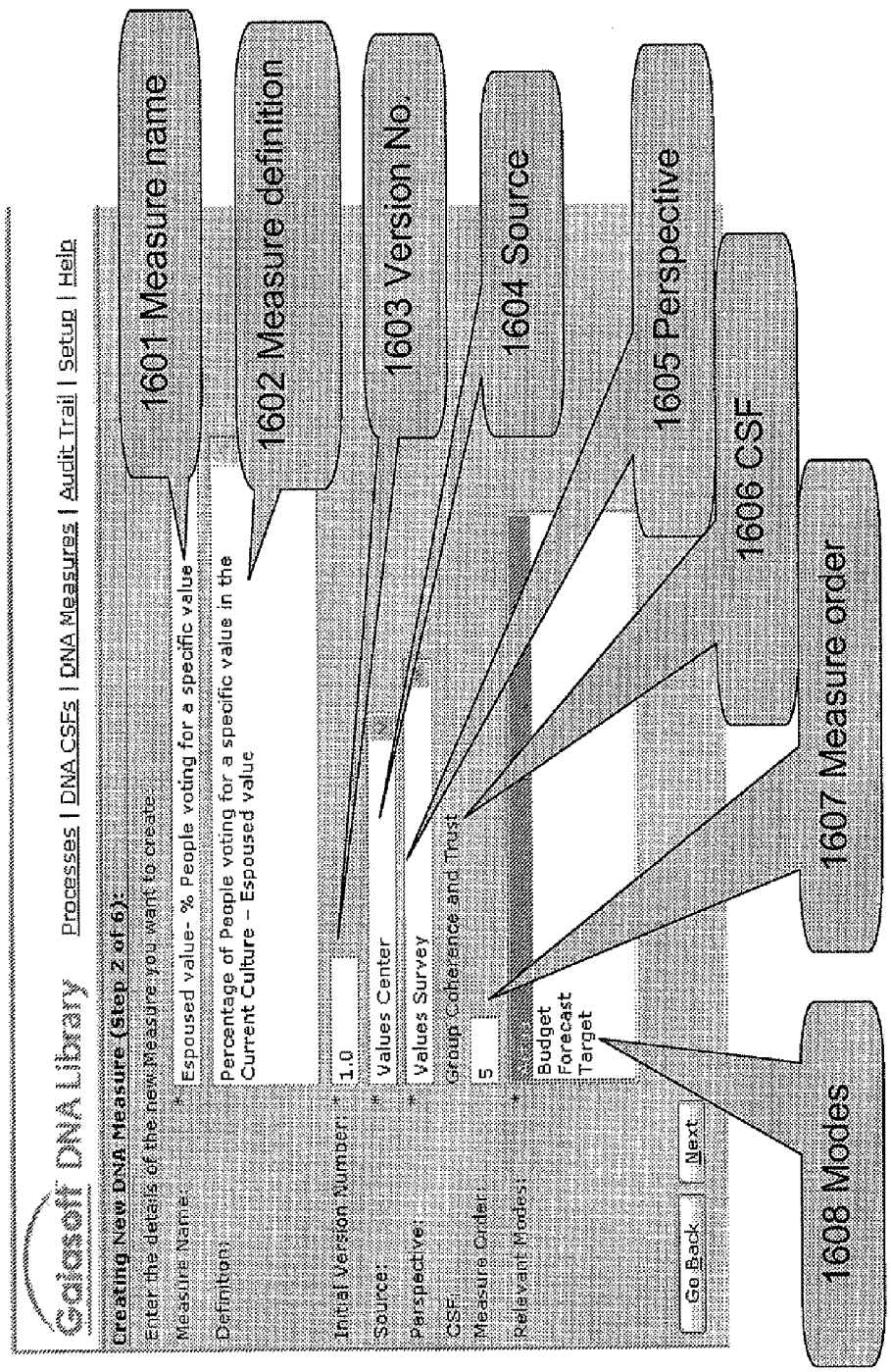
FIG. 16 is a screen-shot of a user interface supporting provision of information to create a DNA measure.

Referring to FIG. 16, a second web form is then presented to allow provision of a measure name 1601, a definition 1602, a version number 1603, a Source 1604, a Perspective 1605, a measure order 1607 and data modes 1608. Multiple modes can be selected so that traffic light conditions can compare to them. The CSF 1606 selected in the first web form is shown for information.

Figure 23:
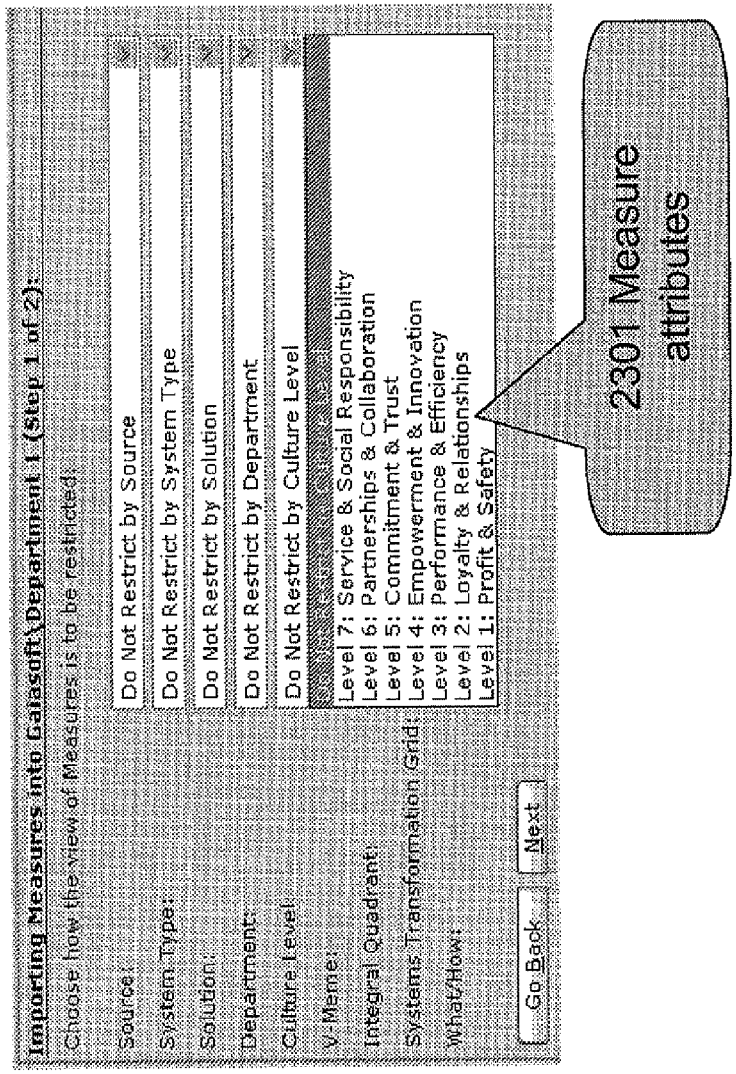
FIG. 23 is a screen-shot of a user interface supporting a second stage of filtering of a DNA measure.

Referring to FIG. 17, a third web form is presented to the user to enable a system type, solution name and department to be attributed to the measure. Additionally, specific attributes 1701 for transformational models can be "checked" to indicate which are relevant to the measure, these attributes being used when filtering DNA measures in the measure import process of the Integral Scorecard model (FIG. 23).

Figure 18:
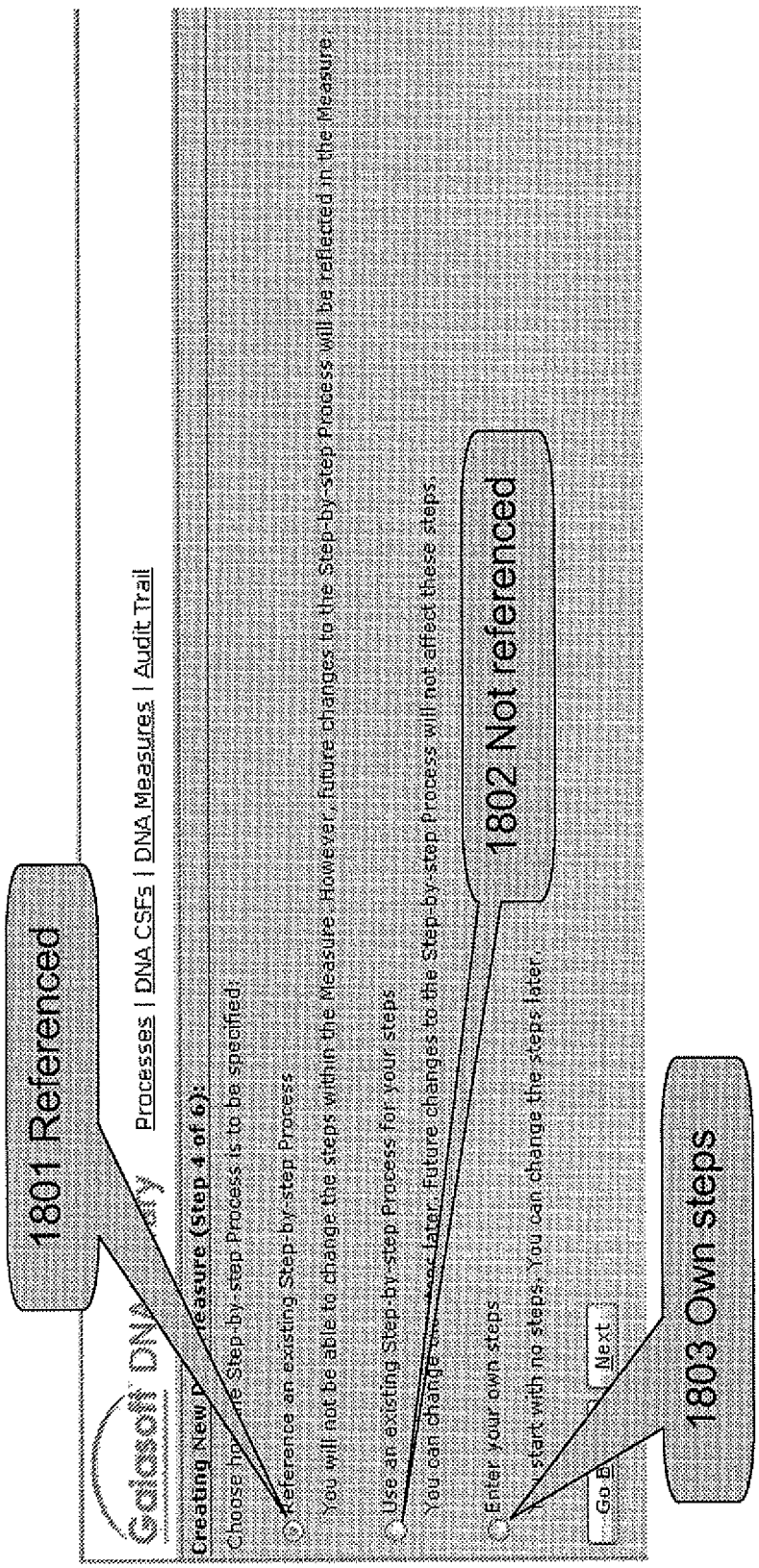
FIG. 18 is a screen-shot of a user interface supporting definition of a relationship between a DNA measure and a process.

Turing to FIG. 18, a fourth web form then sets out a linkage relationship between DNA Process and DNA Measure. A first option 1801 allows future updates to a DNA Process to also update this new DNA Measure. A second option 1802 allows a DNA Process to be used but future updates to the process won't affect the Measure, and a third option 1803 allows the user to enter their own steps from scratch.

Figure 19:
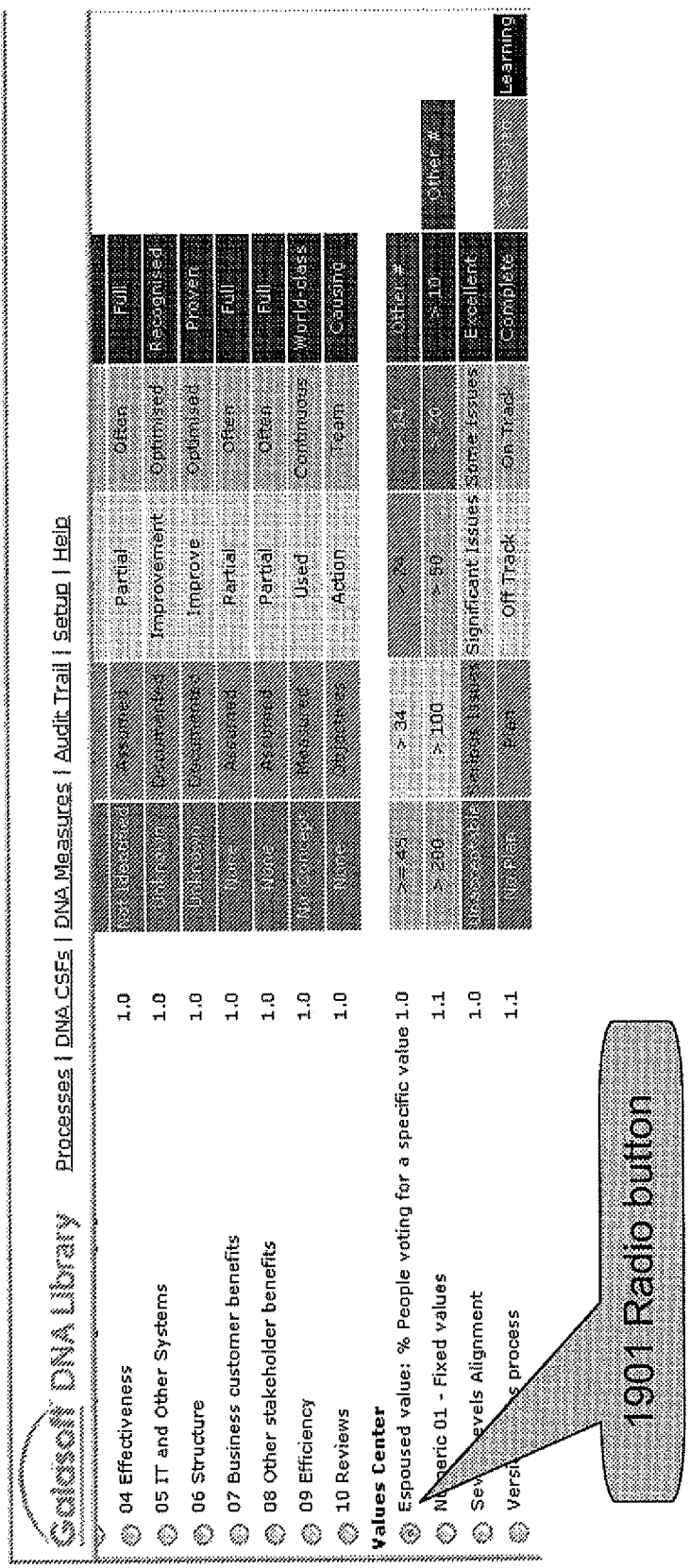
FIG. 19 is a screen-shot of a user interface supporting selection of a DNA process.

Referring to FIG. 19, the user is presented with a fifth web form showing a number of DNA Processes categorised by Source, a radio button 1901 can be checked to select the process.

Figure 20:
FIG. 20 is a screen-shot of a user interface supporting confirmation of selection of the process DNA selected in FIG. 19.

Turning to FIG. 20, a sixth web form is displayed to show the user the contents of the selected process. If another process is preferred, the 'Go Back' button can be used to navigate to the previous "screen" so that another process can be selected. The sixth web form shows the name of the DNA Process which is being referenced, in this example: 'Espoused value: % People voting for a specific value', and the details of the process. In this respect, the traffic light colour, the symbol, the traffic light condition and explanations of each step.

Figure 21:
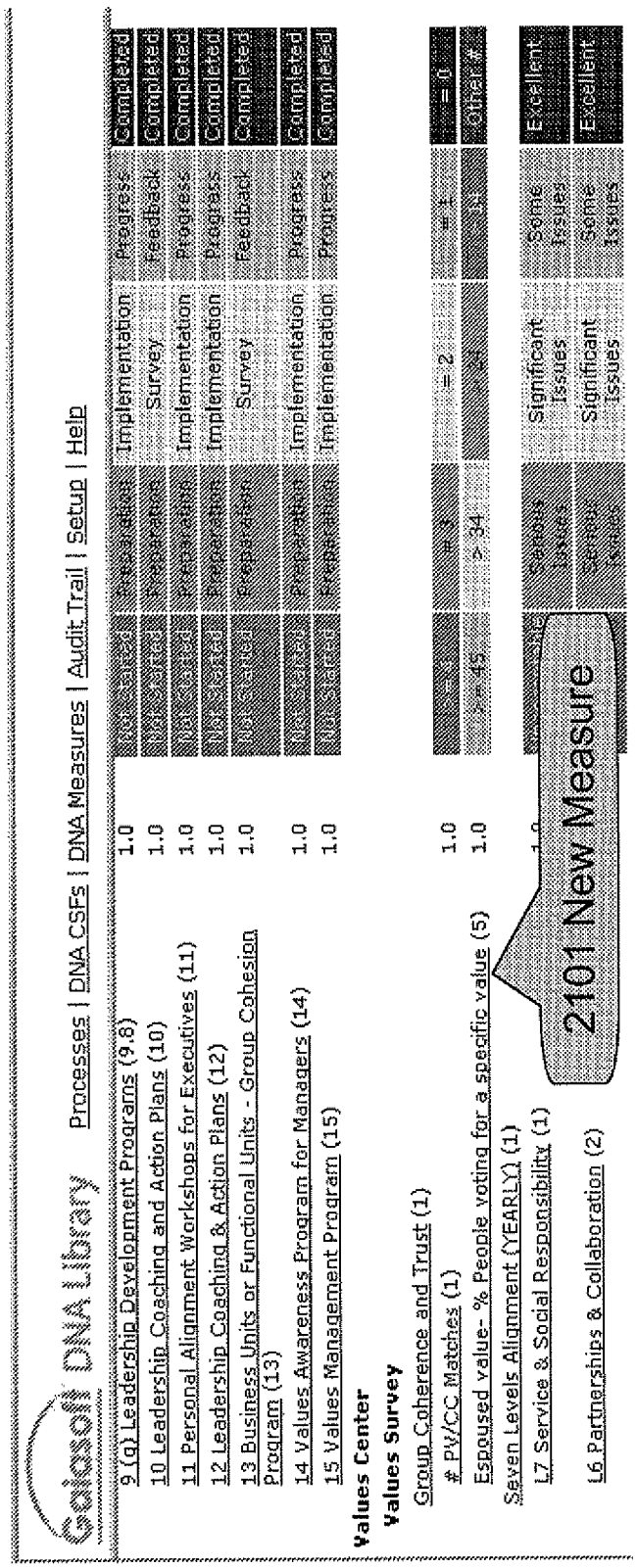
FIG. 21 is another screen-shot of a library of DNA measures that use the process DNA.

Referring to FIG. 21, once the DNA Measure has been created 2101 it is displayed along-side the other measures in the Library. Once the DNA Measure is available in the library, it can be incorporated into the Integral Scorecard management system as a performance indicator in a manner that will now be described.

Figure 22:
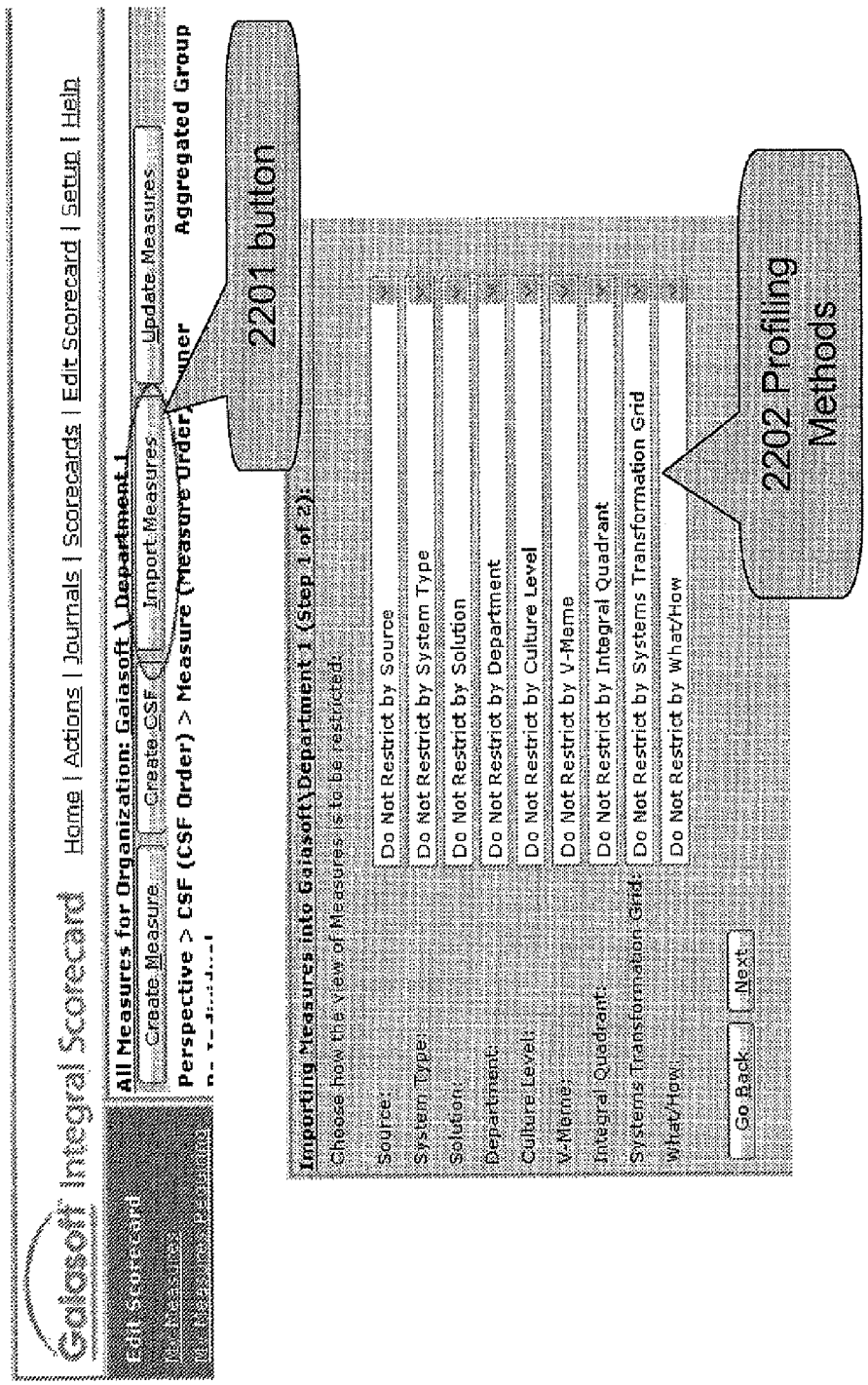
FIG. 22 is a screen-shot of a user interface supporting a first stage of filtering of a DNA measure.
Figure 24:
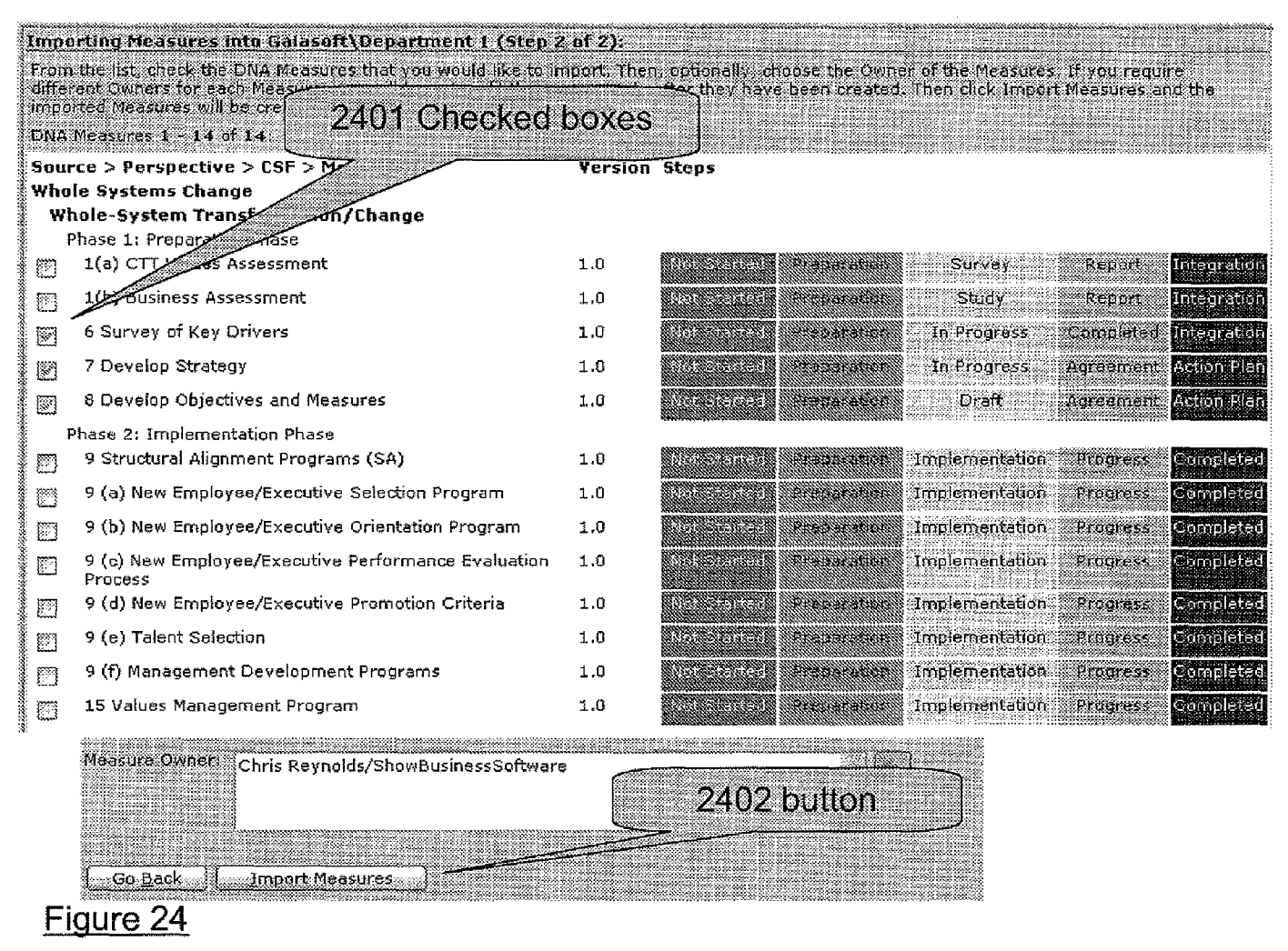

Turning to FIG. 22, a web form is used in the Integral Scorecard management system supported by the content delivery system to import measures from the DNA Library using the 'Import Measures' button 2201. As a first step of the import process, the filter system is used to select appropriate measures from the profiling methods 2202 shown. Thereafter, a further web form is displayed (FIG. 23) for filtering the available DNA Measures for incorporation into a scorecard. The filter criteria can be extended to include any relevant profiling method, in particular those used to support a "whole systems" change approach. The user is presented with a number of attributes 2301 by which the Measure DNA can be selected or filtered. A subsequent web form is then presented (FIG. 24) containing the results of the filtered search for relevant measures. Each DNA Measure can then be checked 2401 to include it into the Integral Scorecard management system after entering the measure owner and clicking on the 'Import Measures' button 2402.

Figure 25:
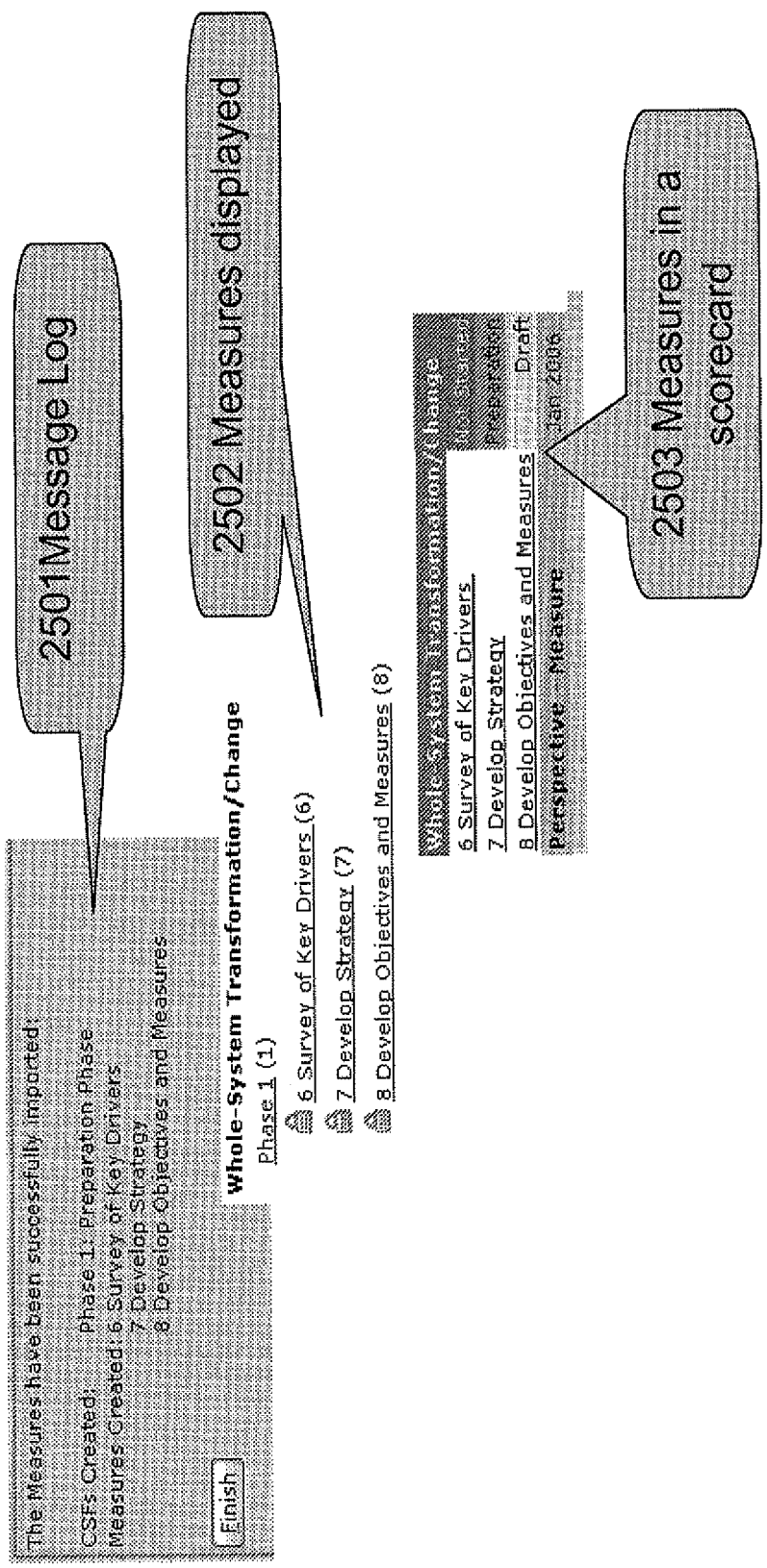
FIG. 25 is a set of screen-shots of importation of measures into an integral scorecard.

Referring to FIG. 25, the imported measures in the Integral Scorecard are shown, including a message log 2501 for showing the logged results of the import routine, measures 2502 in the Integral Scorecard management system, and the measures 2503 in the Integral Scorecard management system with traffic lit DNA Process steps.

Figure 26:
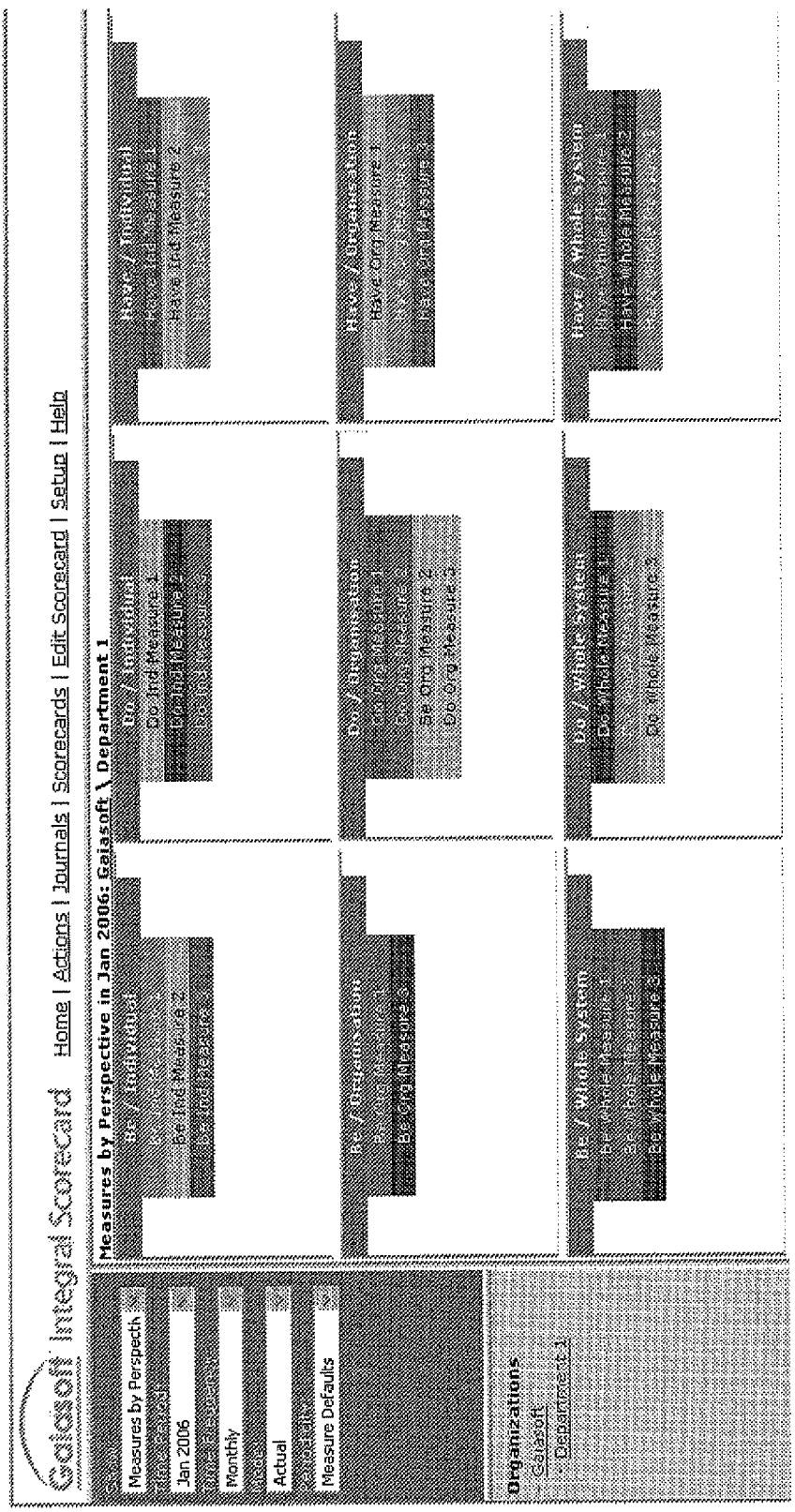
FIG. 26 is a screen-shot of measures presented in accordance with the profiling technique.

Turning to FIG. 26, whilst it is known to present measures according to a Balanced Scorecard model with measures traffic lighted and varying over time it is also known to show measures for multiple perspectives in a single screen. This "screen" shows how measures categorised by one of the models used in the DNA Library can be also categorised when displayed in the Integral Scorecard system.

The content delivery system allows multiple models to be used to categorise DNA Processes and DNA Measures. Additional models can be added, each with its own profiling method and attributes. These same models can also be used to categorise measures in a Scorecard management system as shown hereinabove.

The content delivery system allows the user to switch between displaying the measures in a scorecard according to the categories or dimensions of any of the models currently supported by the scorecard software concerned and the DNA Measures.

This "screen" of FIG. 26 shows the ability to categorise measures within the 9 box model.

Figure 27:
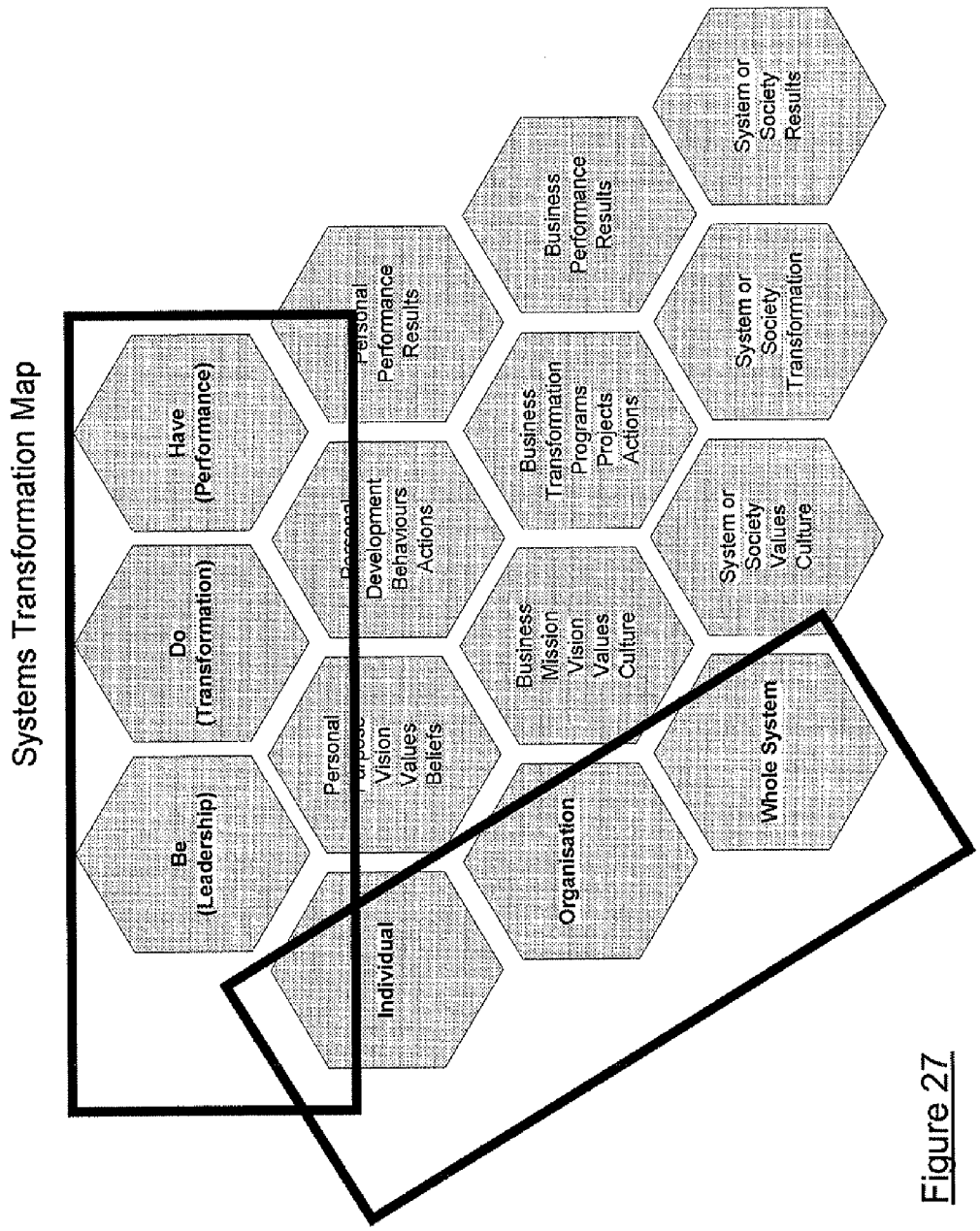
FIG. 27 is a schematic diagram of a 9 box grid of the system transformation map.
Figure 28:
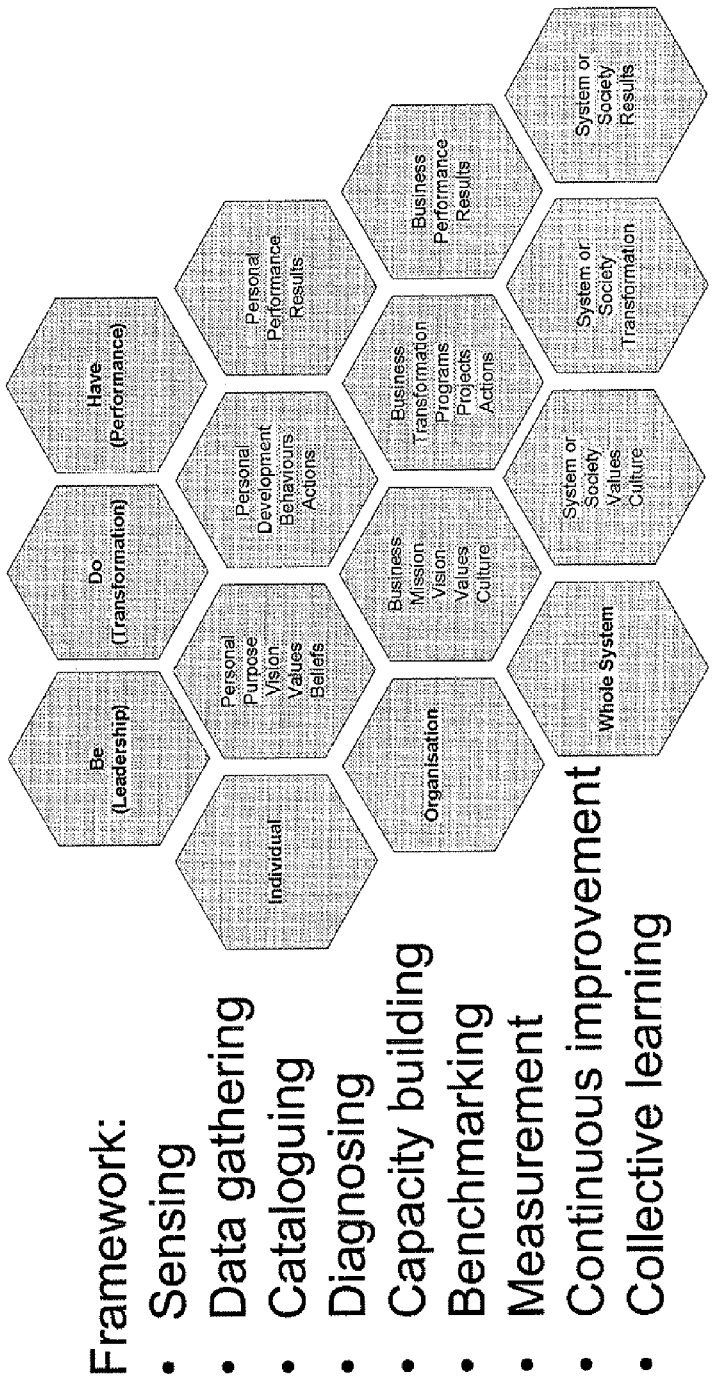
FIG. 28 is another schematic diagram of the system transformation map of FIG. 27.

In a fourth embodiment, the content delivery system is used to provide a "map" to strategise, scenario plan and manage in the context of a whole system, taking into account relationships between performance, transformation and leadership for individual employees, an organization and the whole system. This provides for the ability to undertake "Whole Systems" Management. The "map" provides for the managing of values and culture alongside business performance for an organization as part of a whole system. Creating such a "map" highlights the connectivity and interdependence of organizations and supply-chains, thereby enabling the development of organizational and systems resilience. The map provides a framework for systematically considering and tracking the relationships between person, organisation and system. The Map addresses the HOW of transformation. It also addresses the potential blind-spot of leadership, culture and values. The map framework explicitly recognises that leadership drives transformation projects and programs which, in turn, drive performance. Within this "Whole Systems" Measurement Approach, there emerge opportunities for sensing, data gathering, cataloguing, diagnosing, capacity building, benchmarking, measurement, continuous improvement and collective learning, for example in the context of the Systems Transformation Grid model described above (FIGS. 27 and 28).

Such a map provides a way to visually map and 'scenario plan' the cause and effect relationships between levels of a "system": Individual, Organisation and Whole System. The use of the map recognises that each of the levels has an inner state that drives its actions resulting in outer performance and results. In this respect, "Individual" relates, in summary, to a shift in personal belief which changes our actions driving results, "Organisation" relates, in summary, to a shift in organisation culture, which changes actions to drive performance, and "Whole System" relates, in summary, to a shift in social culture, which changes actions to change society.

Figure 29:
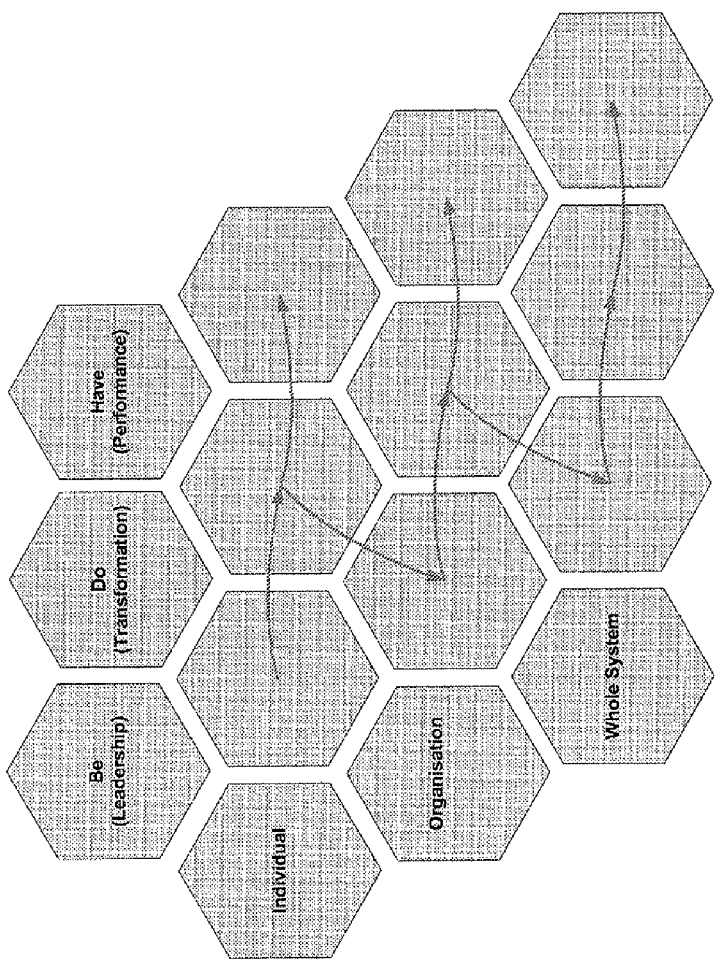
FIG. 29 is a schematic diagram of transformational changes according to the system transformation map of FIG. 27.

Referring to FIG. 29, the map emphasises particular relationships between Leadership, Performance and Transformation and the connections between the individual, the organisation and the whole system. Ultimately, transformation begins with the 'Be-ing' of an individual, which impacts the 'Do-ing' and results in 'Have-ing', A shift in personal purpose, vision, values, and beliefs drives a shift in behaviours and actions.

A shift in personal behaviours and actions can drive a change in organisation culture. A change in organisation culture impacts organisational actions and transformation, which in turn impacts results. In this respect, the map of FIG. 29 shows the healthy flow of change from individual leadership to societal outcome.

Figure 30:
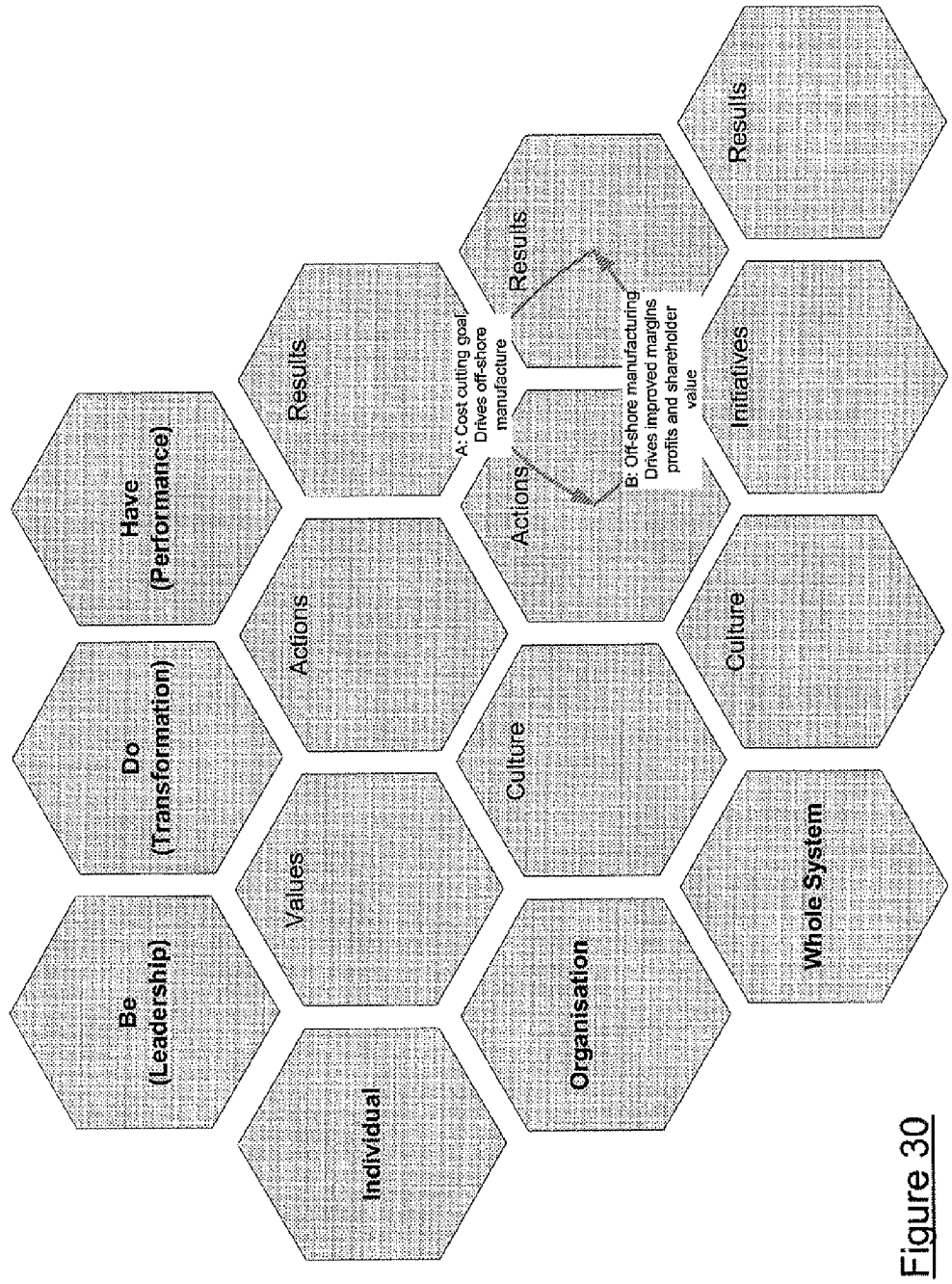
FIG. 30 is a schematic diagram of cause and effect relationships used to define a strategy.

Referring to FIG. 30, the map can be used to monitor response by a corporation to globalisation by taking production off-shore (A). The intention is to drive improved margins, profits and share price (B). At first sight, this is a relatively simple decision.

Figure 31:
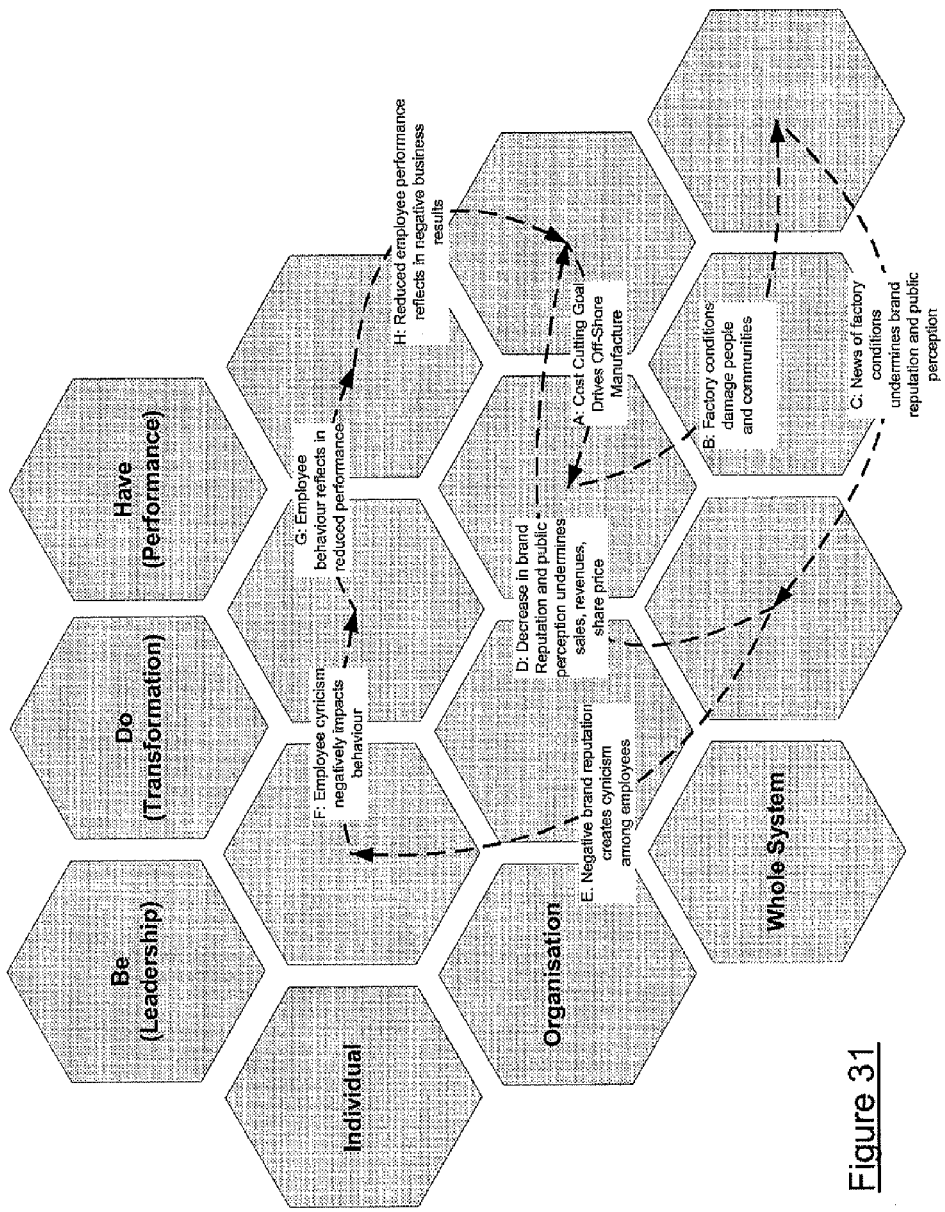
FIG. 31 is a schematic diagram used of cause and effect relationships used to understand the results of the above strategy using the system transformation map of a "complex reality".
Figure 32:
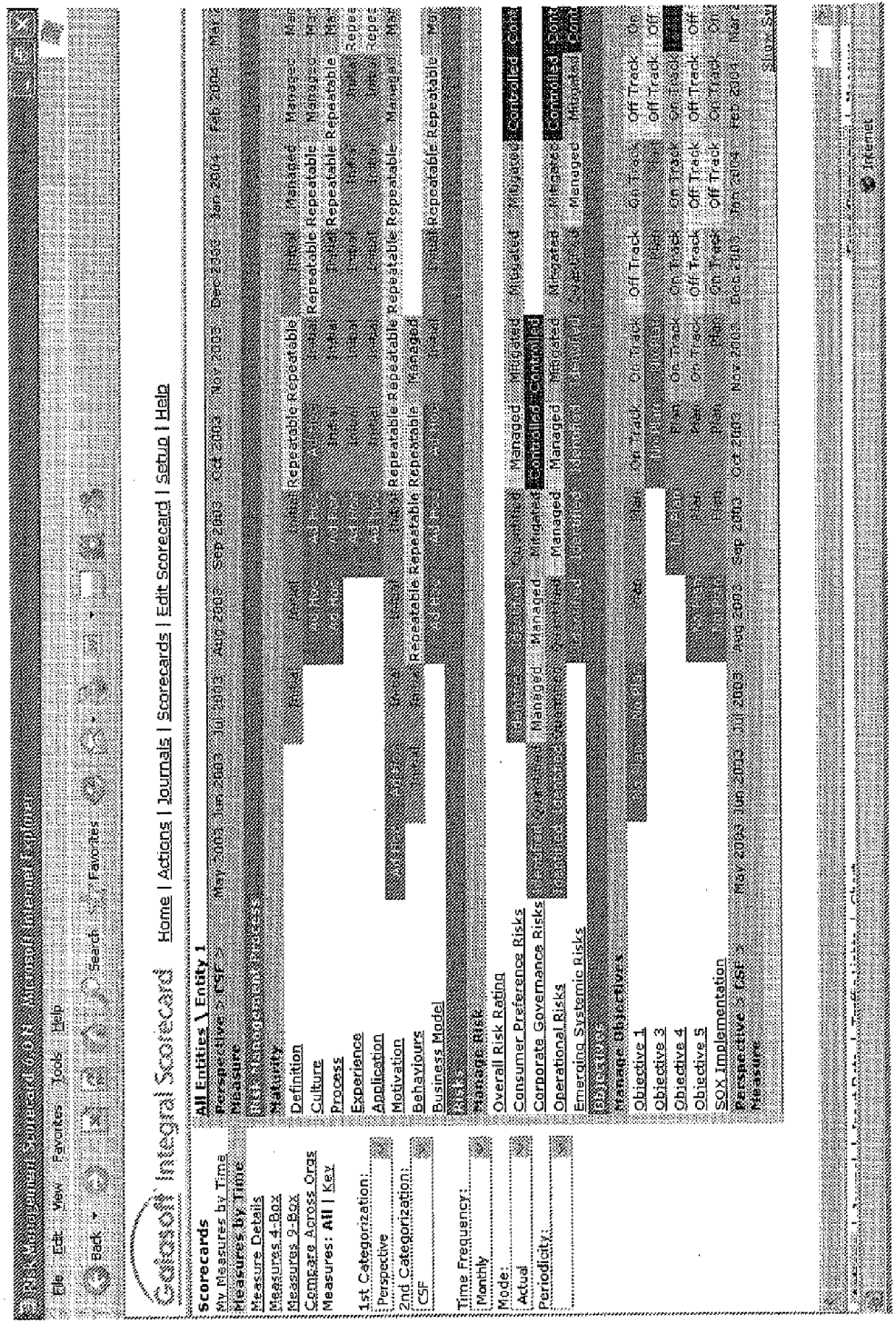
FIG. 32 is a screen-shot of a user interface for presentation of measures by perspective according to critical success factors.

In reality, however, the result of the cost cutting goal (A) (FIG. 31) is that manufacturing is moved off-shore damaging people and communities (B). Increasing transparency means that consumers become aware of the sweat-shop employment conditions in an off-shore factory (C). The business' global reputation, brand (C) and sales (D) are damaged. At the same time, key employees become cynical when they see their organisation is behaving unethically (E). Their work loses meaning, their actions are ineffective (F) and productivity declines (G). They experience being burned out. Their loss of productivity reduces the productivity of the organisation undermining results, profits and share price (H). Consequently, an apparently simple cost cutting initiative taken right from a strategic plan has impacted the brand value and human capital in ways that the original business case never predicted. What looked like a successful strategic move is revealed as a flawed plan in a number of respects. In the organisation, no one thought of this when they signed off the Balanced Scorecard or the Business Plan. However, third party observers and market analysts may call the strategic move a crisis of leadership and ethics. Without the map, the situation is too complex for the strategy, planning and decision making process.

By providing a way for an organisation to 'see' itself, a performance measurement system creates the reality by which an organisation judges its performance. With a process of analysis, action-taking and learning, performance measurement becomes performance management.

Where blind-spots exist in the measurement system, there will be blind spots in management and the potential for failure. Single-minded focus on financial results can undermine customer loyalty on which long-term success depends.

The Balanced Scorecard model helps businesses to understand the cause and effect of Learning & Growth results driving good Processes driving happy Customers resulting in good Financial results. The approach of Strategy Mapping has helped leadership teams to understand the interrelations of different success factors and how success factors lead to financial success. For over a decade, the insight of the Balanced Scorecard model and strategy mapping have added value to many businesses, helping to fundamentally shift the thinking of business from simple financial focus to a more complete, whole and insightful view.

The map created by the content delivery system or as a manual implementation adds a whole systems dimension to the performance measurement capabilities of the Balanced Scorecard model, and the success factors revealed in Strategy Maps by showing the cause and effect relationships between the Individual, the Organisation and the Whole System.

In this example, the map is also used as a framework to map risks and resilience. In this context, resilience means the robustness of the organization in the face of all risks and disruptions from all causes. Addressing resilience means systematically addressing, for example: compliance standards such as SOX, Quality and Environmental standards; market drivers, such as globalization and competition; talent drivers, such as burnout and meaning; and/or areas of risk, such as Operational, Market, Economic, Environmental risks.

A resilient business is more able to meet the challenges and take the opportunities of an increasingly turbulent business environment.

A systematic approach to resilience is a holistic approach to good corporate governance, a way for organizations to prepare for the unexpected, to be ready to transform as business strategy or as business drivers demand it. The map can proactively manage the governance, accountability, implementation and alignment of their relationships and dependencies. This mirrors the bi-directional data flows of a healthy living system. Performance can be optimized while resilience is increased.

In this example, the Map created is presented as adjacent hexagons that fit together, although other shapes can be employed, for example: rectangles, octagons or other polygons. The map can also be perceived as a kind of 'patchwork quilt' linking the maps of interdependent organisations within a value chain.

In using the map and as a part of a whole systems approach, the values of individuals, the culture of business and of the whole system must be taken into account. Culture and leadership are frequently referred to as 'intangibles' which means 'not measurable'. However, it is possible, for example, to use the approach to measuring and performance managing leadership, values and culture for organisations, individuals and a "whole system".

In a fifth embodiment, the content delivery system is able to present data elements retrieved from the database in accordance with a number of different profiling models.

Figure 38:
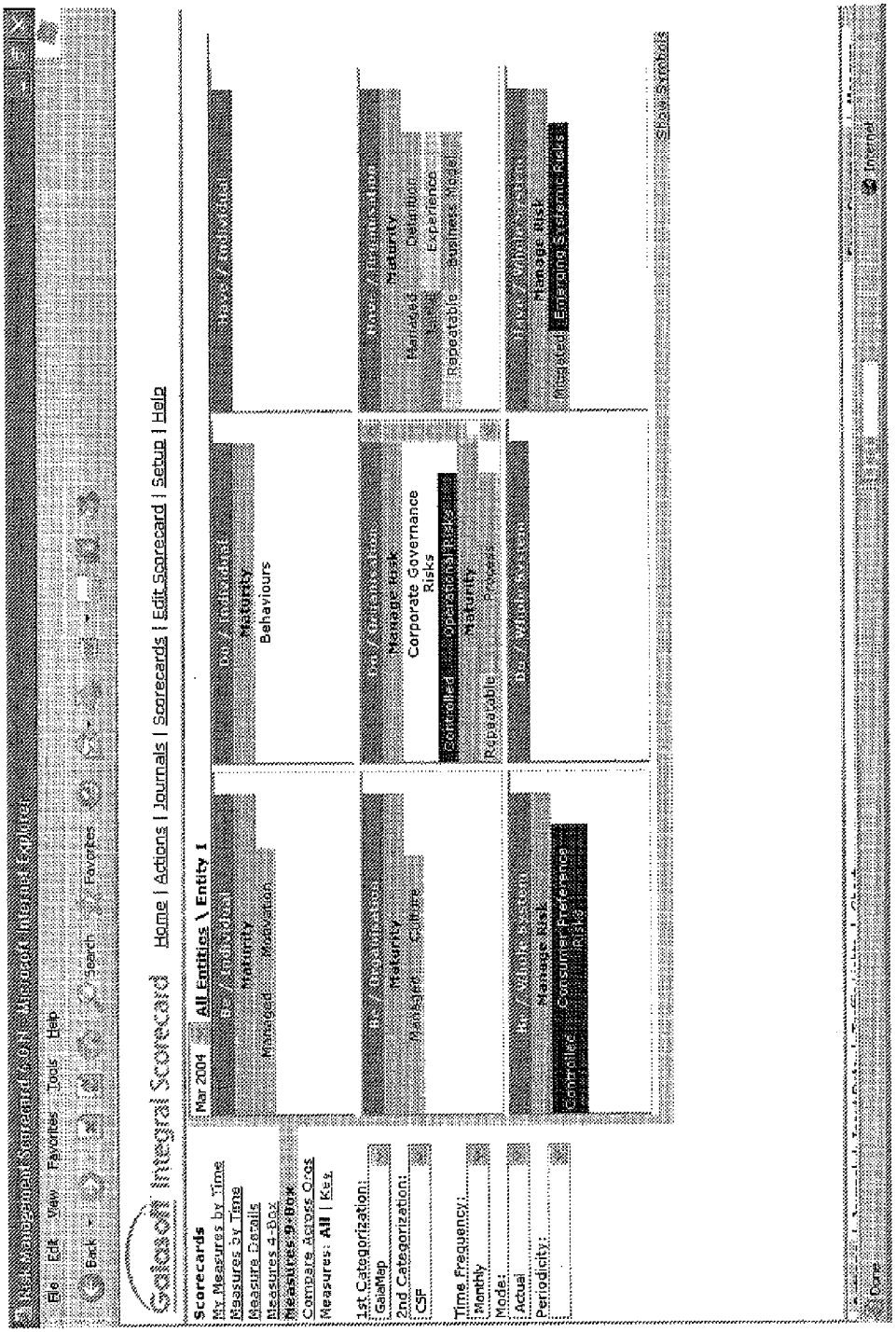
FIG. 38 is a screen-shot of an alternative user interface for presenting measures according to a system transformation grid model.

Referring to FIGS. 32 to 38, the data elements retrieved from the database can be filtered so as to be organised and/or presented in accordance with a Critical Success Factor perspective (FIG. 32), a Spiral Dynamics model (FIG. 33), a culture level model (FIG. 34), an Integral Quadrant model (FIG. 35), an Integral Quadrant (matrix presentation mode) model (FIG. 36), a Gaiamap or Systems Transformation Grid model (FIG. 37) and/or the Gaiamap or Systems Transformation Grid (matrix presentation mode) model (FIG. 38).

In a sixth embodiment, the content delivery system is used to provide a map to view measures as categorised by different profiling models in this case, 7 Levels of Consciousness (Barrett) and Spiral Dynamics (Beck).

Figure 39:
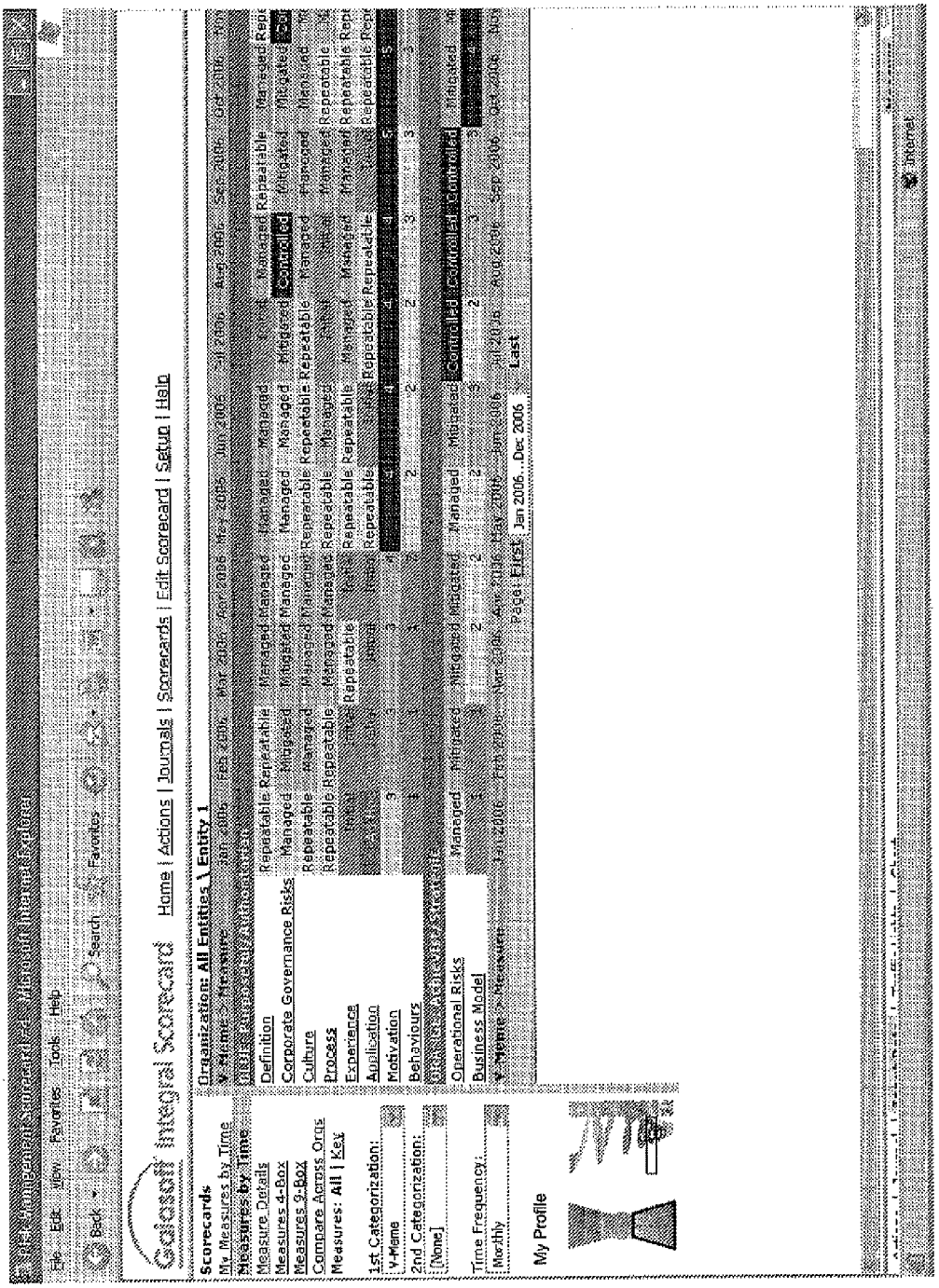
FIG. 39 is a screen-shot of a user interface for displaying measures relevant to a profile according to a spiral dynamics model.
Figure 40:
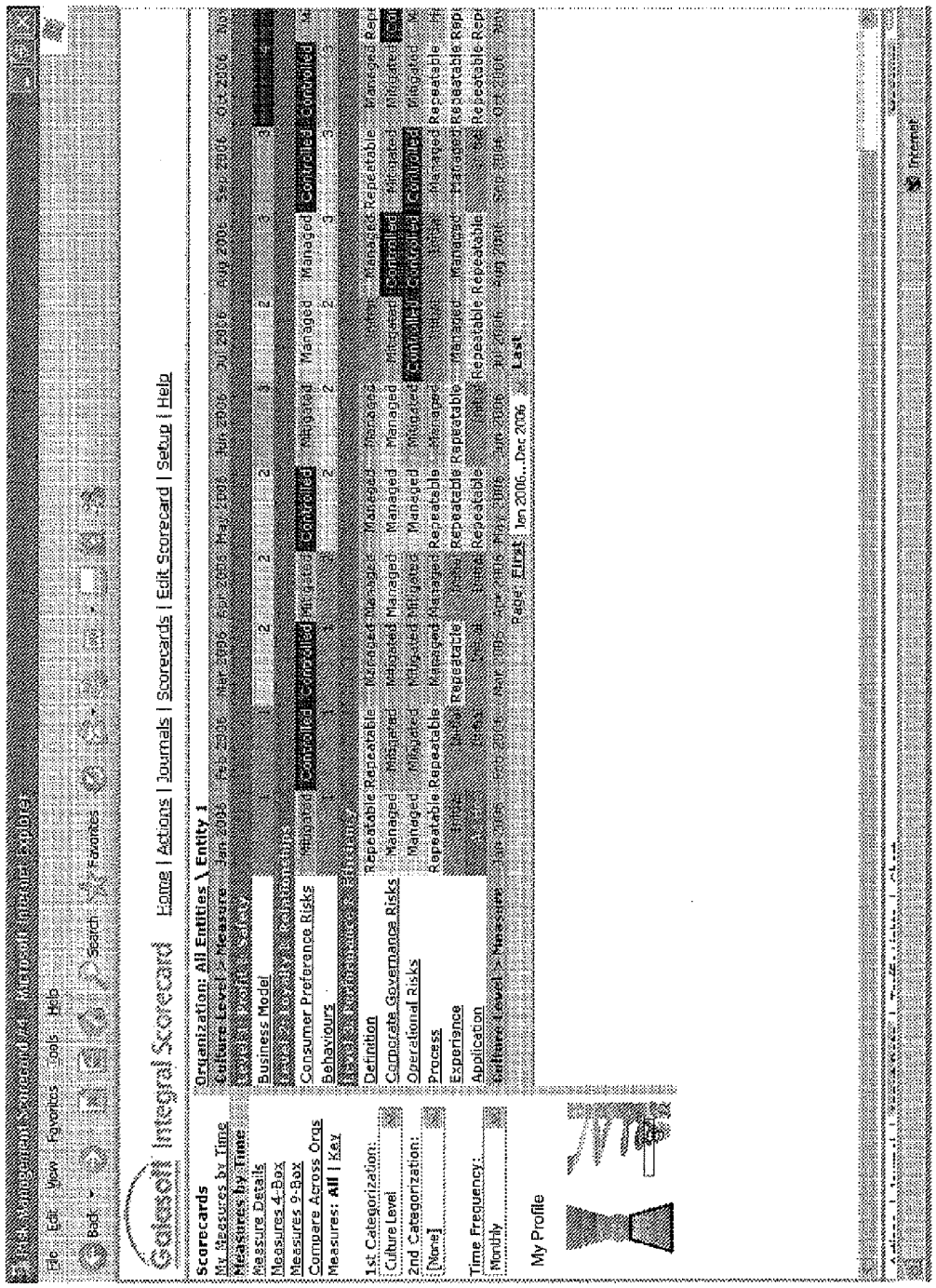
FIG. 40 is a screen-shot of a user interface for displaying measures relevant to a profile according to a culture level model.

Referring to FIGS. 39 and 40, the intention of these examples is to show how certain information may be outside the normal attention of a particular user of the system. This may be understood by analogy with the concept of 2 and 3 dimensions. When an engineering drawing shows only two dimensions, the third dimension is not visible to a user examining the two dimensional projection. This third dimension presents a difficulty for the user since they have no perception of the physical reality of depth. Turning to FIG. 39, data elements are set out in relation to the measures following on and in addition to the user's profile. In this example, the user's "centre of gravity" is up to and including the blue level (Purposeful and Authoritarian). The next level beyond blue is orange (Achievist and Strategic) in this example. The measures displayed have been filtered from those shown in FIG. 33, so that the measures for levels above orange are not displayed.

Figure 33:
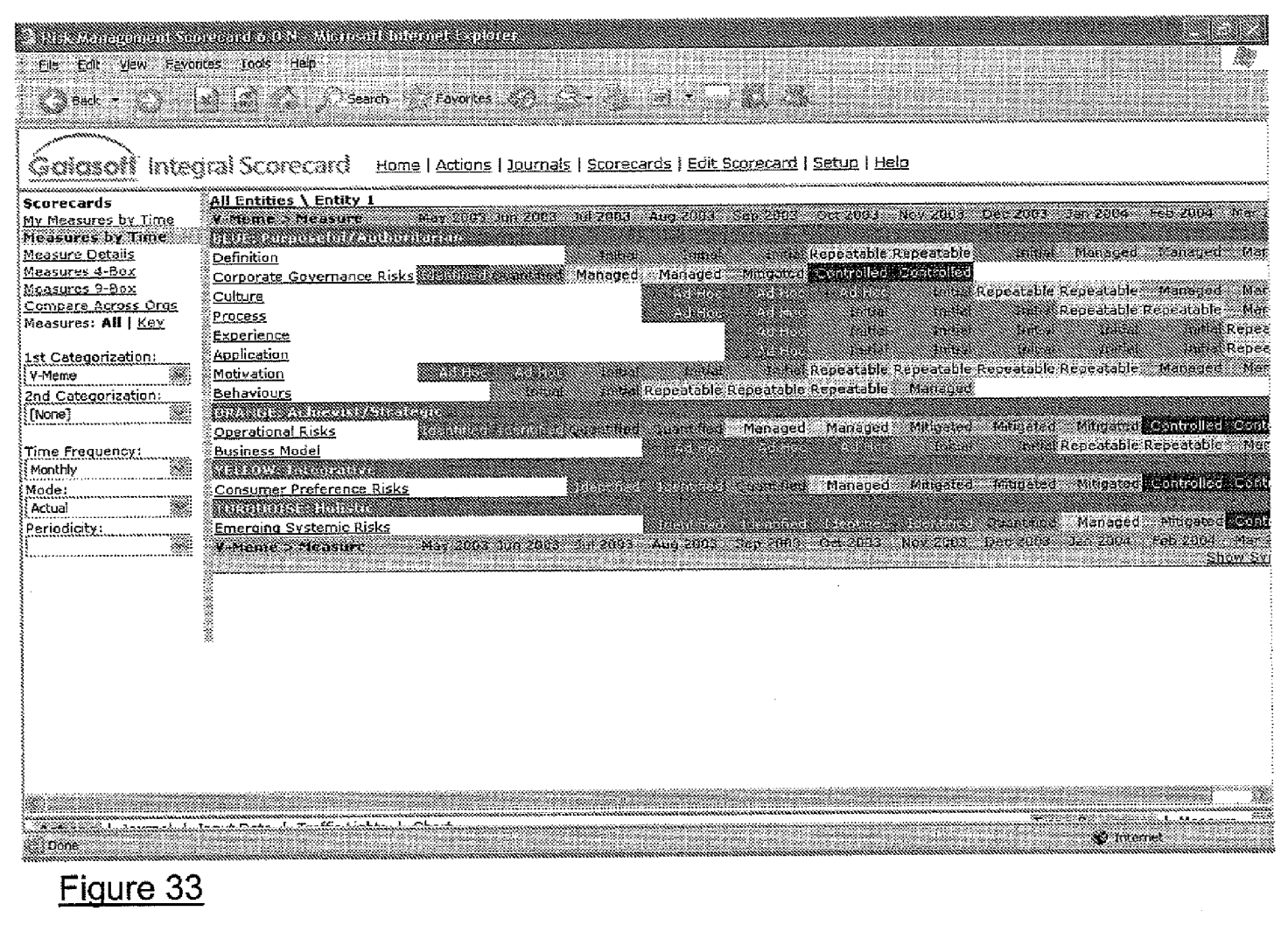

Referring to FIG. 39, there is presented a representation of the profile of the user according to the Spiral Dynamics model derived from a behavioural assessment (the Spiral Dynamics level of the user on the Spiral Dynamics scale is represented by a rectangle in FIG. 39). In this example, a complex "system" containing human components and structural processes affecting physical reality is represented, demonstrating the measures insofar as they relate to risk and resilience. From a Spiral Dynamics perspective, the person who understands risk and resilience from the Blue vMeme may be mentally stretched by the information relating to the 'Orange' vMeme and find it difficult to understand higher levels. FIG. 39 shows a scorecard as presented in FIG. 33 in which measures have been further filtered according to the Blue Spiral Dynamics vMeme profile of the user. The displayed measures have been filtered to show only available measures for Beige, Purple, Red, Blue and, as a stretch, Orange, but not those for Green, Yellow or Turquoise. In this instance, there are no Beige, Purple or Red measures (as can be seen in FIG. 33), so none are displayed at this level.

Figure 34:
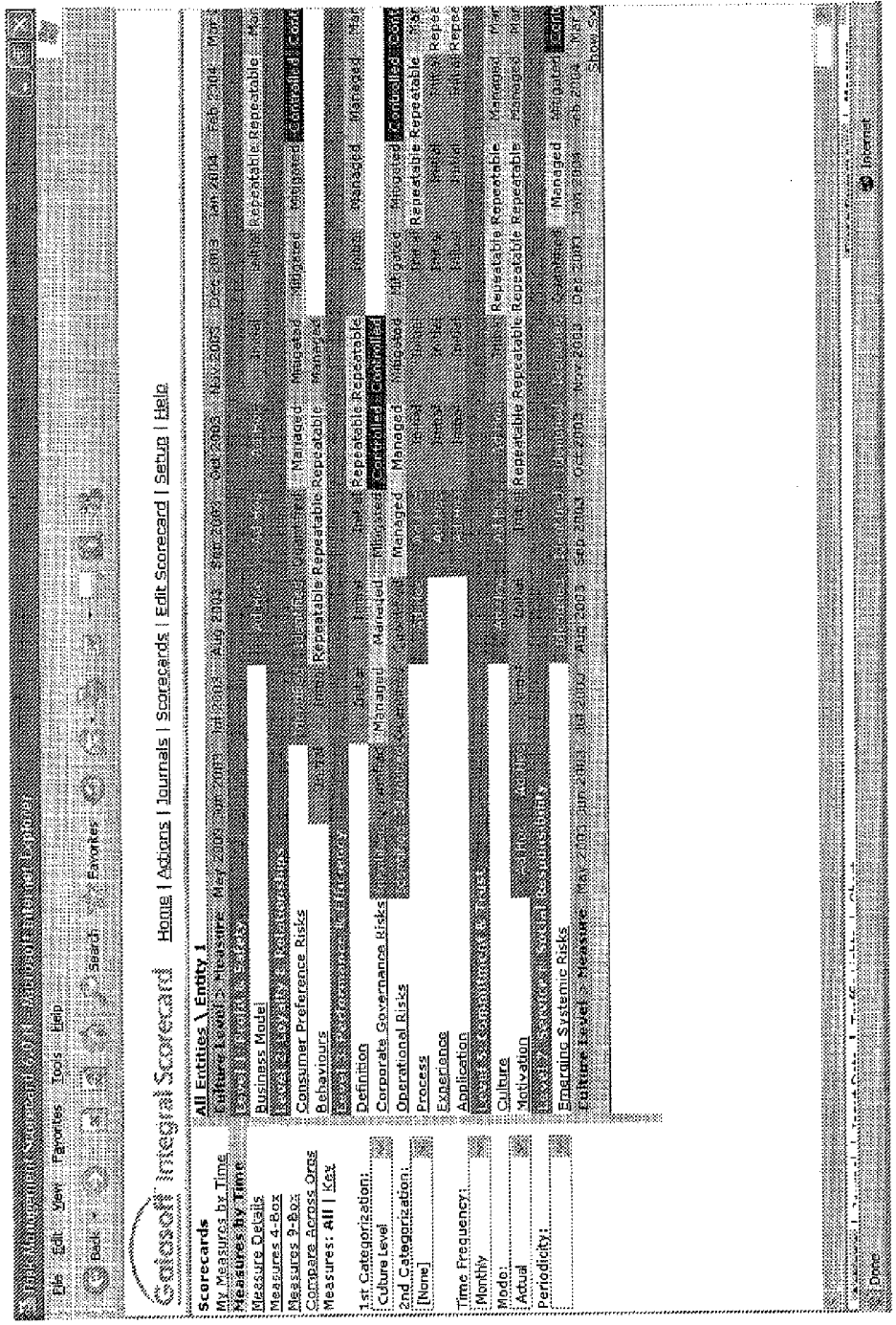
FIG. 34 is a screen-shot of a user interface for presenting measures according to a culture level model.
Figure 35:
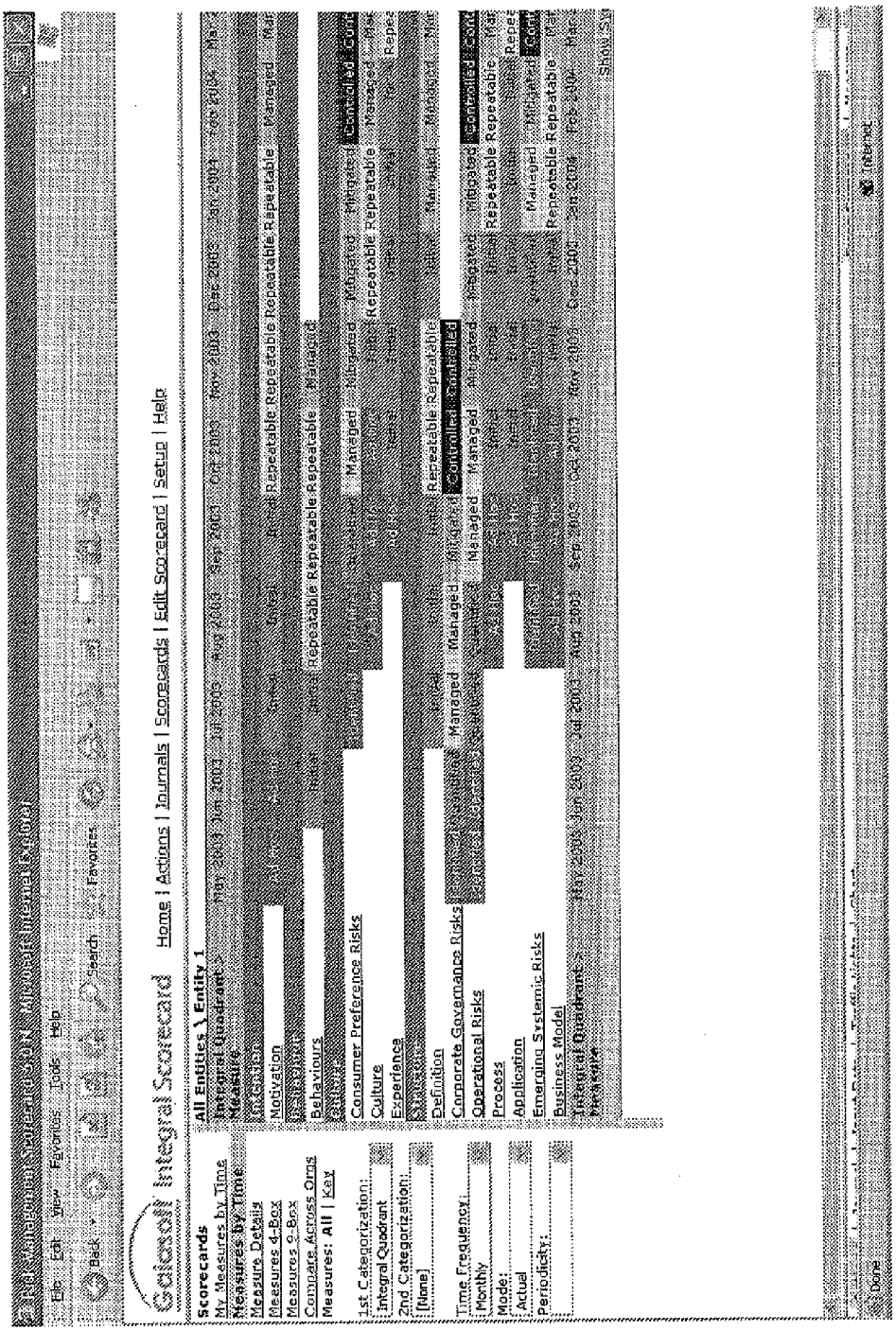
FIG. 35 is a screen-shot of a user interface for presenting measures according to an integral quadrant model.
Figure 36:
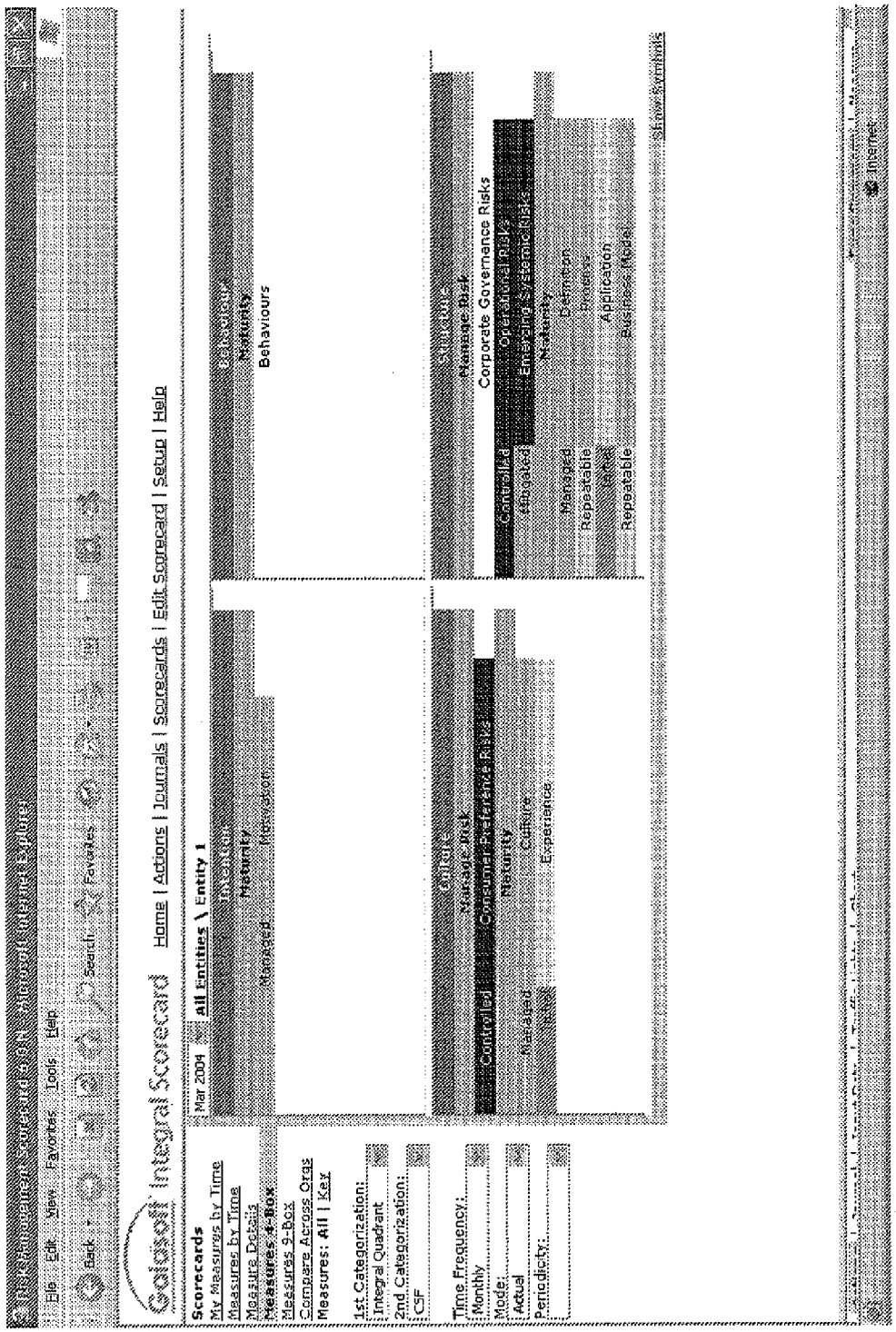
FIG. 36 is a screen-shot of an alternative user interface for presenting measures according to an integral quadrant model.
Figure 37:
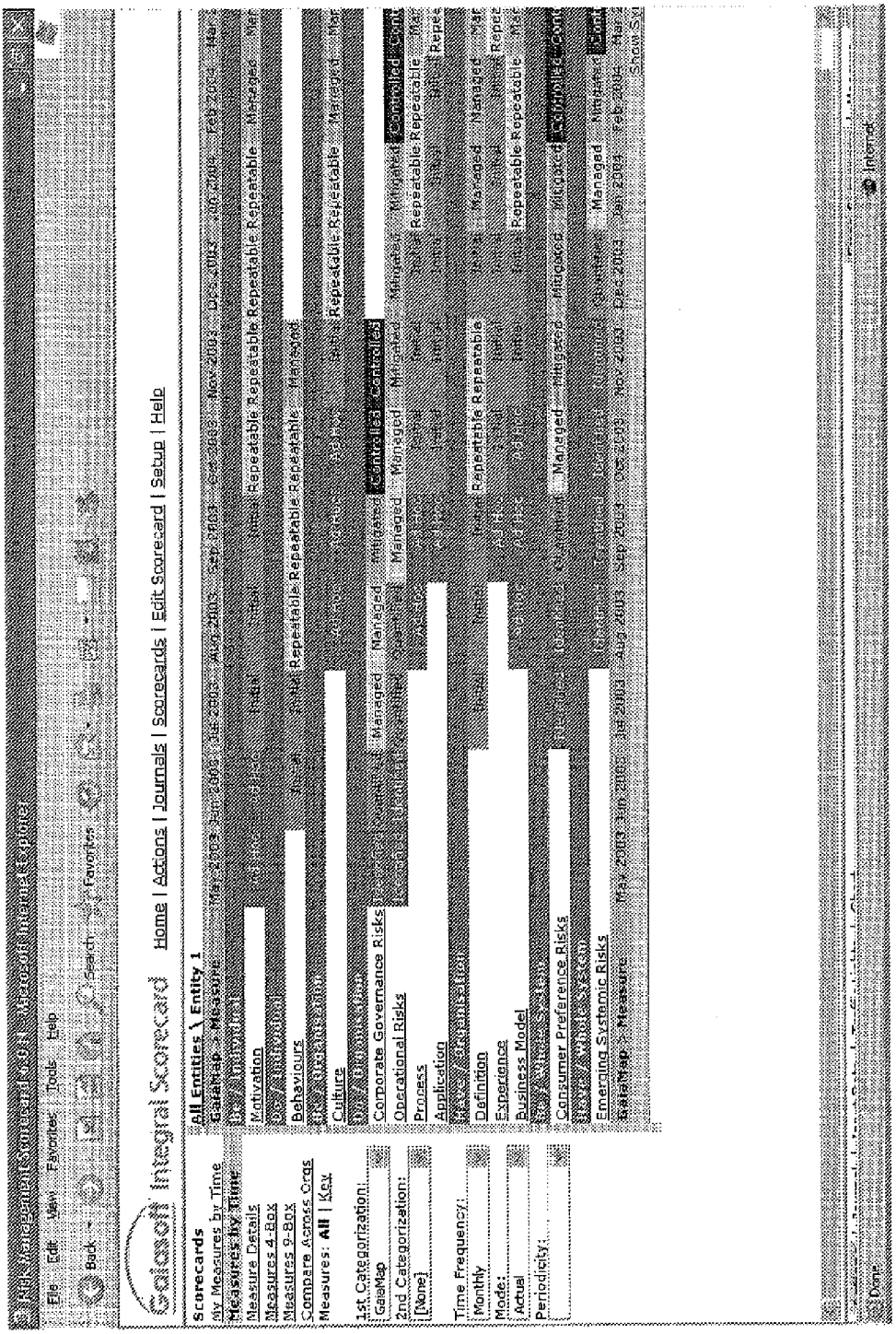
FIG. 37 is a screen-shot of a user interface for presenting measures according to a system transformation grid model.

FIG. 40 is an example of the same management system with measures categorised according to the levels of the 7 Levels of Consciousness: "7: Service & Social Responsibility, 6: Partnerships & Collaboration, 5: Commitment & Trust, 4: Empowerment & Innovation, 3: Performance & Efficiency, 2: Loyalty & Relationships, 1: profit & Safety." From this model, the person who is profiled at level 3 will understand this level and all levels below and be stretched by level 4, but will find levels 5 and above less easy to appreciate. The user's preferred or habitual vMeme using the measures as set out according to the "system", is rated at level 3 (Performance and Efficiency), as a result of which the information relating to this level is displayed, and information insofar as it relates to levels 1 and 2 can also be made available. However, on account of the psychological profile of the user, level 4 (Empowerment and Innovation) is beyond that person's current awareness, and in this case this level is provided by way of a psychological stretch to that particular user, however, in this instance, there are no measures at level 4 (as can be seen in FIG. 34). Measures for level 5 and above are not displayed.

Figure 43:
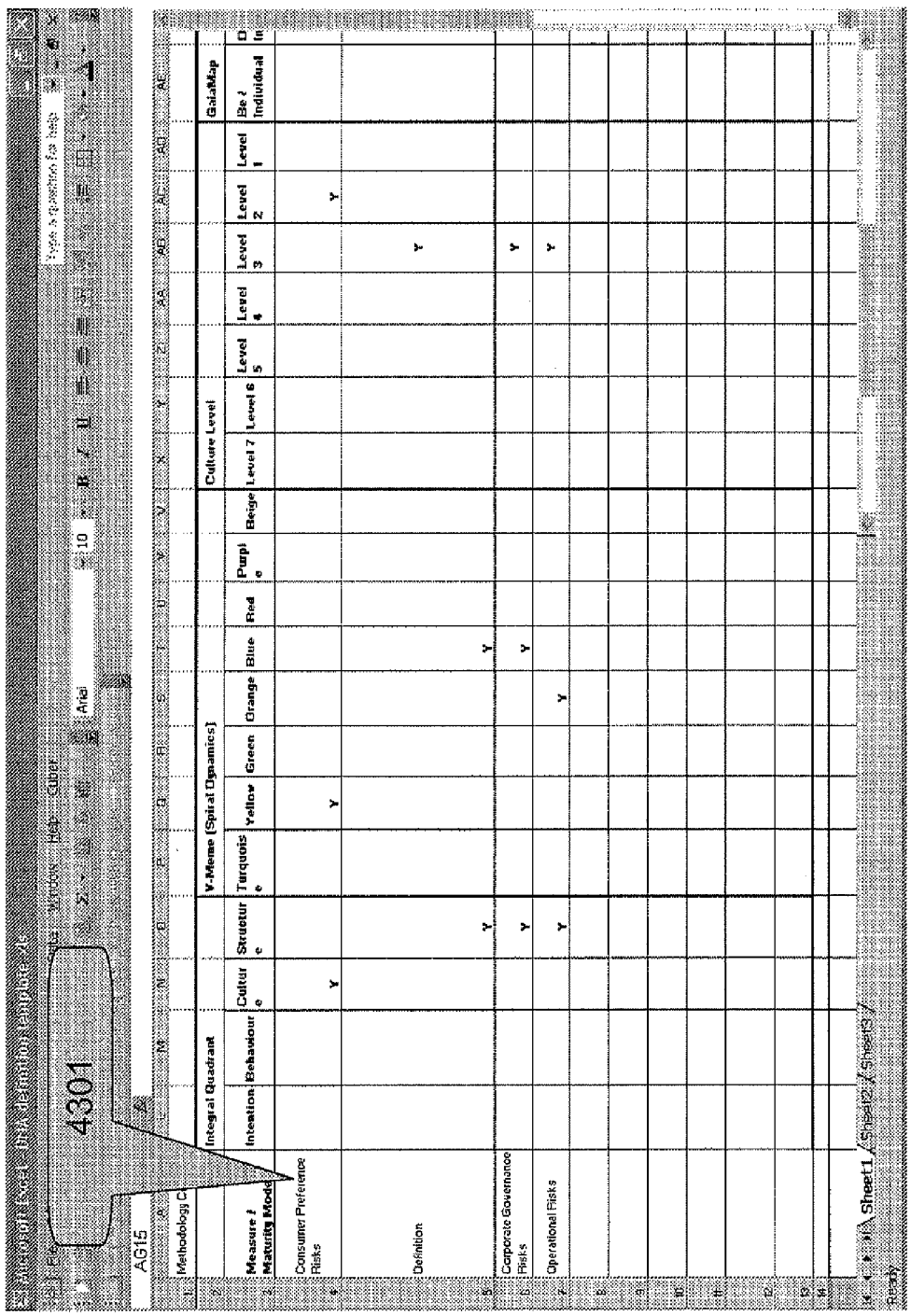
FIG. 43 is a DNA categorisation and profiling technique supported by a spreadsheet application.
Figure 44:
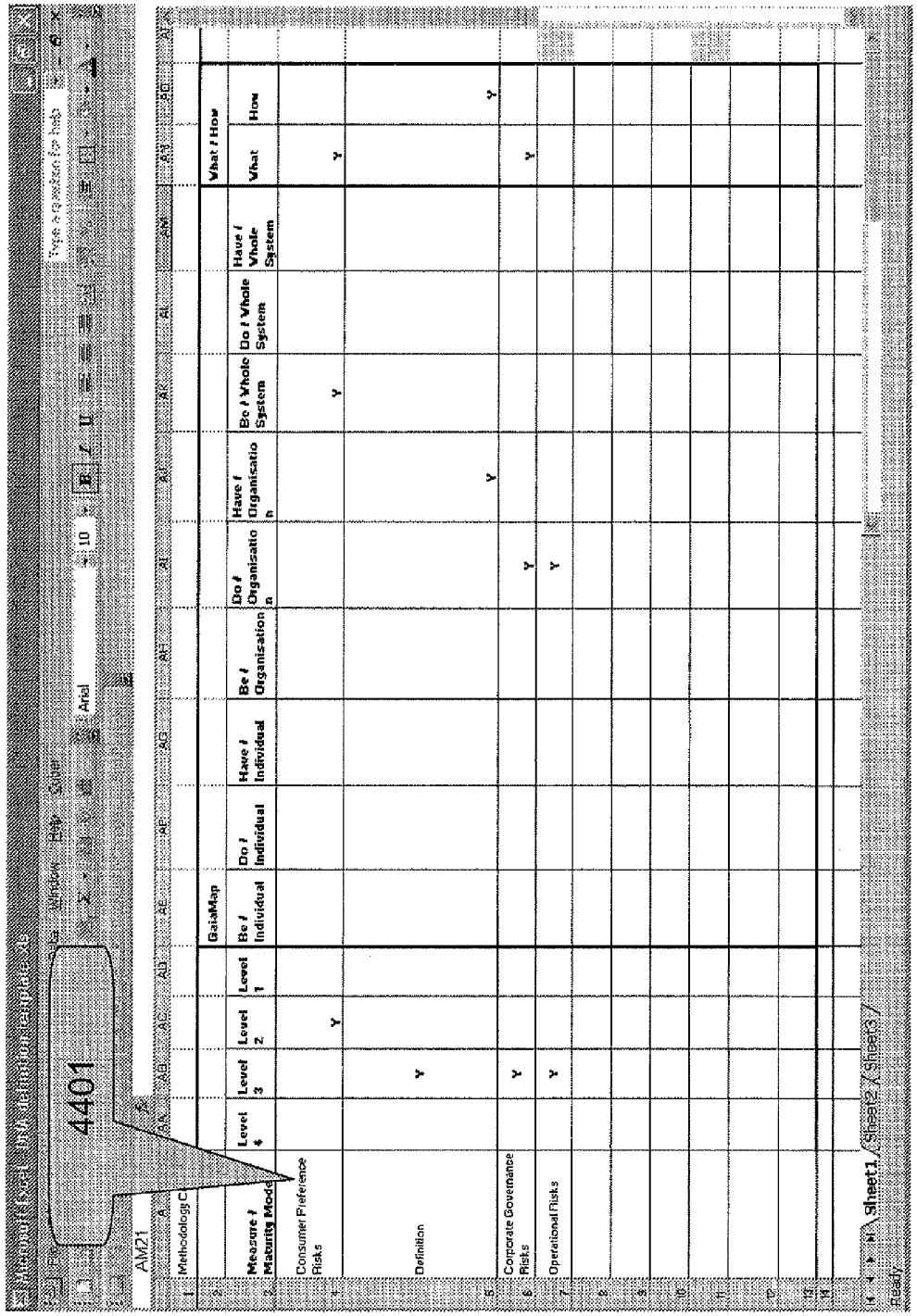
FIG. 44 is a further screen-shot of the spreadsheet application in FIG. 43 showing additional columns and further categorisation.
Figure 47:
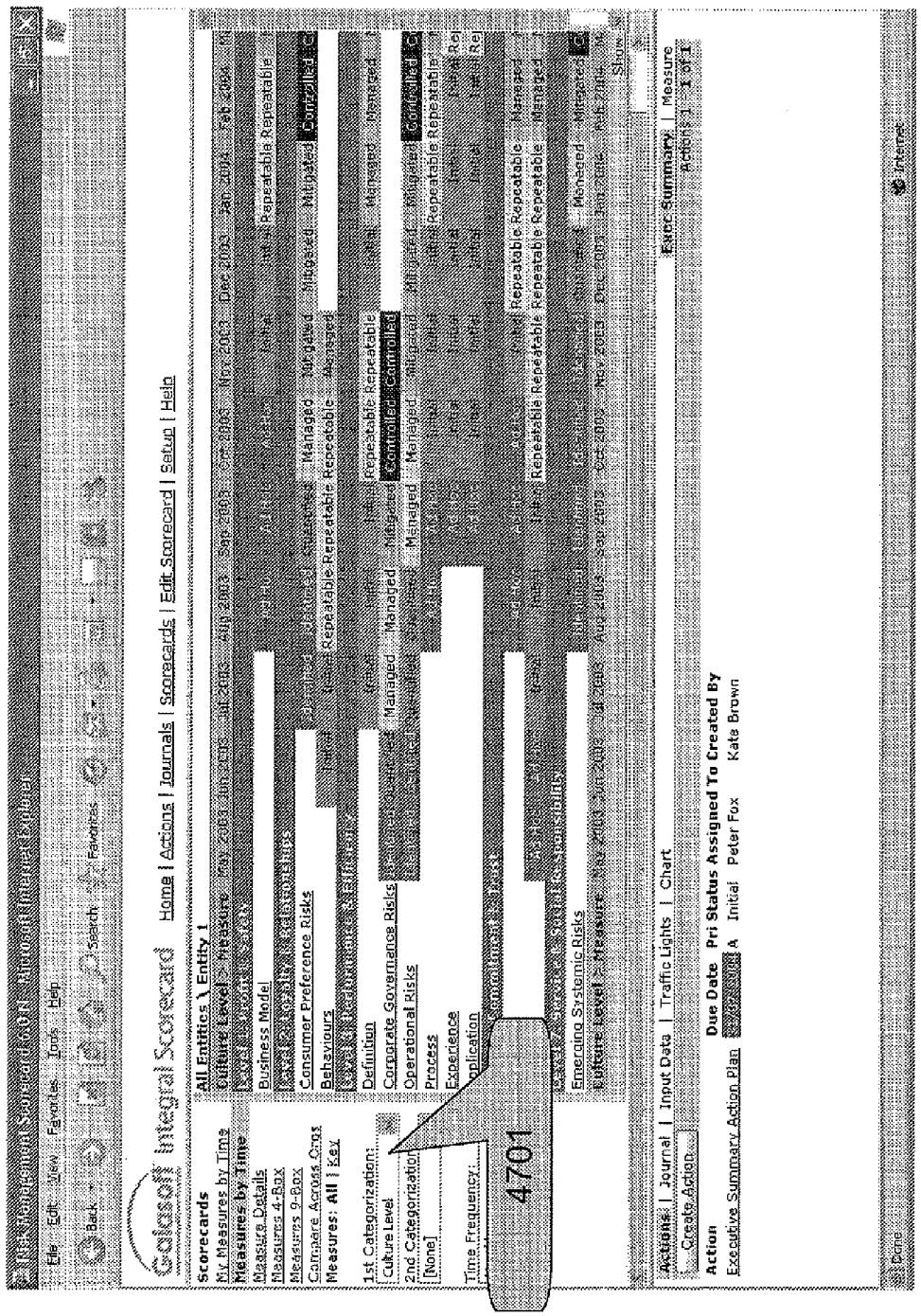
FIG. 47 is a screen-shot of the measures presented in the scorecard of FIG. 46 categorised by a culture level.
Figure 49:
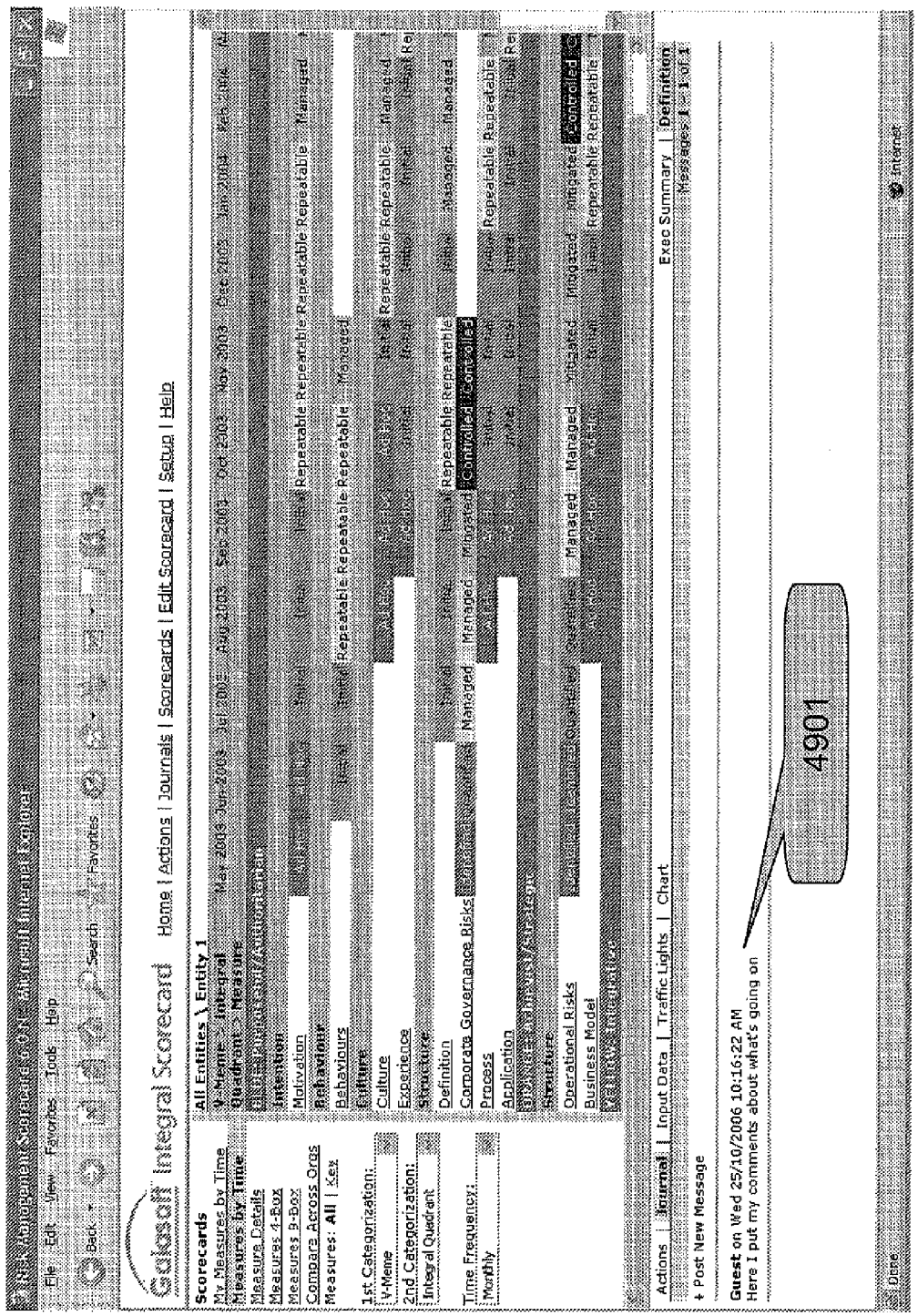
FIG. 49 is a screen-shot of the measures presented in the scorecard of FIG. 46 categorised according to a spiral dynamics model and an integral quadrant model and supporting presentation of a journal entry.

In a seventh embodiment, the content delivery system categorises information for the purposes of, inter alia, helping an organisation or physical entity to take on a project or a program for the purpose of either sustaining that organisation or entity, or to implement a change. A list of measures is prepared by the organisation or entity (FIG. 41). Referring to FIGS. 42, 43 and 44, a tabular simple spreadsheet is used to set out the categorisations of some measures by way of example, as categorised into the models of transformation as follows: Integral Quadrant (FIG. 50), V Meme (Spiral Dynamics) (FIGS. 48 and 49), Culture Level (FIG. 47), and/or Gaiamap (9 box) (FIG. 51).

Referring again to FIG. 50, the visual representation of elements which can be missing or which can represent blind spots can be viewed from a web page.

Figure 45:
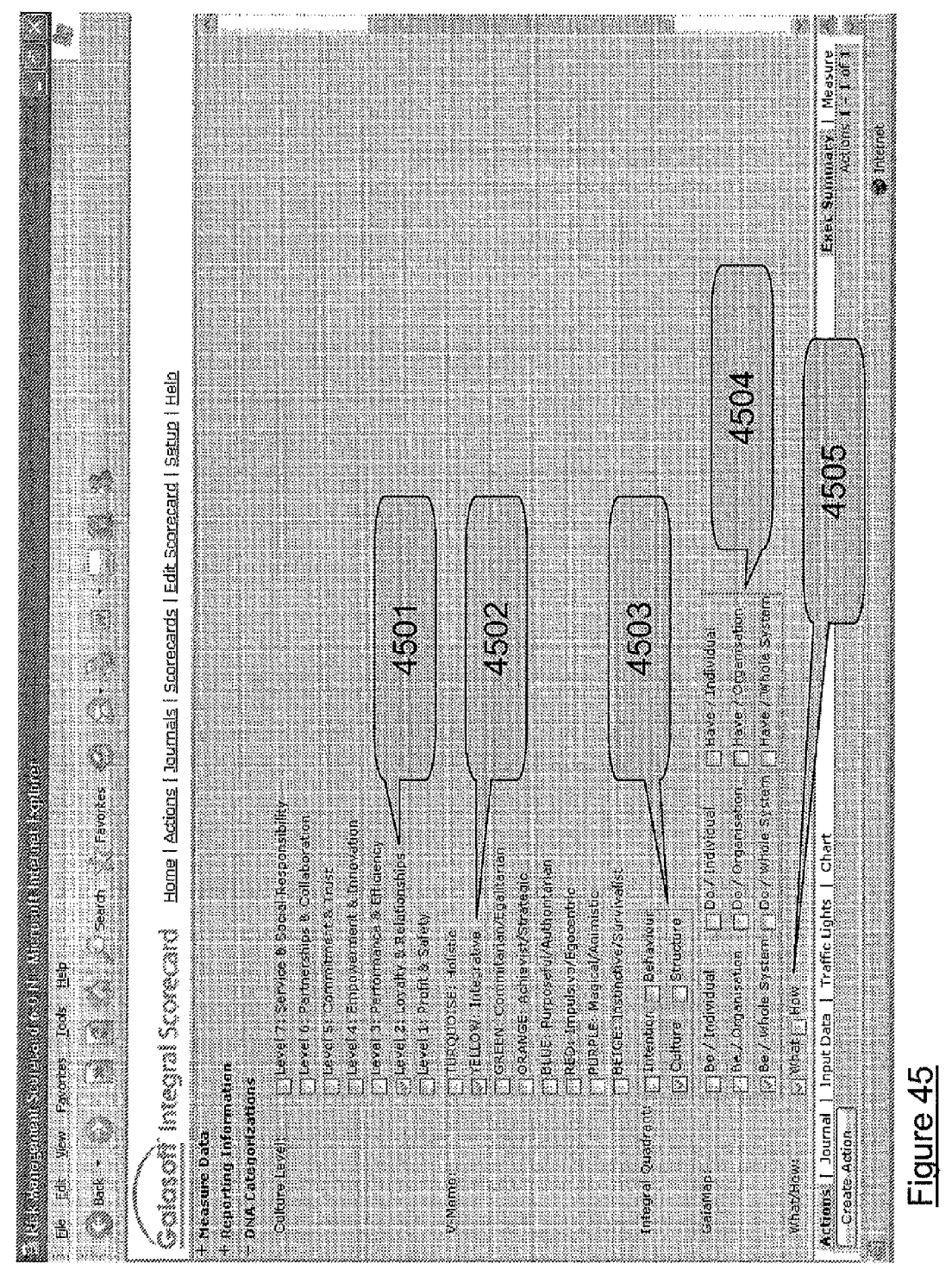

Referring to FIG. 45, the categorisations and/or measures of the information can be visually set out and selectable. Further, the measures can be viewed in a scorecard (FIG. 46).

The information can be subsequently used in the management feedback PDCA cycle (plan, do, check, act).

In this example, in relation to management of a city, a goal might be to maintain stability. Using the content delivery system as described in this example, an awareness of the Integral Model of 4 quadrants can be provided, and the Mayor of the city can set goals in relation to prosperity, culture and behaviour. The Mayor can choose to ignore the Top Left quadrant relating to belief, vision & values. If these shift, this affects behaviour, the culture that people operate in and the structure of society. If this quadrant is ignored, this can contribute amongst a certain sector to feelings of being disenfranchised, to violent behaviour, alienation, vandalism and worse. This all undermines the fabric of a city. The transformation of the city is enhanced by awareness of this first quadrant.

The skilled person should appreciate that the above examples can be used to implement change in relation to individuals, groups, organisations, communities, nations or a combination thereof. Consequently, a tool that hitherto did not exist is now available to analyse and/or manage complex systems.

What is claimed is:

1. A content delivery system for delivering content relevant to a profile that characterises a user of the system, the system comprising:
   a memory arranged to store software and a plurality of data elements having a plurality of respective profiles associated therewith including a profile that characterises the user, the plurality of respective profiles constituting respective meta-data; and
   a processor executing instructions of the software to:
   obtain information from the user via a user interface;
   access the plurality of data elements; and
   mine the plurality of data elements by reference to another data element having another profile associated therewith using a relevance methodology to identify at least one of the plurality of data elements having relevance to the profile associated with the another data element and the profile that characterises the user;
   wherein the relevance methodology calculates characteristic values based upon at least two of the plurality of data elements or at least two of the plurality of respective profiles;
   wherein the another data element and at least one of the plurality of data elements comprise data relating to a profiling model; and
   wherein the processor executes the instructions to deliver the identified at least one of the plurality of data elements or at least one of the plurality of respective profiles based on the calculated characteristic values to a recipient terminal.

2. The content delivery system according to claim 1, wherein the processor executes the instructions to communicate the identified at least one of the plurality of data elements to a recipient terminal so that the retrieved data element is presented graphically in accordance with the profiling model.

3. The content delivery system according to claim 1, wherein the profiling model is an evolutionary, psychological or cultural development of consciousness model for an individual, organisation, group or community.

4. The content delivery system according to claim 1, wherein the profiling model may be a model that characterises an individual, an organisation, a group or a community into a number of discrete categories, transition between the number of categories lacking a defined or predictable evolutionary sequence.

5. The content delivery system according to claim 1, wherein the profiling model may be a model relating to a repeatable lifecycle.

6. The content delivery system according to claim 1, wherein a data element is a resource comprising one or more of:
   a simple number, a performance measure, a document, a complex data structure, an organisation "strategy map", a strategy, an objective, Key Performance Indicator (KPI), a scorecard, a Hierarchy of Intent, an expertise, a learning, a recommendation, a risk, an issue, a case study, an action, a corrective action, a discussion, a web blog, a web link, a wiki, a reference, a legal entity, a department, a team, a reference to a standard, a tool, a publication, or a description of a method or a process.

7. The content delivery system according to claim 1, wherein a data element corresponds to one or more of:
   a person, a customer, an organisation, an organisational system or a particular issue confronting a person, a customer, an organisation or organisational system.

8. The content delivery system according to claim 1, wherein the profile is obtained in response to an assessment, the assessment being performed using a computer program based upon results of a survey.

9. The content delivery system according to claim 1, wherein the profiling model is arranged to model an aspect of a state of an entity or data element, or a progression of the state of the entity or data element.

10. The content delivery system according to claim 1, wherein the profiling model comprises a plurality of categories, the profiling model comprising at least nine elements.

11. The content delivery system according to claim 10, wherein the at least nine elements are arranged as a matrix, at least three columns of the matrix being attributed to or entitled "leadership", "transformation", and "performance", respectively, or "be", "do" and "have", respectively.

12. The content delivery system according to claim 10, wherein the at least nine elements are arranged as a matrix, at least three rows of the matrix being attributed to or entitled "individual", "organisational" and "global", respectively, or "individual", "organisation", and "whole system".

13. The content delivery system according to claim 1, wherein at least one of the plurality of profiles respectively associated with at least one of the plurality of data elements indicates that the at least one of the plurality of data elements relates to one or more levels of a corporate consciousness or corporate culture model.

14. The content delivery system according to claim 1, further comprising a further store arranged to store a further data element having at least one of the plurality of respective profiles associated therewith, access to the further data element being restricted.

15. The content delivery system according to claim 1, wherein the processor executes the instructions to:
receive communication from at least one networked computer to facilitate input of at least one of: different goals, measures related to goals, or other data to the processor, wherein the different goals and other data constitute respective data elements.

16. The content delivery system according to claim 15, wherein the processor further executes the instructions to enable at least one of processing or visualisation at a networked computer based on the communication from the at least one networked computer.

17. The content delivery system as claimed in claim 15, wherein:
the processor further executes the instructions to enable at least one of processing or visualisation at a networked computer based on the communication from the at least one networked computer;
the profile of the another data element represents a complex system containing human components and structural processes, the complex system being a part of a hierarchy of holons with a plurality of hierarchical levels;
the profiling model and visualisation include profiling and visualisation according to at least two dimensions comprising:
hierarchical level within the hierarchy of holons in a first dimension, resulting in visualisation in one or more display regions according to the one or more hierarchical levels of the hierarchy of holons; and
an internal-active-results state in a second dimension comprising at least three attributes of the state of the entity, an internal state being based on a profile according to an evolutionary, psychological or cultural development of consciousness model, an active state relating to progression of the state, and a result state relating to the physical reality and results;
the display regions intersect so that data elements are visualised as a set of display regions representing both the hierarchical level and at least the internal-active-result state to which each data element relates; and
a plurality of said data elements are updated resulting in content delivery and visualisation corresponding to the current state of the complex system.

18. The content delivery system as claimed in claim 1, wherein the another profile comprises multiple profiles.

19. The content delivery system as claimed in claim 1 wherein the another profile element is changeable.

20. The content delivery system according to claim 1, wherein a data element is a resource comprising one or more of: a document, an organisation "strategy map", an expertise, a learning, a recommendation, a risk, an issue, a case study, an action, a corrective action, a discussion, a web blog, a web link, a wiki, a reference, a legal entity, a department, a team, a reference to a standard, a publication, a film, a book, a magazine, or a person.

21. The content delivery system according to claim 1, wherein the profile comprises an identification of the user of the system.

22. The content delivery system according to claim 1, wherein the profile comprises an identification of the user of the system, a categorization of the user, and information obtained implicitly and explicitly from the user.

23. The content delivery system according to claim 1, wherein the identified at least one of the plurality of data element is user-selectable.

24. A content delivery system for delivering content relevant to a profile that characterises an entity, the system comprising:
a memory arranged to store software and a plurality of data elements having a plurality of respective profiles associated therewith including a profile that characterises the entity, the plurality of respective profiles constituting respective meta-data; and
a processor executing instructions of the software to:
obtain information associated with the entity from a user via a user interface;
access the plurality of data elements; and
mine the plurality of data elements by reference to another data element having another profile associated therewith using a relevance methodology to identify at least one of the plurality of data elements having relevance to the profile associated with the another data element and the profile that characterises the entity;
wherein
the relevance methodology calculates characteristic values based upon at least two of the plurality of data elements or at least two of the plurality of respective profiles;
the another data element and at least one of the plurality of data elements comprise data relating to a profiling model; and
the processor executes the instructions to deliver the identified at least one of the plurality of data elements or at least one of the plurality of respective profiles based on the calculated characteristic values to a recipient terminal.

* * * * *